US012671957B2

(12) United States Patent
Du et al.

(10) Patent No.: US 12,671,957 B2
(45) Date of Patent: Jun. 30, 2026

(54) RENDERING METHOD AND RELATED DEVICE

(71) Applicant: HUAWEI TECHNOLOGIES CO., LTD., Shenzhen (CN)

(72) Inventors: Xuhao Du, Shenzhen (CN); Xiangyu Li, Shenzhen (CN); Shuo Li, Shenzhen (CN); Fan Fan, Shenzhen (CN); Haiting Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 310 days.

(21) Appl. No.: 18/498,002

(22) Filed: Oct. 30, 2023

(65) Prior Publication Data

US 2024/0064486 A1 Feb. 22, 2024

Related U.S. Application Data

(63) Continuation of application No. PCT/CN2022/087353, filed on Apr. 18, 2022.

(30) Foreign Application Priority Data

Apr. 29, 2021 (CN) ........................ 202110477321.0

(51) Int. Cl.

*H04R 1/02* (2006.01)
*H04S 3/00* (2006.01)
*H04S 7/00* (2006.01)

(52) U.S. Cl.

CPC .............. *H04S 7/304* (2013.01); *H04S 3/008* (2013.01); *H04S 7/301* (2013.01); *H04S 7/40* (2013.01); *H04S 2400/01* (2013.01); *H04S 2400/11* (2013.01); *H04S 2420/01* (2013.01)

(58) Field of Classification Search

CPC .......... H04S 7/304; H04S 3/008; H04S 7/301; H04S 7/40; H04S 2400/01; H04S 2420/11
USPC .................................................. 381/303, 301
See application file for complete search history.

(56) References Cited

U.S. PATENT DOCUMENTS

| | | | | |
|---|---|---|---|---|
| 8,532,675 | B1 * | 9/2013 | Pasquero | H04M 1/72457 455/418 |
| 9,992,600 | B2 * | 6/2018 | Mateos Sole | H04S 3/008 |
| 11,570,566 | B2 * | 1/2023 | Jax | H04S 7/302 |
| 12,177,643 | B1 * | 12/2024 | Ramprashad | H04S 7/302 |

(Continued)

FOREIGN PATENT DOCUMENTS

| | | |
|---|---|---|
| CN | 202121661 U | 1/2012 |
| CN | 106448687 A | 2/2017 |

(Continued)

*Primary Examiner* — William J Deane, Jr.

(57) ABSTRACT

A rendering method and a related device are disclosed, and may be applied to a scenario such as production of music or film and television works, or the like. The method may be performed by a rendering device, or may be performed by a component (for example, a processor, a chip, a chip system, or the like) of a rendering device. The method includes: obtaining a first single-object audio track based on a multimedia file, where the first single-object audio track corresponds to a first sound object; determining a first sound source position of the first sound object based on reference information; and performing spatial rendering on the first single-object audio track based on the first sound source position, to obtain a rendered first single-object audio track.

20 Claims, 54 Drawing Sheets

(56) References Cited

U.S. PATENT DOCUMENTS

| | | | | |
|---|---|---|---|---|
| 2006/0280360 | A1* | 12/2006 | Holub | H04N 23/88 382/162 |
| 2009/0238371 | A1* | 9/2009 | Rumsey | H04R 29/001 381/58 |
| 2010/0328419 | A1 | 12/2010 | Etter | |
| 2014/0129937 | A1 | 5/2014 | Jarvinen et al. | |
| 2016/0080886 | A1* | 3/2016 | De Bruijn | H04S 7/308 381/17 |
| 2017/0293461 | A1* | 10/2017 | McCauley | G06F 3/04845 |
| 2019/0394605 | A1* | 12/2019 | Kim | G10L 19/008 |
| 2021/0076153 | A1* | 3/2021 | Laaksonen | G06F 16/687 |
| 2023/0188924 | A1* | 6/2023 | Tammi | G06V 40/161 381/303 |
| 2023/0254660 | A1* | 8/2023 | Ninan | G06V 40/161 381/303 |
| 2023/0283976 | A1* | 9/2023 | Ninan | H04S 7/304 381/303 |
| 2023/0388734 | A1* | 11/2023 | Mate | G06F 3/0346 |
| 2024/0048935 | A1* | 2/2024 | Virolainen | H04S 7/304 |

FOREIGN PATENT DOCUMENTS

| | | | |
|---|---|---|---|
| CN | 112037738 | A | 12/2020 |
| EP | 3547718 | A | 10/2019 |
| EP | 3726859 | A1 | 10/2020 |
| JP | 2003099078 | A | 4/2003 |
| JP | 2014522181 | A | 8/2014 |
| JP | 2022017880 | A | 1/2022 |
| WO | 2010045735 | A1 | 4/2010 |
| WO | 2019026597 | A1 | 2/2019 |

* cited by examiner

RENDERING METHOD AND RELATED DEVICE

CROSS-REFERENCE TO RELATED APPLICATIONS

This application is a continuation of International Application No. PCT/CN2022/087353, filed on Apr. 18, 2022, which claims priority to Chinese Patent Application No. 202110477321.0, filed on Apr. 29, 2021. The disclosures of the aforementioned applications are hereby incorporated by reference in their entireties.

TECHNICAL FIELD

This application relates to the audio application field, and in particular, to a rendering method and a related device.

BACKGROUND

As audio and video playing technologies become increasingly mature, people have increasingly high requirements on playing effect of an audio and video playing device.

Currently, to enable a user to experience realistic stereo surround sound effect when playing audio and videos, an audio and video playing device may process to-be-played audio and video data by using a processing technology such as a head-related transfer function (HRTF), or the like.

However, a large amount of audio and video data (for example, music or film and television works, or the like) in the internet is a dual-channel/multi-channel audio track. How to perform spatial rendering on a single sound object in an audio track is an urgent problem to be resolved.

SUMMARY

Embodiments of this application provide a rendering method, to improve a stereo spatial sense of a first single-object audio track corresponding to a first sound object in a multimedia file, and provide immersive stereo sound effect for a user.

A first aspect of embodiments of this application provides a rendering method. The method may be applied to a scenario such as production of music or film and television works, or the like. The method may be performed by a rendering device, or may be performed by a component (for example, a processor, a chip, a chip system, or the like) of a rendering device. The method includes: obtaining a first single-object audio track based on a multimedia file, where the first single-object audio track corresponds to a first sound object; determining a first sound source position of the first sound object based on reference information, where the reference information includes reference position information and/or media information of the multimedia file, and the reference position information indicates the first sound source position; and performing spatial rendering on the first single-object audio track based on the first sound source position, to obtain a rendered first single-object audio track.

In this embodiment of this application, the first single-object audio track is obtained based on the multimedia file, where the first single-object audio track corresponds to the first sound object; the first sound source position of the first sound object is determined based on the reference information; and spatial rendering is performed on the first single-object audio track based on the first sound source position, to obtain the rendered first single-object audio track. A stereo spatial sense of the first single-object audio track corresponding to the first sound object in the multimedia file can be improved, so that immersive stereo sound effect is provided for a user.

Optionally, in a possible implementation of the first aspect, the media information in the foregoing step includes at least one of: text that needs to be displayed in the multimedia file, an image that needs to be displayed in the multimedia file, a music feature of music that needs to be played in the multimedia file, and a sound source type corresponding to the first sound object.

In this possible implementation, if the media information includes the music feature, the rendering device may perform orientation and dynamics settings on an extracted specific sound object based on the music feature of the music, so that an audio track corresponding to the sound object is more natural in 3D rendering, and artistic is better reflected. If the media information includes text, an image, and the like, a 3D immersive sense is obtained through rendering in a headset or loudspeaker environment. In this way, a sound and an image can be synchronized, so that the user obtains optimal sound effect experience. In addition, if the media information includes a video, a sound object in the video is tracked, and an audio track corresponding to the sound object in the entire video is rendered. This may also be applied to professional mixing post-production, to improve work efficiency of a mixing engineer.

Optionally, in a possible implementation of the first aspect, the reference position information in the foregoing step includes first position information of a sensor or second position information that is selected by the user.

In this possible implementation, if the reference position information includes the first position information of the sensor, the user may perform real-time or subsequent dynamic rendering on a selected sound object based on an orientation or a position provided by the sensor. This may assign a specific spatial orientation and specific motion to the sound object, so that interaction production between the user and audio is implemented, to provide new experience for the user. If the reference position information includes the second position information selected by the user, the user may control a selected sound object by using a dragging method in an interface, and perform real-time or subsequent dynamic rendering. This assigns a specific spatial orientation and specific motion to the sound object, so that interaction production between the user and audio is implemented, to provide new experience for the user. In addition, a sound image may be further edited for the sound object when the user does not have any sensor.

Optionally, in a possible implementation of the first aspect, the foregoing step further includes: determining a type of a playing device, where the playing device is configured to play a target audio track, and the target audio track is obtained based on the rendered first single-object audio track; and the performing spatial rendering on the first single-object audio track based on the first sound source position includes: performing spatial rendering on the first single-object audio track based on the first sound source position and the type of the playing device.

In this possible implementation, when spatial rendering is performed on the audio track, the type of the playing device is considered. Different playing device types may correspond to different spatial rendering formulas, so that spatial effect of subsequently playing the rendered first single-object audio track by the playing device is more realistic and accurate.

Optionally, in a possible implementation of the first aspect, the reference information in the foregoing step includes the media information. When the media information includes the image and the image includes the first sound object, the determining a first sound source position of the first sound object based on reference information includes: determining third position information of the first sound object in the image, where the third position information includes two-dimensional coordinates and a depth of the first sound object in the image; and obtaining the first sound source position based on the third position information.

In this possible implementation, after coordinates of a sound object and a single-object audio track are extracted with reference to a multi-modal feature of audio, a video, and an image, a 3D immersive sense is obtained through rendering in a headset or loudspeaker environment. In this way, a sound and an image can be synchronized, so that the user obtains optimal sound effect experience. In addition, a technology of tracking and rendering object audio in an entire video after a sound object is selected may also be applied to professional mixing post-production, to improve work efficiency of a mixing engineer. A single-object audio track of audio in the video is separated, and a sound object in a video image is analyzed and tracked, to obtain motion information of the sound object, so as to perform real-time or subsequent dynamic rendering on the selected sound object. In this way, the video image is matched with a sound source direction of the audio, so that user experience is improved.

Optionally, in a possible implementation of the first aspect, the reference information in the foregoing step includes media information. When the media information includes the music feature of the music that needs to be played in the multimedia file, the determining a first sound source position of the first sound object based on reference information includes: determining the first sound source position based on an association relationship and the music feature, where the association relationship indicates an association between the music feature and the first sound source position.

In this possible implementation, orientation and dynamics settings are performed on the extracted specific sound object based on the music feature of the music, so that 3D rendering is more natural, and artistic is better reflected.

Optionally, in a possible implementation of the first aspect, the media information in the foregoing step includes the media information. When the media information includes the text that needs to be displayed in the multimedia file and the text includes position text related to a position, the determining a first sound source position of the first sound object based on reference information includes: identifying the position text; and determining the first sound source position based on the position text.

In this possible implementation, the position text related to the position is identified, and a 3D immersive sense is obtained through rendering in a headset or loudspeaker environment. In this way, a spatial sense corresponding to the position text is achieved, so that the user obtains optimal sound effect experience.

Optionally, in a possible implementation of the first aspect, the reference information in the foregoing step includes the reference position information. When the reference position information includes the first position information, before the determining a first sound source position of the first sound object based on reference information, the method further includes: obtaining the first position information, where the first position information includes a first posture angle of the sensor and a distance between the sensor and a playing device. The determining a first sound source position of the first sound object based on reference information includes: converting the first position information into the first sound source position.

In this possible implementation, the user may perform real-time or subsequent dynamic rendering on the selected sound object based on an orientation (that is, the first posture angle) provided by the sensor. In this case, the sensor is similar to a laser pointer, and a position to which a laser points is the sound source position. This may assign a specific spatial orientation and specific motion to the sound object, so that interaction production between the user and audio is implemented, to provide new experience for the user.

Optionally, in a possible implementation of the first aspect, the reference information in the foregoing step includes the reference position information. When the reference position information includes the first position information, before the determining a first sound source position of the first sound object based on reference information, the method further includes: obtaining the first position information, where the first position information includes a second posture angle of the sensor and acceleration of the sensor. The determining a first sound source position of the first sound object based on reference information includes: converting the first position information into the first sound source position.

In this possible implementation, the user may control the sound object by using actual position information of the sensor as a sound source position, and perform real-time or subsequent dynamic rendering. In this way, a motion track of the sound object can be simply and completely controlled by the user, so that editing flexibility is greatly improved.

Optionally, in a possible implementation of the first aspect, the reference information in the foregoing step includes the reference position information. When the reference position information includes the second position information, before the determining a first sound source position of the first sound object based on reference information, the method further includes: providing a spherical view for the user to select, where a circle center of the spherical view is a position of the user, and a radius of the spherical view is a distance between the position of the user and a playing device; and obtaining the second position information selected by the user in the spherical view. The determining a first sound source position of the first sound object based on reference information includes: converting the second position information into the first sound source position.

In this possible implementation, the user may select the second position information (for example, through an operation such as tapping, dragging, sliding, or the like) by using the spherical view, to control the selected sound object and perform real-time or subsequent dynamic rendering, and may assign a specific spatial orientation and specific motion to the sound object, so that interaction production between the user and audio is implemented, to provide new experience for the user In addition, a sound image may be further edited for the sound object when the user does not have any sensor.

Optionally, in a possible implementation of the first aspect, the foregoing step of obtaining a first single-object audio track based on a multimedia file includes: separating the first single-object audio track from an original audio track in the multimedia file, where the original audio track is obtained by combining at least the first single-object audio track and a second single-object audio track, and the second single-object audio track corresponds to a second sound object.

In this possible implementation, when the original audio track is obtained by combining at least the first single-object audio track and the second single-object audio track, the first single-object audio track is separated, so that spatial rendering may be performed on a specific sound object in the audio track. This enhances an audio editing capability of the user, and may be applied to object production of music or film and television works. In this way, controllability and playability of the user for music are increased.

Optionally, in a possible implementation of the first aspect, the foregoing step of separating the first single-object audio track from an original audio track in the multimedia file includes: separating the first single-object audio track from the original audio track by using a trained separation network.

In this possible implementation, when the original audio track is obtained by combining at least the first single-object audio track and the second single-object audio track, the first single-object audio track is separated by using the separation network, so that spatial rendering may be performed on a specific sound object in the original audio track. This enhances an audio editing capability of the user, and may be applied to object production of music or film and television works. In this way, controllability and playability of the user for music are increased.

Optionally, in a possible implementation of the first aspect, the trained separation network in the foregoing step is obtained by training the separation network by using training data as an input of the separation network and by using a value of a loss function less than a first threshold as a target. The training data includes a training audio track, the training audio track is obtained by combining at least an initial third single-object audio track and an initial fourth single-object audio track, the initial third single-object audio track corresponds to a third sound object, the initial fourth single-object audio track corresponds to a fourth sound object, the third sound object and the first sound object have a same type, and the second sound object and the fourth sound object have a same type. An output of the separation network includes a third single-object audio track obtained through separation. The loss function indicates a difference between the third single-object audio track obtained through separation and the initial third single-object audio track.

In this possible implementation, the separation network is trained to reduce the value of the loss function, that is, to continuously reduce the difference between the third single-object audio track output by the separation network and the initial third single-object audio track. In this way, the single-object audio track separated by using the separation network is more accurate.

Optionally, in a possible implementation of the first aspect, the foregoing step of performing spatial rendering on the first single-object audio track based on the first sound source position and the type of the playing device includes: if the playing device is a headset, obtaining the rendered first single-object audio track according to the following formula:

$$\sum_s \int_{-\infty}^{t} a_s(t) h_{i,s}(t) o_s(\tau - t) d\tau$$

-continued $$\sum_s \int_{-\infty}^{t} a_s(t) h_{i,s}(t) o_s(\tau - t) d\tau$$

represents the rendered first single-object audio track, S represents at least one sound object of the multimedia file and the at least one sound object includes the first sound object, i represents a left channel or a right channel, $a_s(t)$ represents an adjustment coefficient of the first sound object at a moment t, $h_{i,s}(t)$ represents a head-related transfer function HRTF filter coefficient that is of the left channel or the right channel corresponding to the first sound object and that is at the moment t, the HRTF filter coefficient is related to the first sound source position, $o_s(t)$ represents the first single-object audio track at the moment t, and τ represents an integration item.

In this possible implementation, when the playing device is a headset, a technical problem of how to obtain the rendered first single-object audio track is resolved.

Optionally, in a possible implementation of the first aspect, the foregoing step of performing spatial rendering on the first single-object audio track based on the first sound source position and the type of the playing device includes: if the playing device is N loudspeaker devices, obtaining the rendered first single-object audio track according to the following formula:

$$\sum_s a_s(t) g_s(t) o_s(t),$$

where $$g_s(t) = [\, r\cos\lambda \sin\Phi \quad r\sin\lambda \sin\Phi \quad r\cos\Phi \,] \begin{bmatrix} r_1 \cos\lambda_1 \sin\Phi_1 & r_1 \sin\lambda_1 \sin\Phi_1 & r_1 \cos\Phi_1 \\ \cdots & \cdots & \cdots \\ r_N \cos\lambda_N \sin\Phi_N & r_1 \sin\lambda_N \sin\Phi_N & r_N \cos\Phi_N \end{bmatrix}^{-1},$$

where $$r = \sqrt{\frac{\sum_{i=1}^{N} r_i^2}{N}}$$

$$\sum_s a_s(t) g_s(t) o_s(t)$$

represents the rendered first single-object audio track, i represents an $i^{th}$ channel in a plurality of channels, S represents at least one sound object of the multimedia file and the at least one sound object includes the first sound object, $a_s(t)$ represents an adjustment coefficient of the first sound object at a moment t, $g_s(t)$ represents a translation coefficient of the first sound object at the moment t, $o_s(t)$ represents the first single-object audio track at the moment t, $\lambda_i$ represents an azimuth obtained when a calibrator calibrates an $i^{th}$ loudspeaker device, $\Phi_i$ represents an oblique angle obtained when the calibrator calibrates the $i^{th}$ loudspeaker device, $r_i$ represents a distance between the $i^{th}$ loudspeaker device and the calibrator, N is a positive integer, i is a positive integer, i≤N, and the first sound source position is in a tetrahedron formed by the N loudspeaker devices.

In this possible implementation, when the playing device is a loudspeaker device, a technical problem of how to obtain the rendered first single-object audio track is resolved.

Optionally, in a possible implementation of the first aspect, the foregoing step further includes: obtaining the target audio track based on the rendered first single-object audio track, an original audio track in the multimedia file, and the type of the playing device; and sending the target audio track to the playing device, where the playing device is configured to play the target audio track.

In this possible implementation, the target audio track may be obtained. This helps store the rendered audio track, facilitates subsequent playing, and reduces a repeated rendering operation.

Optionally, in a possible implementation of the first aspect, the foregoing step of obtaining the target audio track based on the rendered first single-object audio track, an original audio track in the multimedia file, and the type of the playing device includes: if the playing device is a headset, obtaining the target audio track according to the following formula:

$$X_i^{3D}(t) = X_i(t) - \sum_{s \in S_1} o_s(t) + \sum_{s \in S_1+S_2} \int_{-\infty}^{t} a_s(t) h_{i,s}(t) o_s(\tau - t) d\tau$$

i represents a left channel or a right channel, $$X_i^{3D}(t)$$

represents the target audio track at a moment t, $X_i(t)$ represents the original audio track at the moment t, $$\sum_{s \in S_1} o_s(t)$$

represents the first single-object audio track that is not rendered at the moment $$\sum_s \int_{-\infty}^{t} a_s(t) h_{i,s}(t) o_s(\tau - t) d\tau$$

represents the rendered first single-object audio track, $a_s(t)$ represents an adjustment coefficient of the first sound object at the moment t, $h_{i,s}(t)$ represents a head-related transfer function HRTF filter coefficient that is of the left channel or the right channel corresponding to the first sound object and that is at the moment t, the HRTF filter coefficient is related to the first sound source position, $o_s(t)$ represents the first single-object audio track at the moment t, $\tau$ represents an integration item, and $S_1$ represents a sound object that needs to be replaced in the original audio track; if the first sound object replaces the sound object in the original audio track, $S_1$ represents a null set; $S_2$ represents a sound object added in the target audio track compared with the original audio track, and if the first sound object is a duplicate of the sound object in the original audio track, $S_2$ represents a null set; and $S_1$ and/or $S_2$ represent/represents at least one sound object of the multimedia file and the at least one sound object includes the first sound object.

In this possible implementation, when the playing device is a headset, a technical problem of how to obtain the target audio track is resolved. This helps store the rendered audio track, facilitates subsequent playing, and reduces a repeated rendering operation.

Optionally, in a possible implementation of the first aspect, the foregoing step of obtaining the target audio track based on the rendered first single-object audio track, an original audio track in the multimedia file, and the type of the playing device includes: if the playing device is N loudspeaker devices, obtaining the target audio track according to the following formula:

$$X_i^{3D}(t) = X_i(t) - \sum_{s \in S_1} o_s(t) + \sum_{s \in S_1+S_2} a_s(t) g_{i,s}(t) o_s(t),$$

where $$g_s(t) = [\, r\cos\lambda\sin\Phi \quad r\sin\lambda\sin\Phi \quad r\cos\Phi \,] \begin{bmatrix} r_1\cos\lambda_1\sin\Phi_1 & r_1\sin\lambda_1\sin\Phi_1 & r_1\cos\Phi_1 \\ \dots & \dots & \dots \\ r_N\cos\lambda_N\sin\Phi_N & r_1\sin\lambda_N\sin\Phi_N & r_N\cos\Phi_N \end{bmatrix}^{-1},$$

where $$r = \sqrt{\frac{\sum_{i=1}^{N} r_i^2}{N}}$$

i represents an $i^{th}$ channel in a plurality of channels, $$X_i^{3D}(t)$$

represents the target audio track at a moment t, $X_i(t)$ represents the original audio track at the moment t, $$\sum_{s \in S_1} o_s(t)$$

represents the first single-object audio track that is not rendered at the moment t, $$\sum_s a_s(t) g_{i,s}(t) o_s(t)$$

represents the rendered first single-object audio track, $a_s(t)$ represents an adjustment coefficient of the first sound object at the moment t, $g_s(t)$ represents a translation coefficient of the first sound object at the moment t, $g_{i,s}(t)$ represents an $i^{th}$ row in $g_s(t)$ $o_s(t)$ represents the first single-object audio track at the moment t, and $S_1$ represents a sound object that needs to be replaced in the original audio track; if the first sound object replaces the sound object in the original audio track, $S_1$ represents a null set; $S_2$ represents a sound object added in the target audio track compared with the original audio track, and if the first sound object is a duplicate of the sound object in the original audio track, $S_2$ represents a null set; and $S_1$ and/or $S_2$ represent/represents at least one sound object of the multimedia file and the at least one sound object includes the first sound object, $\lambda_i$ represents an azimuth obtained when a calibrator calibrates an $i^{th}$ loudspeaker device, $\Phi_i$ represents an oblique angle obtained when $i^{th}$ the calibrator calibrates the $i^{th}$ loudspeaker device, $r_i$ represents a distance between the $i^{th}$ loudspeaker device and the calibrator, N is a positive integer, i is a positive integer, i≤N, and the first sound source position is in a tetrahedron formed by the N loudspeaker devices.

In this possible implementation, when the playing device is a loudspeaker device, a technical problem of how to obtain the target audio track is resolved. This helps store the rendered audio track, facilitates subsequent playing, and reduces a repeated rendering operation.

Optionally, in a possible implementation of the first aspect, the music feature in the foregoing step includes at least one of: a music structure, a music emotion, and a singing mode.

Optionally, in a possible implementation of the first aspect, the foregoing step further includes: separating the second single-object audio track from the multimedia file; determining a second sound source position of the second sound object based on the reference information; and performing spatial rendering on the second single-object audio track based on the second sound source position, to obtain a rendered second single-object audio track.

In this possible implementation, at least two single-object audio tracks may be separated from the multimedia file, and corresponding spatial rendering is performed. This enhances a capability for editing a specific sound object by the user in audio, and may be applied to object production of music or film and television works. In this way, controllability and playability of the user for music are increased.

A second aspect of embodiments of this application provides a rendering method. The method may be applied to a scenario such as production of music or film and television works, or the like, and may be performed by a rendering device, or may be performed by a component (for example, a processor, a chip, a chip system, or the like) of a rendering device. The method includes: obtaining a multimedia file; obtaining a first single-object audio track based on the multimedia file, where the first single-object audio track corresponds to a first sound object; displaying a user interface, where the user interface includes a rendering manner option; determining an automatic rendering manner or an interactive rendering manner from the rendering manner option in response to a first operation of a user in the user interface; and when the automatic rendering manner is determined, obtaining a rendered first single-object audio track in a preset manner; or when the interactive rendering manner is determined, obtaining reference position information in response to a second operation of the user, determining a first sound source position of the first sound object based on the reference position information, and rendering the first single-object audio track based on the first sound source position, to obtain a rendered first single-object audio track.

In this embodiment of this application, the rendering device determines the automatic rendering manner or the interactive rendering manner from the rendering manner option based on the first operation of the user. In one aspect, the rendering device may automatically obtain the rendered first single-object audio track based on the first operation of the user. In another aspect, spatial rendering of the audio track corresponding to the first sound object in the multimedia file may be implemented through interaction between the rendering device and the user, so that immersive stereo sound effect is provided for the user.

Optionally, in a possible implementation of the second aspect, the preset manner in the foregoing step includes: obtaining media information of the multimedia file; determining the first sound source position of the first sound object based on the media information; and rendering the first single-object audio track based on the first sound source position, to obtain the rendered first single-object audio track.

Optionally, in a possible implementation of the second aspect, the media information in the foregoing step includes at least one of: text that needs to be displayed in the multimedia file, an image that needs to be displayed in the multimedia file, a music feature of music that needs to be played in the multimedia file, and a sound source type corresponding to the first sound object.

In this possible implementation, the rendering device determines a to-be-processed multimedia file through interaction between the rendering device and the user, so that controllability and playability of the user for music in the multimedia file are increased.

Optionally, in a possible implementation of the second aspect, the reference position information in the foregoing step includes first position information of a sensor or second position information that is selected by the user.

In this possible implementation, when spatial rendering is performed on the audio track, a type of a playing device is determined based on an operation of the user. Different playing device types may correspond to different spatial rendering formulas, so that spatial effect of subsequently playing the rendered audio track by the playing device is more realistic and accurate.

Optionally, in a possible implementation of the second aspect, when the media information includes the image and the image includes the first sound object, the foregoing step of determining the first sound source position of the first sound object based on the media information includes: presenting the image; determining third position information of the first sound object in the image, where the third position information includes two-dimensional coordinates and a depth of the first sound object in the image; and obtaining the first sound source position based on the third position information.

In this possible implementation, the rendering device may automatically present the image, determine the sound object in the image, obtain the third position information of the sound object, and then obtain the first sound source position. In this manner, the rendering device may automatically identify the multimedia file. When the multimedia file includes the image and the image includes the first sound object, the rendering device may automatically obtain the rendered first single-object audio track. After the coordinates of the sound object and the single-object audio track are automatically extracted, a 3D immersive sense is obtained through rendering in a headset or loudspeaker environment. In this way, a sound and an image can be synchronized, so that the user obtains optimal sound effect experience.

Optionally, in a possible implementation of the second aspect, the foregoing step of determining third position information of the first sound object in the image includes: determining the third position information of the first sound object in response to a third operation performed by the user on the image.

In this possible implementation, the user may select the first sound object from a plurality of sound objects in the presented image, that is, may select the rendered first single-object audio track corresponding to the first sound object. The coordinates of the sound object and the single-object audio track are extracted based on a user operation, and a 3D immersive sense is obtained through rendering in a headset or loudspeaker environment. In this way, a sound and an image can be synchronized, so that the user obtains optimal sound effect experience.

Optionally, in a possible implementation of the second aspect, when the media information includes the music feature of the music that needs to be played in the multimedia file, the determining the first sound source position of the first sound object based on the media information includes: identifying the music feature; and determining the first sound source position based on an association relationship and the music feature, where the association relationship indicates an association between the music feature and the first sound source position.

In this possible implementation, orientation and dynamics settings are performed on an extracted specific sound object based on the music feature of the music, so that 3D rendering is more natural, and artistic is better reflected.

Optionally, in a possible implementation of the second aspect, when the media information includes the text that needs to be displayed in the multimedia file and the text includes position text related to a position, the determining the first sound source position of the first sound object based on the media information includes: identifying the position text; and determining the first sound source position based on the position text.

In this possible implementation, the position text related to the position is identified, and a 3D immersive sense is obtained through rendering in a headset or loudspeaker environment. In this way, a spatial sense corresponding to the position text is achieved, so that the user obtains optimal sound effect experience.

Optionally, in a possible implementation of the second aspect, when the reference position information includes the first position information, the obtaining reference position information in response to a second operation of the user includes: obtaining the first position information in response to a second operation performed by the user on the sensor, where the first position information includes a first posture angle of the sensor and a distance between the sensor and a playing device. The determining a first sound source position of the first sound object based on the reference position information includes: converting the first position information into the first sound source position.

In this possible implementation, the user may perform real-time or subsequent dynamic rendering on the selected sound object based on an orientation (that is, the first posture angle) provided by the sensor. In this case, the sensor is similar to a laser pointer, and a position to which a laser points is the sound source position. This may assign a specific spatial orientation and specific motion to the sound object, so that interaction production between the user and audio is implemented, to provide new experience for the user.

Optionally, in a possible implementation of the second aspect, when the reference position information includes the first position information, the obtaining reference position information in response to a second operation of the user includes: obtaining the first position information in response to a second operation performed by the user on the sensor, where the first position information includes a second posture angle of the sensor and acceleration of the sensor. The determining a first sound source position of the first sound object based on the reference position information includes: converting the first position information into the first sound source position.

In this possible implementation, the user may control the sound object by using actual position information of the sensor as a sound source position, and perform real-time or subsequent dynamic rendering. In this way, a motion track of the sound object can be simply and completely controlled by the user, so that editing flexibility is greatly improved.

Optionally, in a possible implementation of the second aspect, when the reference position information includes the second position information, the obtaining reference position information in response to a second operation of the user includes: presenting a spherical view, where a circle center of the spherical view is a position of the user, and a radius of the spherical view is a distance between the position of the user and a playing device; and determining the second position information in the spherical view in response to the second operation of the user. The determining a first sound source position of the first sound object based on the reference position information includes: converting the second position information into the first sound source position.

In this possible implementation, the user may select the second position information (for example, through an operation such as tapping, dragging, sliding, or the like) by using the spherical view, to control the selected sound object and perform real-time or subsequent dynamic rendering, and may assign a specific spatial orientation and specific motion to the sound object, so that interaction production between the user and audio is implemented, to provide new experience for the user In addition, a sound image may be further edited for the sound object when the user does not have any sensor.

Optionally, in a possible implementation of the second aspect, the foregoing step of obtaining a multimedia file includes: determining the multimedia file from at least one stored multimedia file in response to a fourth operation of the user.

In this possible implementation, the multimedia file may be determined from the at least one stored multimedia file based on selection of the user, to implement rendering and production of the first single-object audio track corresponding to the first sound object in the multimedia file selected by the user. This improves user experience.

Optionally, in a possible implementation of the second aspect, the user interface further includes a playing device type option. The method further includes: determining a type of a playing device from the playing device type option in response to a fifth operation of the user. The rendering the first single-object audio track based on the first sound source position, to obtain a rendered first single-object audio track includes: rendering the first single-object audio track based on the first sound source position and the type, to obtain the rendered first single-object audio track.

In this possible implementation, a rendering manner suitable for the playing device that is being used by the user is selected based on the type of the playing device used by the user, so that rendering effect of the playing device is improved, and 3D rendering is more natural.

Optionally, in a possible implementation of the second aspect, the foregoing step of obtaining a first single-object audio track based on the multimedia file includes: separating the first single-object audio track from an original audio track in the multimedia file, where the original audio track is obtained by combining at least the first single-object audio track and a second single-object audio track, and the second single-object audio track corresponds to a second sound object.

In this possible implementation, when the original audio track is obtained by combining at least the first single-object audio track and the second single-object audio track, the first single-object audio track is separated, so that spatial rendering may be performed on a specific sound object in the audio track. This enhances an audio editing capability of the user, and may be applied to object production of music or film and television works. In this way, controllability and playability of the user for music are increased.

In this possible implementation, the first single-object audio track may be separated from the multimedia file, to implement rendering of a single-object audio track corresponding to the specific sound object in the multimedia file. This helps the user perform audio production, and improves user experience.

In this possible implementation, the user may perform real-time or subsequent dynamic rendering on the selected sound object based on an orientation or a position provided by the sensor. This may assign a specific spatial orientation and specific motion to the sound object, so that interaction production between the user and audio is implemented, to provide new experience for the user.

In this possible implementation, the user may perform real-time or subsequent dynamic rendering on the selected sound object based on the orientation (that is, the first posture angle) provided by the sensor. In this case, the sensor is similar to a laser pointer, and a position to which a laser points is the sound source position. This may assign a specific spatial orientation and specific motion to the sound object, so that interaction production between the user and audio is implemented, to provide new experience for the user.

In this possible implementation, the sound object is controlled by using actual position information of the sensor as a sound source position, and real-time or subsequent dynamic rendering is performed. In this way, a motion track of the sound object can be simply and completely controlled by the user, so that editing flexibility is greatly improved.

In this possible implementation, the user may control the selected sound object by using a dragging method in the interface, and perform real-time or subsequent dynamic rendering. This assigns a specific spatial orientation and specific motion to the sound object, so that interaction production between the user and audio is implemented, to provide new experience for the user. In addition, a sound image may be further edited for the sound object when the user does not have any sensor.

In this possible implementation, the rendering device may perform orientation and dynamics settings on the extracted specific sound object based on the music feature of the music, so that an audio track corresponding to the sound object is more natural in 3D rendering, and artistic is better reflected.

In this possible implementation, a 3D immersive sense is obtained through rendering in a headset or loudspeaker environment. In this way, a sound and an image can be synchronized, so that the user obtains optimal sound effect experience.

In this possible implementation, after determining the sound object, the rendering device may automatically track the sound object in a video, and render an audio track corresponding to the sound object in the entire video. This may also be applied to professional mixing post-production, to improve work efficiency of a mixing engineer.

In this possible implementation, the rendering device may determine the sound object in the image based on the fourth operation of the user, track the sound object in the image, and render the audio track corresponding to the sound object. This may assign a specific spatial orientation and specific motion to the sound object, so that interaction production between the user and audio is implemented, to provide new experience for the user.

Optionally, in a possible implementation of the second aspect, the music feature in the foregoing step includes at least one of: a music structure, a music emotion, and a singing mode.

Optionally, in a possible implementation of the second aspect, the foregoing step further includes: separating the second single-object audio track from the original audio track; determining a second sound source position of the second sound object based on reference information; and performing spatial rendering on the second single-object audio track based on the second sound source position, to obtain a rendered second single-object audio track.

In this possible implementation, at least two single-object audio tracks may be separated from the original audio track, and corresponding spatial rendering is performed. This enhances a capability for editing a specific sound object by the user in audio, and may be applied to object production of music or film and television works. In this way, controllability and playability of the user for music are increased.

A third aspect of this application provides a rendering device. The rendering device may be applied to a scenario such as production of music or film and television works, or the like. The rendering device includes:

an obtaining unit, configured to obtain a first single-object audio track based on a multimedia file, where the first single-object audio track corresponds to a first sound object;

a determining unit, configured to determine a first sound source position of the first sound object based on reference information, where the reference information includes reference position information and/or media information of the multimedia file, and the reference position information indicates the first sound source position; and a rendering unit, configured to perform spatial rendering on the first single-object audio track based on the first sound source position, to obtain a rendered first single-object audio track.

Optionally, in a possible implementation of the third aspect, the media information includes at least one of: text that needs to be displayed in the multimedia file, an image that needs to be displayed in the multimedia file, a music feature of music that needs to be played in the multimedia file, and a sound source type corresponding to the first sound object.

Optionally, in a possible implementation of the third aspect, the reference position information includes first position information of a sensor or second position information that is selected by a user.

Optionally, in a possible implementation of the third aspect, the determining unit is further configured to determine a type of a playing device, where the playing device is configured to play a target audio track, and the target audio track is obtained based on the rendered first single-object audio track. The rendering unit is specifically configured to perform spatial rendering on the first single-object audio track based on the first sound source position and the type of the playing device.

Optionally, in a possible implementation of the third aspect, the reference information includes the media information. When the media information includes the image and the image includes the first sound object, the determining unit is specifically configured to determine third position information of the first sound object in the image, where the third position information includes two-dimensional coordinates and a depth of the first sound object in the image.

The determining unit is specifically configured to obtain the first sound source position based on the third position information.

Optionally, in a possible implementation of the third aspect, the reference information includes the media information. When the media information includes the music feature of the music that needs to be played in the multimedia file, the determining unit is specifically configured to determine the first sound source position based on an association relationship and the music feature, where the association relationship indicates an association between the music feature and the first sound source position.

Optionally, in a possible implementation of the third aspect, the reference information includes the media information. When the media information includes the text that needs to be displayed in the multimedia file and the text includes position text related to a position, the determining unit is specifically configured to identify the position text. The determining unit is specifically configured to determine the first sound source position based on the position text.

Optionally, in a possible implementation of the third aspect, the reference information includes the reference position information. When the reference position information includes the first position information, the obtaining unit is further configured to obtain the first position information, where the first position information includes a first posture angle of the sensor and a distance between the sensor and a playing device. The determining unit is specifically configured to convert the first position information into the first sound source position.

Optionally, in a possible implementation of the third aspect, the reference information includes the reference position information. When the reference position information includes the first position information, the obtaining unit is further configured to obtain the first position information, where the first position information includes a second posture angle of the sensor and acceleration of the sensor. The determining unit is specifically configured to convert the first position information into the first sound source position.

Optionally, in a possible implementation of the third aspect, the reference information includes the reference position information. When the reference position information includes the second position information, the rendering device further includes: a providing unit, configured to provide a spherical view for the user to select, where a circle center of the spherical view is a position of the user, and a radius of the spherical view is a distance between the position of the user and a playing device. The obtaining unit is further configured to obtain the second position information selected by the user in the spherical view. The determining unit is specifically configured to convert the second position information into the first sound source position.

Optionally, in a possible implementation of the third aspect, the obtaining unit is specifically configured to separate the first single-object audio track from an original audio track in the multimedia file, where the original audio track is obtained by combining at least the first single-object audio track and a second single-object audio track, and the second single-object audio track corresponds to a second sound object.

Optionally, in a possible implementation of the third aspect, the obtaining unit is specifically configured to separate the first single-object audio track from the original audio track by using a trained separation network.

Optionally, in a possible implementation of the third aspect, the trained separation network is obtained by training the separation network by using training data as an input of the separation network and by using a value of a loss function less than a first threshold as a target. The training data includes a training audio track, the training audio track is obtained by combining at least an initial third single-object audio track and an initial fourth single-object audio track, the initial third single-object audio track corresponds to a third sound object, the initial fourth single-object audio track corresponds to a fourth sound object, the third sound object and the first sound object have a same type, and the second sound object and the fourth sound object have a same type. An output of the separation network includes a third single-object audio track obtained through separation. The loss function indicates a difference between the third single-object audio track obtained through separation and the initial third single-object audio track.

Optionally, in a possible implementation of the third aspect, if the playing device is a headset, the obtaining unit is specifically configured to obtain the rendered first single-object audio track according to the following formula:

$$\sum_s \int_{-\infty}^{t} a_s(t) h_{i,s}(t) o_s(\tau - t) d\tau$$

$$\sum_s \int_{-\infty}^{t} a_s(t) h_{i,s}(t) o_s(\tau - t) d\tau$$

represents the rendered first single-object audio track, S represents at least one sound object of the multimedia file and the at least one sound object includes the first sound object, i represents a left channel or a right channel, $a_s(t)$ represents an adjustment coefficient of the first sound object at a moment t, $h_{i,s}(t)$ represents a head-related transfer function HRTF filter coefficient that is of the left channel or the right channel corresponding to the first sound object and that is at the moment t, the HRTF filter coefficient is related to the first sound source position, $o_s(t)$ represents the first single-object audio track at the moment t, and τ represents an integration item.

Optionally, in a possible implementation of the third aspect, if the playing device is N loudspeaker devices, the obtaining unit is specifically configured to obtain the rendered first single-object audio track according to the following formula:

$$\sum_s a_s(t) g_s(t) o_s(t),$$

where $$g_s(t) = [\, r \cos\lambda \sin\Phi \quad r \sin\lambda \sin\Phi \quad r \cos\Phi \,] \begin{bmatrix} r_1 \cos\lambda_1 \sin\Phi_1 & r_1 \sin\lambda_1 \sin\Phi_1 & r_1 \cos\Phi_1 \\ \cdots & \cdots & \cdots \\ r_N \cos\lambda_N \sin\Phi_N & r_1 \sin\lambda_N \sin\Phi_N & r_N \cos\Phi_N \end{bmatrix}^{-1},$$

where $$r = \sqrt{\frac{\sum_{i=1}^{N} r_i^2}{N}}$$

-continued $$\sum_s a_s(t) g_s(t) o_s(t)$$

represents the rendered first single-object audio track, i represents an $i^{th}$ channel in a plurality of channels, S represents at least one sound object of the multimedia file and the at least one sound object includes the first sound object, $a_s(t)$ represents an adjustment coefficient of the first sound object at a moment t, $g_s(t)$ represents a translation coefficient of the first sound object at the moment t, $o_s(t)$ represents the first single-object audio track at the moment t, $\lambda_i$ represents an azimuth obtained when a calibrator calibrates an $i^{th}$ loudspeaker device, $\Phi_i$ represents an oblique angle obtained when the calibrator calibrates the $i^{th}$ loudspeaker device, $r_i$ represents a distance between the $i^{th}$ loudspeaker device and the calibrator, N is a positive integer, i is a positive integer, i≤N, and the first sound source position is in a tetrahedron formed by the N loudspeaker devices.

Optionally, in a possible implementation of the third aspect, the obtaining unit is further configured to obtain the target audio track based on the rendered first single-object audio track and an original audio track in the multimedia file. The rendering device further includes: a sending unit, configured to send the target audio track to the playing device, where the playing device is configured to play the target audio track.

Optionally, in a possible implementation of the third aspect, if the playing device is a headset, the obtaining unit is specifically configured to obtain the target audio track according to the following formula:

$$X_i^{3D}(t) = X_i(t) - \sum_{s \in S_1} o_s(t) + \sum_{s \in S_1 + S_2} \int_{-\infty}^{t} a_s(t) h_{i,s}(t) o_s(\tau - t) d\tau$$

i represents a left channel or a right channel, $$X_i^{3D}(t)$$

represents the target audio track at a moment t, $X_i(t)$ represents the original audio track at the moment t, $$\sum_{s \in S_1} o_s(t)$$

represents the first single-object audio track that is not rendered at the moment t, $$\sum_s \int_{-\infty}^{t} a_s(t) h_{i,s}(t) o_s(\tau - t) d\tau$$

represents the rendered first single-object audio track, $a_s(t)$ represents an adjustment coefficient of the first sound object at the moment t, $h_{i,s}(t)$ represents a head-related transfer function HRTF filter coefficient that is of the left channel or the right channel corresponding to the first sound object and that is at the moment t, the HRTF filter coefficient is related to the first sound source position, $o_s(t)$ represents the first single-object audio track at the moment t, $\tau$ represents an integration item, and $S_1$ represents a sound object that needs to be replaced in the original audio track; if the first sound object replaces the sound object in the original audio track, $S_1$ represents a null set; $S_2$ represents a sound object added in the target audio track compared with the original audio track, and if the first sound object is a duplicate of the sound object in the original audio track, $S_2$ represents a null set; and $S_1$ and/or $S_2$ represent/represents at least one sound object of the multimedia file and the at least one sound object includes the first sound object.

Optionally, in a possible implementation of the third aspect, if the playing device is N loudspeaker devices, the obtaining unit is specifically configured to obtain the target audio track according to the following formula:

$$X_i^{3D}(t) = X_i(t) - \sum_{s \in S_1} o_s(t) + \sum_{s \in S_1 + S_2} a_s(t) g_{i,s}(t) o_s(t), \text{ where}$$

$$g_s(t) = [r \cos\lambda \sin\Phi \;\; r \sin\lambda \sin\Phi \;\; r \cos\Phi]$$

$$\begin{bmatrix} r_1\cos\lambda_1 \sin\Phi_1 & r_1\sin\lambda_1 \sin\Phi_1 & r_1\cos\Phi_1 \\ \cdots & \cdots & \cdots \\ r_N\cos\lambda_N \sin\Phi_N & r_1\sin\lambda_N \sin\Phi_N & r_N\cos\Phi_N \end{bmatrix}^{-1},$$

where $$r = \sqrt{\frac{\sum_{i=1}^{N} r_i^2}{N}}$$

i represents an $i^{th}$ channel in a plurality of channels, $$X_i^{3D}(t)$$

represents the target audio track at a moment t, $X_i(t)$ represents the original audio track at the moment t, $$\sum_{s \in S_1} o_s(t)$$

represents the first single-object audio track that is not rendered at the moment t, $$\sum_s a_s(t) g_s(t) o_s(t)$$

represents the rendered first single-object audio track, $a_s(t)$ represents an adjustment coefficient of the first sound object at the moment t, $g_s(t)$ represents a translation coefficient of the first sound object at the moment t, $g_{i,s}(t)$ represents an $i^{th}$ row in $g_s(t)$, $o_s(t)$ represents the first single-object audio track at the moment t, and $S_1$ represents a sound object that needs to be replaced in the original audio track; if the first sound object replaces the sound object in the original audio track, $S_1$ represents a null set; $S_2$ represents a sound object added in the target audio track compared with the original audio track, and if the first sound object is a duplicate of the sound object in the original audio track, $S_2$ represents a null set; and $S_1$ and/or $S_2$ and/or represent/represents at least one sound object of the multimedia file and the at least one sound object includes the first sound object, represents an azimuth obtained when a calibrator calibrates an $i^{th}$ loudspeaker device, $\lambda_i$ represents an oblique angle obtained when the calibrator calibrates the $i^{th}$ loudspeaker device, $\Phi_i$ represents a distance between the $i^{th}$ loudspeaker device and the calibrator, N is a positive integer, $r_i$ is a positive integer, i≤N, and the first sound source position is in a tetrahedron formed by the N loudspeaker devices.

A fourth aspect of this application provides a rendering device. The rendering device may be applied to a scenario such as production of music or film and television works, or the like. The rendering device includes:

an obtaining unit, configured to obtain a multimedia file, where the obtaining unit is further configured to obtain a first single-object audio track based on the multimedia file, where the first single-object audio track corresponds to a first sound object;

a display unit, configured to display a user interface, where the user interface includes a rendering manner option; and a determining unit, configured to determine an automatic rendering manner or an interactive rendering manner from the rendering manner option in response to a first operation of a user in the user interface, where the obtaining unit is further configured to: when the determining unit determines the automatic rendering manner, obtain a rendered first single-object audio track in a preset manner; or the obtaining unit is further configured to: when the determining unit determines the interactive rendering manner, obtain reference position information in response to a second operation of the user, determine a first sound source position of the first sound object based on the reference position information, and render the first single-object audio track based on the first sound source position, to obtain a rendered first single-object audio track.

Optionally, in a possible implementation of the fourth aspect, the preset manner includes: The obtaining unit is further configured to obtain media information of the multimedia file; the determining unit is further configured to determine the first sound source position of the first sound object based on the media information; and the obtaining unit is further configured to render the first single-object audio track based on the first sound source position, to obtain the rendered first single-object audio track.

Optionally, in a possible implementation of the fourth aspect, the media information includes at least one of: text that needs to be displayed in the multimedia file, an image that needs to be displayed in the multimedia file, a music feature of music that needs to be played in the multimedia file, and a sound source type corresponding to the first sound object.

Optionally, in a possible implementation of the fourth aspect, the reference position information includes first position information of a sensor or second position information that is selected by the user.

Optionally, in a possible implementation of the fourth aspect, when the media information includes the image and the image includes the first sound object, the determining unit is specifically configured to present the image. The determining unit is specifically configured to determine third position information of the first sound object in the image, where the third position information includes two-dimensional coordinates and a depth of the first sound object in the image. The determining unit is specifically configured to obtain the first sound source position based on the third position information.

Optionally, in a possible implementation of the fourth aspect, the determining unit is specifically configured to determine the third position information of the first sound object in response to a third operation performed by the user on the image.

Optionally, in a possible implementation of the fourth aspect, when the media information includes the music feature of the music that needs to be played in the multimedia file, the determining unit is specifically configured to identify the music feature.

The determining unit is specifically configured to determine the first sound source position based on an association relationship and the music feature, where the association relationship indicates an association between the music feature and the first sound source position.

Optionally, in a possible implementation of the fourth aspect, when the media information includes the text that needs to be displayed in the multimedia file and the text includes position text related to a position, the determining unit is specifically configured to identify the position text. The determining unit is specifically configured to determine the first sound source position based on the position text.

Optionally, in a possible implementation of the fourth aspect, when the reference position information includes the first position information, the determining unit is specifically configured to obtain the first position information in response to a second operation performed by the user on the sensor, where the first position information includes a first posture angle of the sensor and a distance between the sensor and a playing device. The determining unit is specifically configured to convert the first position information into the first sound source position.

Optionally, in a possible implementation of the fourth aspect, when the reference position information includes the first position information, the determining unit is specifically configured to obtain the first position information in response to a second operation performed by the user on the sensor, where the first position information includes a second posture angle of the sensor and acceleration of the sensor. The determining unit is specifically configured to convert the first position information into the first sound source position.

Optionally, in a possible implementation of the fourth aspect, when the reference position information includes the second position information, the determining unit is specifically configured to present a spherical view, where a circle center of the spherical view is a position of the user, and a radius of the spherical view is a distance between the position of the user and a playing device. The determining unit is specifically configured to determine the second position information in the spherical view in response to the second operation of the user. The determining unit is specifically configured to convert the second position information into the first sound source position.

Optionally, in a possible implementation of the fourth aspect, the obtaining unit is specifically configured to determine the multimedia file from at least one stored multimedia file in response to a fourth operation of the user.

Optionally, in a possible implementation of the fourth aspect, the user interface further includes a playing device type option. The determining unit is further configured to determine a type of a playing device from the playing device type option in response to a fifth operation of the user. The obtaining unit is specifically configured to render the first single-object audio track based on the first sound source position and the type, to obtain the rendered first single-object audio track.

Optionally, in a possible implementation of the fourth aspect, the obtaining unit is specifically configured to separate the first single-object audio track from an original audio track in the multimedia file, where the original audio track is obtained by combining at least the first single-object audio track and a second single-object audio track, and the second single-object audio track corresponds to a second sound object.

Optionally, in a possible implementation of the fourth aspect, the music feature includes at least one of: a music structure, a music emotion, and a singing mode.

Optionally, in a possible implementation of the fourth aspect, the obtaining unit is further configured to: separate the second single-object audio track from the multimedia file; determine a second sound source position of the second sound object; and perform spatial rendering on the second single-object audio track based on the second sound source position, to obtain a rendered second single-object audio track.

A fifth aspect of this application provides a rendering device. The rendering device performs the method in any one of the first aspect or the possible implementations of the first aspect, or performs the method in any one of the second aspect or the possible implementations of the second aspect.

A sixth aspect of this application provides a rendering device, including a processor. The processor is coupled to a memory. The memory is configured to store a program or instructions. When the program or the instructions are executed by the processor, the rendering device is enabled to implement the method in any one of the first aspect or the possible implementations of the first aspect, or the rendering device is enabled to implement the method in any one of the second aspect or the possible implementations of the second aspect.

A seventh aspect of this application provides a computer-readable medium. The computer-readable medium stores a computer program or instructions. When the computer program or the instructions are run on a computer, the computer is enabled to perform the method in any one of the first aspect or the possible implementations of the first aspect, or the computer is enabled to perform the method in any one of the second aspect or the possible implementations of the second aspect.

An eighth aspect of this application provides a computer program product. When the computer program product is executed on a computer, the computer is enabled to perform the method in any one of the first aspect or the possible implementations of the first aspect, or perform the method in any one of the second aspect or the possible implementations of the second aspect.

For technical effects brought by any one of the third aspect, the fifth aspect, the sixth aspect, the seventh aspect, or the eighth aspect, or the possible implementations of the third aspect, the fifth aspect, the sixth aspect, the seventh aspect, or the eighth aspect, refer to the technical effects brought by the first aspect or different possible implementations of the first aspect. Details are not described herein again.

For technical effects brought by any one of the fourth aspect, the fifth aspect, the sixth aspect, the seventh aspect, or the eighth aspect, or the possible implementations of the fourth aspect, the fifth aspect, the sixth aspect, the seventh aspect, or the eighth aspect, refer to the technical effects brought by the second aspect or different possible implementations of the second aspect. Details are not described herein again.

It can be learned from the foregoing technical solutions that, embodiments of this application have the following advantages: The first single-object audio track is obtained based on the multimedia file, where the first single-object audio track corresponds to the first sound object; the first sound source position of the first sound object is determined based on the reference information; and spatial rendering is performed on the first single-object audio track based on the first sound source position, to obtain the rendered first single-object audio track. A stereo spatial sense of the first single-object audio track corresponding to the first sound object in the multimedia file can be improved, so that immersive stereo sound effect is provided for the user.

BRIEF DESCRIPTION OF DRAWINGS

To describe the technical solutions in embodiments of the present disclosure more clearly, the following briefly describes the accompanying drawings for describing the embodiments. It is clear that, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
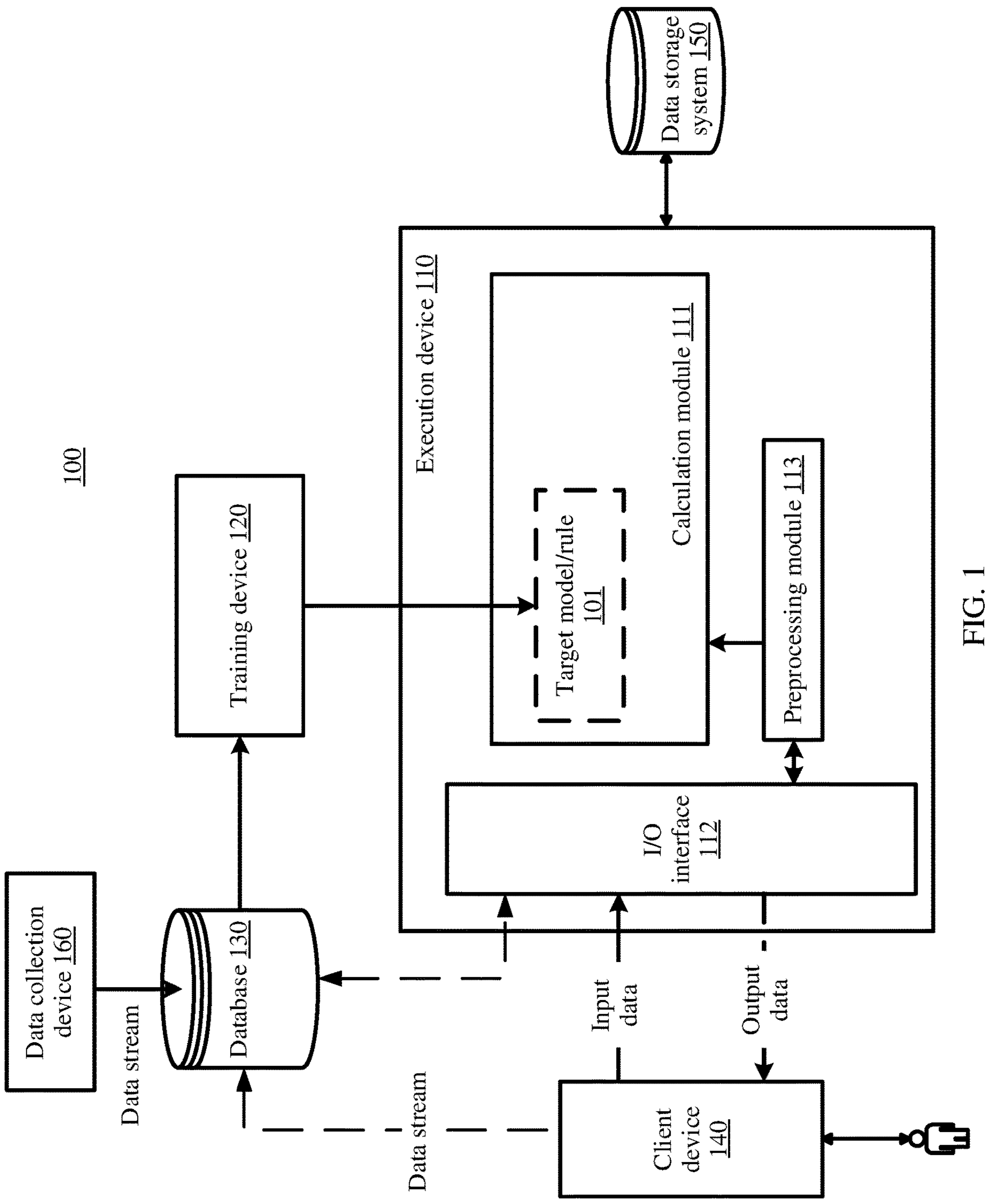
FIG. 1 is a schematic diagram of a system architecture according to this application.

Embodiments of this application provide a rendering method, to improve a stereo spatial sense of a first single-object audio track corresponding to a first sound object in a multimedia file, and provide immersive stereo sound effect for a user.

The following describes the technical solutions in embodiments of the present disclosure with reference to the accompanying drawings in embodiments of the present disclosure. It is clear that the described embodiments are merely a part rather than all of embodiments of the present disclosure. All other embodiments obtained by a person of ordinary skill in the art based on embodiments of the present disclosure without creative efforts shall fall within the protection scope of the present disclosure.

For ease of understanding, mainly related terms and concepts in embodiments of this application are first described below.

1. Neural Network

The neural network may include a neuron. The neuron may be an operation unit that uses X and an intercept of 1 as an input. An output of the operation unit may be as follows:

$$h_{W,b}(x) = f(W^T x) = f\left(\sum_{s=1}^{n} W_s x_s + b\right)$$

s=1, 2, . . . , or n. n is a natural number greater than 1. $W_s$ represents a weight of $X_s$. b represents a bias of the neuron. f represents an activation function (activation function) of the neuron, used to introduce a nonlinear feature into the neural network, to convert an input signal in the neuron into an output signal. The output signal of the activation function may be used as an input of a next convolutional layer. The activation function may be a sigmoid function. The neural network is a network formed by connecting many single neurons together. To be specific, an output of a neuron may be an input of another neuron. An input of each neuron may be connected to a local receptive field of a previous layer, to extract a feature of the local receptive field. The local receptive field may be a region including several neurons.

2. Deep Neural Network

The deep neural network (DNN) is also referred to as a multi-layer neural network, and may be understood as a neural network having a plurality of hidden layers. There is no special metric for "a plurality of" herein. The DNN is divided based on positions of different layers, and a neural network in the DNN may be divided into three types: an input layer, a hidden layer, and an output layer. Generally, a first layer is the input layer, a last layer is the output layer, and a middle layer is the hidden layer. Layers are fully connected. To be specific, any neuron at an $i^{th}$ layer is necessarily connected to any neuron at an $(i+1)^{th}$ layer. Certainly, the deep neural network may not include a hidden layer. This is not specifically limited herein.

Work at each layer in the deep neural network may be described by using a mathematical expression $\vec{y}=\alpha(W\vec{x}+\vec{b})$. From a perspective of a physical layer, the work at each layer in the deep neural network may be understood as completing transformation from input space to output space (that is, from row space to column space of a matrix) by performing five operations on the input space (a set of input vectors). The five operations include: 1. dimension increase/dimension reduction; 2. scaling up/scaling down; 3. rotation; 4. translation; and 5. "bending". The operations 1, 2, and 3 are completed by $W\vec{x}$, the operation 4 is completed by $+\vec{b}$, and the operation 5 is implemented by $\alpha(\ )$. The word "space" is used herein for expression because a classified object is not a single thing, but a type of things. Space is a collection of all individuals of such type of things. W represents a weight vector, and each value in the vector indicates a weight value of a neuron in the neural network at this layer. The vector W determines the space transformation from the input space to the output space described above, that is, a weight W of each layer controls how to transform space. An objective of training the deep neural network is to finally obtain a weight matrix (a weight matrix formed by vectors W at a plurality of layers) of all layers of a trained neural network. Therefore, a training process of the neural network is essentially a manner of learning control of space transformation, and more specifically, learning a weight matrix.

3. Convolutional Neural Network

The convolutional neural network (CNN) is a deep neural network having a convolutional structure. The convolutional neural network includes a feature extractor including a convolutional layer and a sampling sublayer. The feature extractor may be considered as a filter. A convolution process may be considered as performing convolution on an input image or a convolutional feature plane (feature map) by using a same trainable filter. The convolutional layer is a neuron layer that is in the convolutional neural network and that performs convolution processing on an input signal. At the convolutional layer of the convolutional neural network, one neuron may be connected only to a part of adjacent-layer neurons. One convolutional layer usually includes several feature planes, and each feature plane may include some neurons that are arranged in a rectangular shape. Neurons in a same feature plane share a weight, and the weight shared herein is a convolution kernel. Weight sharing may be understood as that an image information extraction manner is irrelevant to a position. A principle implied herein is that statistical information of a part of an image is the same as that of another part. This means that image information learned from a part can also be used in another part. Therefore, same image information obtained through learning can be used for all positions in the image. At a same convolutional layer, a plurality of convolution kernels may be used to extract different image information. Usually, a larger quantity of convolution kernels indicates richer image information reflected through a convolution operation.

The convolution kernel may be initialized in a form of a random-size matrix. In a process of training the convolutional neural network, the convolution kernel may obtain an appropriate weight through learning. In addition, benefits directly brought by weight sharing are that connections between layers of the convolutional neural network are reduced and an overfitting risk is also reduced. In embodiments of this application, networks such as a separation network, an identification network, a detection network, and a deep estimation network, and the like may be all CNNs.

4. Recurrent Neural Network (RNN)

In a conventional neural network model, layers are fully connected, and nodes between layers are not connected. However, this common neural network cannot resolve many problems. For example, a problem of predicting a next word of a sentence cannot be resolved, because previous and next words in the sentence are not independent, and the previous word usually needs to be used. The recurrent neural network (RNN) means that a current output of a sequence is related to a previous output. A specific representation form is that the network memorizes previous information, stores the information in an internal state parameter of the network, and applies the information to current output calculation.

5. Loss Function

In a process of training the deep neural network, because it is expected that an output of the deep neural network is as close as possible to a value that is actually expected to be predicted, a current predicted value of the network may be compared with a target value that is actually expected, and then a matrix vector at each layer of the neural network is updated based on a difference between the current predicted value and the target value (there is usually an initialization process before the first update, that is, a parameter is preconfigured for each layer of the neural network). For example, if the predicted value of the network is large, the matrix vector is adjusted to lower the predicted value, and adjustment is continuously performed until the neural network can predict the target value that is actually expected. Therefore, "how to obtain a difference between the predicted value and the target value through comparison" needs to be predefined. This is a loss function (loss function) or an objective function (objective function). The loss function and the objective function are important equations for measuring the difference between the predicted value and the target value. The loss function is used as an example. A larger output value (loss) of the loss function indicates a larger difference. Therefore, training of the deep neural network is a process of minimizing the loss as much as possible.

6. Head-Related Transfer Function

Head-related transfer function (HRTF): A sound wave sent by a sound source reaches two ears after being scattered by the head, auricles, the trunk, and the like. A physical process may be considered as a linear time-invariant acoustic filtering system, and features of the process may be described by using the HRTF. In other words, the HRTF describes the process of transmitting the sound wave from the sound source to the two ears. A more vivid explanation is as follows: If an audio signal sent by the sound source is X, and a corresponding audio signal after the audio signal X is transmitted to a preset position is Y, $X*Z=Y$ (convolution of X and Z is equal to Y), where Z represents the HRTF.

7. Audio Track

The audio track is a track for recording audio data. Each audio track has one or more attribute parameters. The attribute parameters include an audio format, a bit rate, a dubbing language, a sound effect, a quantity of channels, volume, and the like. When the audio data is multi-audio track data, two different audio tracks have at least one different attribute parameter, or at least one attribute parameter of two different audio tracks has a different value. The audio track may be a single audio track or a multi-audio track (also referred to as a mixed audio track). The single audio track may correspond to one or more sound objects, and the multi-audio track includes at least two single audio tracks. Generally, one single-object audio track corresponds to one sound object.

8. Short-Time Fourier Transform

A core idea of the short-time Fourier transform (STFT) is "windowing", to be specific, dividing an entire time domain process into numerous small processes of an equal length, where each small process is approximately stable, and then performing fast Fourier transform (FFT) on each small process.

The following describes a system architecture provided in embodiments of this application.

Refer to FIG. 1. An embodiment of the present disclosure provides a system architecture 100. As shown in the system architecture 100, a data collection device 160 is configured to collect training data. In this embodiment of this application, the training data includes a multimedia file, the multimedia file includes an original audio track, and the original audio track corresponds to at least one sound object. The training data is stored in a database 130. A training device 120 obtains a target model/rule 101 through training based on the training data maintained in the database 130. The following uses Embodiment 1 to describe in more detail how the training device 120 obtains the target model/rule 101 based on the training data. The target model/rule 101 can be used to implement a rendering method provided in embodiments of this application. The target model/rule 101 has a plurality of cases. In a case of the target model/rule 101 (when the target model/rule 101 is a first model), a first single-object audio track corresponding to a first sound object may be obtained by inputting the multimedia file into the target model/rule 101. In another case of the target model/rule 101 (when the target model/rule 101 is a second model), a first single-object audio track corresponding to a first sound object may be obtained by inputting the multimedia file into the target model/rule 101 after related preprocessing. The target model/rule 101 in this embodiment of this application may specifically include a separation network, and may further include an identification network, a detection network, a deep estimation network, and the like. This is not specifically limited herein. In this embodiment provided in this application, the separation network is obtained through training by using training data. It should be noted that, in actual application, the training data maintained in the database 130 is not necessarily all collected by the data collection device 160, or may be received from another device. It should be further noted that the training device 120 may not necessarily train the target model/rule 101 completely based on the training data maintained in the database 130, or may obtain training data from a cloud or another place to perform model training. The foregoing description should not be construed as a limitation on this embodiment of this application.

The target model/rule 101 obtained through training by the training device 120 may be applied to different systems or devices, for example, an execution device 110 shown in FIG. 1. The execution device 110 may be a terminal, for example, a mobile phone terminal, a tablet computer, a laptop computer, augmented reality (AR)/virtual reality (VR), or a vehicle-mounted terminal, or may be a server, a cloud, or the like. In FIG. 1, the execution device 110 is configured with an I/O interface 112, configured to exchange data with an external device. A user may input data into the I/O interface 112 by using a client device 140. In this embodiment of this application, the input data may include the multimedia file, and may be input by the user, or may be uploaded by the user by using an audio device, or certainly may be from the database. This is not specifically limited herein.

A preprocessing module 113 is configured to perform preprocessing based on the multimedia file received by the I/O interface 112. In this embodiment of this application, the preprocessing module 113 may be configured to perform short-term Fourier transform processing on an audio track in the multimedia file, to obtain a spectrogram.

In a process in which the execution device 110 preprocesses the input data, or in a process in which a calculation module 111 of the execution device 110 performs related processing such as calculation and the like, the execution device 110 may invoke data, code, and the like in a data storage system 150 for corresponding processing, and may store, in the data storage system 150, data, instructions, and the like that are obtained through corresponding processing.

Finally, the I/O interface 112 returns a processing result, for example, the foregoing obtained first single-object audio track corresponding to the first sound object, to the client device 140, so as to provide the processing result for the user.

It should be noted that the training device 120 may generate corresponding target models/rules 101 for different targets or different tasks based on different training data. The corresponding target models/rules 101 may be used to implement the foregoing targets or complete the foregoing tasks, to provide a required result for the user.

In a case shown in FIG. 1, the user may manually provide input data in an interface provided by the I/O interface 112. In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may alternatively be used as a data collection end, to collect, as new sample data, input data that is input into the I/O interface 112 and an output result that is output from the I/O interface 112 that are shown in the figure, and store the new sample data in the database 130. Certainly, the client device 140 may alternatively not perform collection. Instead, the I/O interface 112 directly stores, in the database 130 as new sample data, the input data input into the I/O interface 112 and the output result output from the I/O interface 112 that are shown in the figure.

It should be noted that FIG. 1 is merely a schematic diagram of a system architecture according to an embodiment of the present disclosure. A position relationship between a device, a component, a module, and the like shown in the figure constitutes no limitation. For example, in FIG. 1, the data storage system 150 is an external memory relative to the execution device 110. In another case, the data storage system 150 may alternatively be disposed in the execution device 110.

As shown in FIG. 1, the target model/rule 101 is obtained through training by the training device 120. The target model/rule 101 may be the separation network in this embodiment of this application. Specifically, in networks provided in this embodiment of this application, the separation network may be a convolutional neural network or a recurrent neural network.

Figure 2:
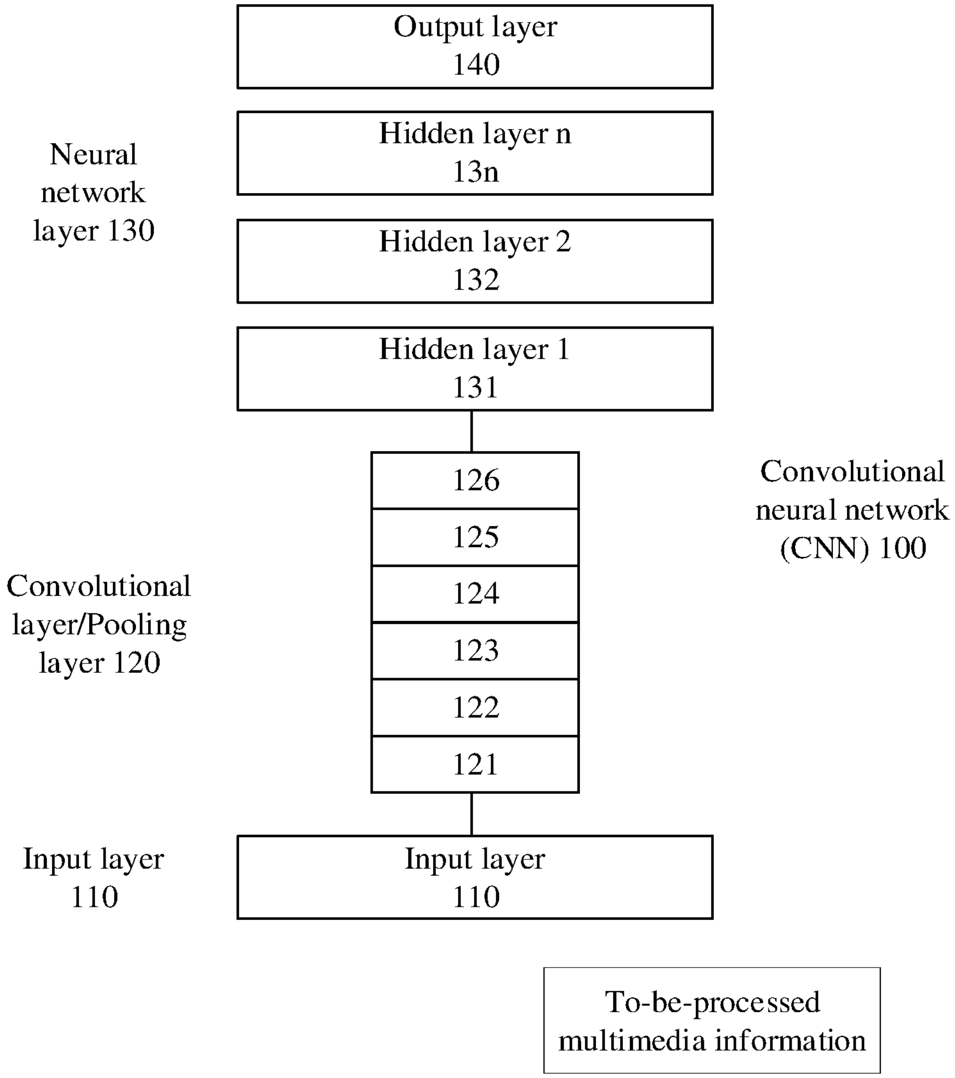
FIG. 2 is a schematic diagram of a structure of a convolutional neural network according to this application.

Because the CNN is a common neural network, the following focuses on a structure of the CNN in detail with reference to FIG. 2. As described in the description about the foregoing basic concepts, the convolutional neural network is a deep neural network having a convolutional structure, and is a deep learning (deep learning) architecture. In the deep learning architecture, multi-layer learning is performed at different abstract levels by using a machine learning algorithm. As a deep learning architecture, the CNN is a feed-forward (feed-forward) artificial neural network. Neurons in the feed-forward artificial neural network may respond to an image input into the feed-forward artificial neural network.

As shown in FIG. 2, a convolutional neural network (CNN) 100 may include an input layer 110, a convolutional layer/pooling layer 120, and a neural network layer 130. The pooling layer is optional.

Convolutional Layer/Pooling Layer 120

Convolutional Layer

As shown in FIG. 2, for example, the convolutional layer/pooling layer 120 may include layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layer 121 and the layer 122 are convolutional layers, the layer 123 is a pooling layer, the layer 124 and the layer 125 are convolutional layers, and the layer 126 is a pooling layer. That is, an output of a convolutional layer may be used as an input of a subsequent pooling layer, or may be used as an input of another convolutional layer to continue a convolution operation.

The convolutional layer 121 is used as an example. The convolutional layer 121 may include a plurality of convolution operators. The convolution operator is also referred to as a kernel. In image processing, the convolution operator functions as a filter that extracts specific information from an input image matrix. The convolution operator may be essentially a weight matrix, and the weight matrix is usually predefined. In a process of performing a convolution operation on an image, the weight matrix is usually used to process pixels at a granularity level of one pixel (or two pixels or the like, which depends on a value of a stride stride) in a horizontal direction on the input image, to extract a specific feature from the image. A size of the weight matrix should be related to a size of the image. It should be noted that a depth dimension (depth dimension) of the weight matrix is the same as a depth dimension of the input image. In a process of performing a convolution operation, the weight matrix extends to an entire depth of the input image. Therefore, a convolution output of a single depth dimension is generated by performing convolution with a single weight matrix. However, in most cases, a plurality of weight matrices having a same dimension rather than the single weight matrix are used. Outputs of the weight matrices are stacked to form a depth dimension of a convolutional image. Different weight matrices may be used to extract different features of the image. For example, one weight matrix is used to extract edge information of the image, another weight matrix is used to extract a specific color of the image, still another weight matrix is used to blur an unwanted noise in the image, and so on. Because the plurality of weight matrices have the same dimension, feature maps extracted by using the plurality of weight matrices having the same dimension also have a same dimension. Then, the plurality of extracted feature maps having the same dimension are combined to form an output of the convolution operation.

Weight values in the weight matrices need to be obtained through massive training in actual application. The weight matrices formed by using the weight values obtained through training may be used to extract information from the input picture, to help the convolutional neural network 100 perform correct prediction.

When the convolutional neural network 100 includes a plurality of convolutional layers, a large quantity of general features are usually extracted at an initial convolutional layer (for example, the convolutional layer 121). The general feature may be also referred to as a low-level feature. As a depth of the convolutional neural network 100 increases, a feature extracted at a more subsequent convolutional layer (for example, the convolutional layer 126) is more complex, for example, a high-level semantic feature. A feature with higher semantics is more applicable to a to-be-resolved problem.

Pooling Layer

Because a quantity of training parameters usually needs to be reduced, the pooling layer usually needs to be periodically introduced after a convolutional layer. To be specific, for the layers 121 to 126 in the convolutional layer/pooling layer 120 shown in FIG. 2, one convolutional layer may be followed by one pooling layer, or a plurality of convolutional layers may be followed by one or more pooling layers. In an image processing process, the pooling layer is only used to reduce a space size of an image. The pooling layer may include an average pooling operator and/or a maximum pooling operator, to perform sampling on the input image to obtain an image with a small size. The average pooling operator may calculate a pixel value in the image in a specific range, to generate an average value. The maximum pooling operator may be used to select a pixel with a maximum value in a specific range as a maximum pooling result. In addition, similar to a case in which a size of a weight matrix in the convolutional layer should be related to a size of the image, an operator in the pooling layer should also be related to the size of the image. A size of an image output after processing at the pooling layer may be less than a size of an image input into the pooling layer. Each pixel in the image output from the pooling layer represents an average value or a maximum value of a corresponding sub-region of the image input into the pooling layer.

Neural Network Layer 130

After processing performed at the convolutional layer/pooling layer 120, the convolutional neural network 100 is not ready to output required output information. As described above, at the convolutional layer/pooling layer 120, only a feature is extracted, and parameters resulting from an input image are reduced. However, to generate final output information (required class information or other related information), the convolutional neural network 100 needs to use the neural network layer 130 to generate an output of one required class or outputs of a group of required classes. Therefore, the neural network layer 130 may include a plurality of hidden layers (131, 132, . . . , and 13$n$ shown in FIG. 2) and an output layer 140. Parameters included in the plurality of hidden layers may be obtained through pre-training based on related training data of a specific task type. For example, the task type may include multi-audio track separation, image recognition, image classification, super-resolution image reconstruction, and the like.

The plurality of hidden layers in the neural network layer 130 are followed by the output layer 140, namely, the last layer of the entire convolutional neural network 100. The output layer 140 has a loss function similar to classification cross entropy, and the loss function is specifically used to calculate a prediction error. Once forward propagation (for example, propagation from the layer 110 to the layer 140 in FIG. 2 is forward propagation) of the entire convolutional neural network 100 is completed, back propagation (for example, propagation from the layer 140 to the layer 110 in FIG. 2 is back propagation) is started to update weight values and deviations of the layers mentioned above, to reduce a loss of the convolutional neural network 100 and an error between a result output by the convolutional neural network 100 through the output layer and an ideal result.

Figure 3:
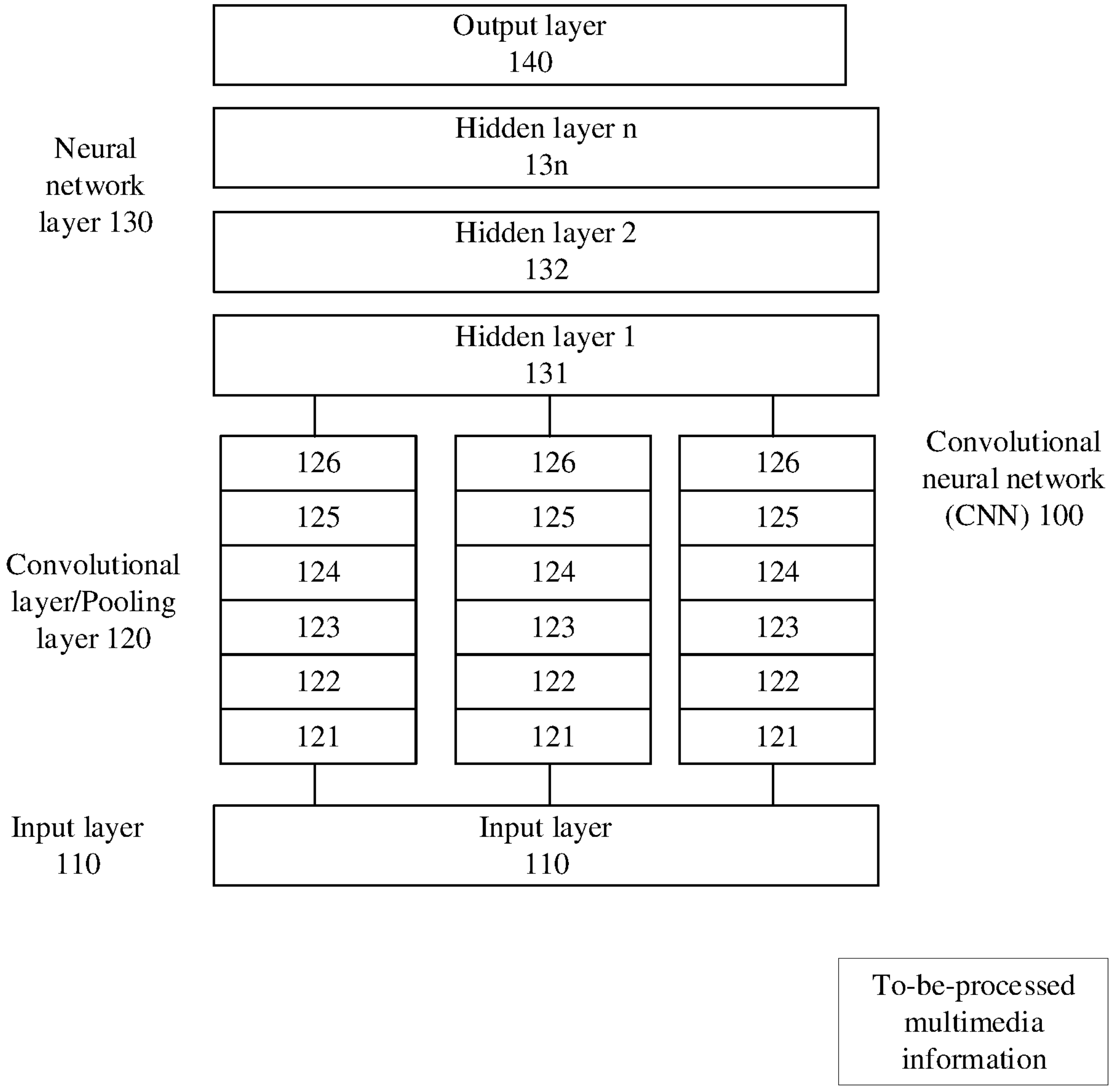
FIG. 3 is a schematic diagram of a structure of another convolutional neural network according to this application.

It should be noted that the convolutional neural network 100 shown in FIG. 2 is merely used as an example of a convolutional neural network. In specific application, the convolutional neural network may alternatively exist in a form of another network model, for example, a network model in which a plurality of convolutional layers/pooling layers are parallel as shown in FIG. 3, and extracted features are all input into the neural network layer 130 for processing.

The following describes a hardware structure of a chip provided in embodiments of this application.

Figure 4:
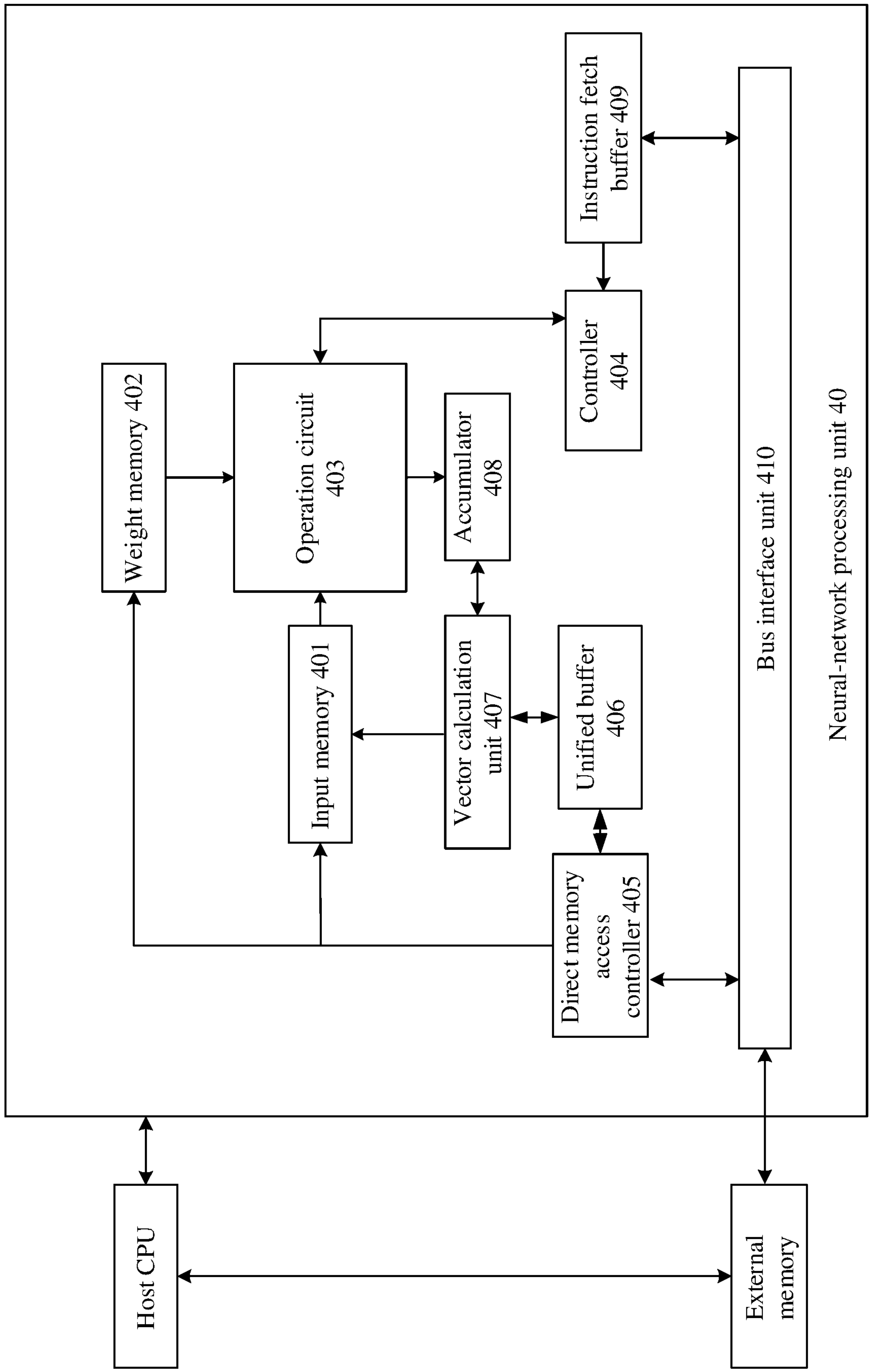
FIG. 4 is a schematic diagram of a hardware structure of a chip according to this application.

FIG. 4 shows a hardware structure of a chip provided in an embodiment of the present disclosure. The chip includes a neural-network processing unit 40. The chip may be disposed in the execution device 110 shown in FIG. 1, to complete calculation work of the calculation module 111. The chip may alternatively be disposed in the training device 120 shown in FIG. 1, to complete training work of the training device 120 and output the target model/rule 101. All algorithms of the layers in the convolutional neural network shown in FIG. 2 may be implemented in the chip shown in FIG. 4.

The neural-network processing unit 40 may be any processor suitable for large-scale exclusive OR operation processing, for example, a neural-network processing unit (NPU), a tensor processing unit (TPU), a graphics processing unit (GPU), or the like. The NPU is used as an example. The neural-network processing unit NPU 40 is mounted on a host central processing unit (CPU) (host CPU) as a coprocessor. The host CPU assigns a task. A core part of the NPU is an operation circuit 403, and a controller 404 controls the operation circuit 403 to fetch data in a memory (a weight memory or an input memory) and perform an operation.

In some implementations, the operation circuit 403 includes a plurality of processing engines (PEs) inside. In some implementations, the operation circuit 403 is a two-dimensional systolic array. The operation circuit 403 may alternatively be a one-dimensional systolic array, or another electronic circuit that can perform mathematical operations such as multiplication and addition. In some implementations, the operation circuit 403 is a general-purpose matrix processor.

For example, it is assumed that there is an input matrix A, a weight matrix B, and an output matrix C. The operation circuit fetches data corresponding to the matrix B from a weight memory 402, and buffers the data on each PE in the operation circuit. The operation circuit fetches data of the matrix A from an input memory 401, performs a matrix operation on the matrix B and the data of the matrix A, and stores an obtained partial result or final result of the matrix into an accumulator 408.

A vector calculation unit 407 may perform further processing on an output of the operation circuit, for example, vector multiplication, vector addition, an exponential operation, a logarithmic operation, size comparison, and the like. For example, the vector calculation unit 407 may be configured to perform network computing, such as pooling (Pooling), batch normalization (Batch Normalization), local response normalization (Local Response Normalization), or the like, at a non-convolution/non-FC layer in a neural network.

In some implementations, the vector calculation unit 407 can store a processed output vector into a unified buffer 406. For example, the vector calculation unit 407 may apply a non-linear function to the output of the operation circuit 403, for example, a vector of an accumulated value, to generate an activation value. In some implementations, the vector calculation unit 407 generates a normalized value, a combined value, or both a normalized value and a combined value. In some implementations, the processed output vector can be used as an activation input for the operation circuit 403, for example, to be used in a subsequent layer in the neural network.

The unified buffer 406 is configured to store input data and output data.

A direct memory access controller (DMAC) 405 transfers input data in an external memory to the input memory 401 and/or the unified buffer 406, stores weight data in the external memory into the weight memory 402, and stores data in the unified buffer 406 into the external memory.

A bus interface unit (BIU) 410 is configured to implement interaction between the host CPU, the DMAC, and an instruction fetch buffer 409 through a bus.

The instruction fetch buffer (instruction fetch buffer) 409 connected to the controller 404 is configured to store instructions used by the controller 404.

The controller 404 is configured to invoke the instructions buffered in the instruction fetch buffer 409, to control a working process of an operation accelerator.

Usually, the unified buffer 406, the input memory 401, the weight memory 402, and the instruction fetch buffer 409 each are an on-chip (On-Chip) memory. The external memory is a memory outside the NPU. The external memory may be a double data rate synchronous dynamic random access memory (double data rate synchronous dynamic random access memory, DDR SDRAM), a high bandwidth memory (HBM), or another readable and writable memory.

An operation at each layer in the convolutional neural network shown in FIG. 2 or FIG. 3 may be performed by the operation circuit 403 or the vector calculation unit 407.

The following describes in detail a separation network training method and a rendering method in embodiments of this application with reference to the accompanying drawings.

First, the separation network training method in embodiments of this application is described in detail with reference to FIG. 5. The method shown in FIG. 5 may be executed by a training apparatus of a separation network. The training apparatus of the separation network may be a cloud service device, or may be a terminal device, for example, an apparatus having an operation capability sufficient to perform the separation network training method, such as a computer, a server, or the like, or may be a system including a cloud service device and a terminal device. For example, the training method may be performed by the training device 120 in FIG. 1 or the neural-network processing unit 40 in FIG. 4.

Optionally, the training method may be processed by a CPU, or may be processed by both a CPU and a GPU; or no GPU may be used, but another processor suitable for neural network computation is used. This is not limited in this application.

It may be understood that, in this embodiment of this application, if there are a plurality of sound objects corresponding to an original audio track in a multimedia file, separation may be performed on the original audio track by using the separation network, to obtain at least one single-object audio track. Certainly, if the original audio track in the multimedia file corresponds to only one sound object, the original audio track is a single-object audio track, and separation does not need to be performed by using the separation network.

The training method may include step 501 and step 502. The following describes step 501 and step 502 in detail.

Step 501: Obtain training data.

In this embodiment of this application, the training data is obtained by combining at least an initial third single-object audio track and an initial fourth single-object audio track. Alternatively, it may be understood that the training data includes a multi-audio track obtained by combining single-object audio tracks corresponding to at least two sound objects. The initial third single-object audio track corresponds to a third sound object, and the initial fourth single-object audio track corresponds to a fourth sound object. In addition, the training data may further include an image matching the original audio track. The training data may alternatively be the multimedia file, and the multimedia file includes the foregoing multi-audio track. In addition to the audio track, the multimedia file may further include a video track, a text track (or referred to as a bullet screen track), and the like. This is not specifically limited herein.

An audio track (the original audio track, a first single-object audio track, or the like) in this embodiment of this application may include an audio track generated by a sound object (or referred to as a sound-emitting object), such as a human sound track, a musical instrument track (for example, a drum track, a piano track, a trumpet track, or the like), an airplane sound, or the like. A specific sound object corresponding to the audio track is not limited herein.

In this embodiment of this application, the training data may be obtained by directly recording a sound made by a sound object, or may be obtained by inputting audio information and video information by a user, or may be received from a capturing device. In actual application, the training data may be obtained in another manner. A manner of obtaining the training data is not specifically limited herein.

Step 502: Train the separation network by using the training data as an input of the separation network and by using a value of a loss function less than a first threshold as a target, to obtain a trained separation network.

The separation network in this embodiment of this application may be referred to as a separation neural network, or may be referred to as a separation model, or may be referred to as a separation neural network model. This is not specifically limited herein.

The loss function indicates a difference between a third single-object audio track obtained through separation and the initial third single-object audio track.

In this case, the separation network is trained to reduce the value of the loss function, that is, to continuously reduce the difference between the third single-object audio track output by the separation network and the initial third single-object audio track. The training process may be understood as a separation task. The loss function may be understood as a loss function corresponding to the separation task. An output (at least one single-object audio track) of the separation network is a single-object audio track corresponding to at least one sound object in the input (the audio track). The third sound object and a first sound object have a same type, and a second sound object and the fourth sound object have a same type. For example, both the first sound object and the third sound object correspond to human sounds, but the first sound object may be user A, and the third sound object may be user B. In other words, the third single-object audio track and the first single-object audio track are audio tracks corresponding to sounds made by different persons. In this embodiment of this application, the third sound object and the first sound object may be two sound objects of a same type, or may be one sound object of a same type. This is not specifically limited herein.

Optionally, the training data input into the separation network includes original audio tracks corresponding to at least two sound objects. The separation network may output a single-object audio track corresponding to one of the at least two sound objects, or may output a single-object audio track corresponding to each of the at least two sound objects.

For example, the multimedia file includes an audio track corresponding to a human sound, an audio track corresponding to a piano, and an audio track corresponding to a vehicle sound. After separation is performed on the multimedia file by using the separation network, one single-object audio track (for example, a single-object audio track corresponding to the human sound), two single-object audio tracks (for example, a single-object audio track corresponding to the human sound and a single-object audio track corresponding to the vehicle sound), or three single-object audio tracks may be obtained.

Figure 6:
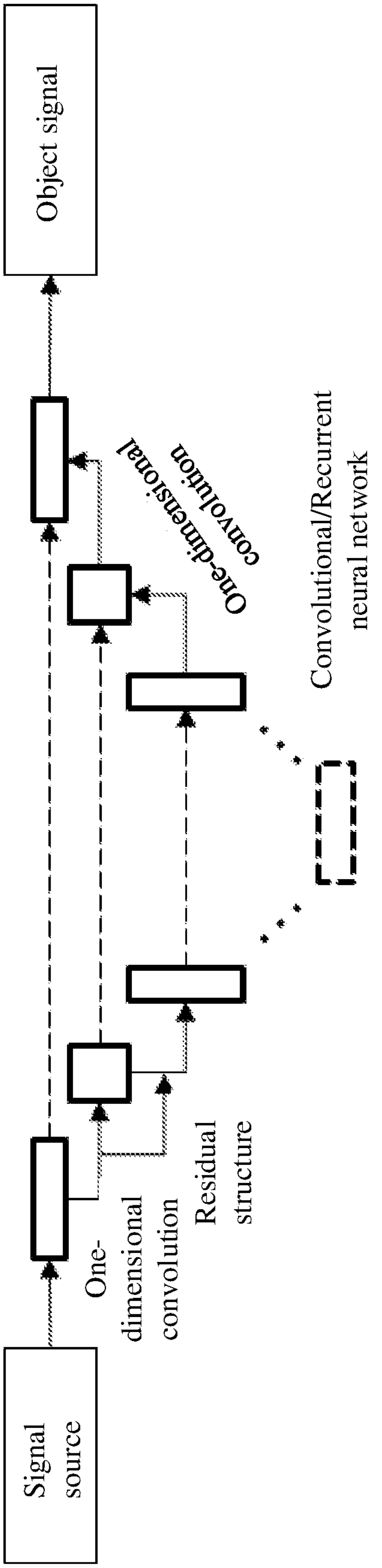
FIG. 6 is a schematic diagram of a structure of a separation network according to this application.

In a possible implementation, the separation network is shown in FIG. 6, and the separation network includes one-dimensional convolution and a residual structure. Addition of the residual structure can improve gradient transfer efficiency. Certainly, the separation network may further include activation, pooling, and the like. A specific structure of the separation network is not limited herein. For the separation network shown in FIG. 6, a signal source (that is, a signal corresponding to an audio track in the multimedia file) is used as an input, and transform is performed through a plurality of times of convolution and deconvolution, to output an object signal (a single audio track corresponding to a sound object). In addition, a recurrent neural network module may be added to improve a time sequence correlation, and different output layers may be connected to improve a relationship between a high-dimensional feature and a low-dimensional feature.

Figure 7:
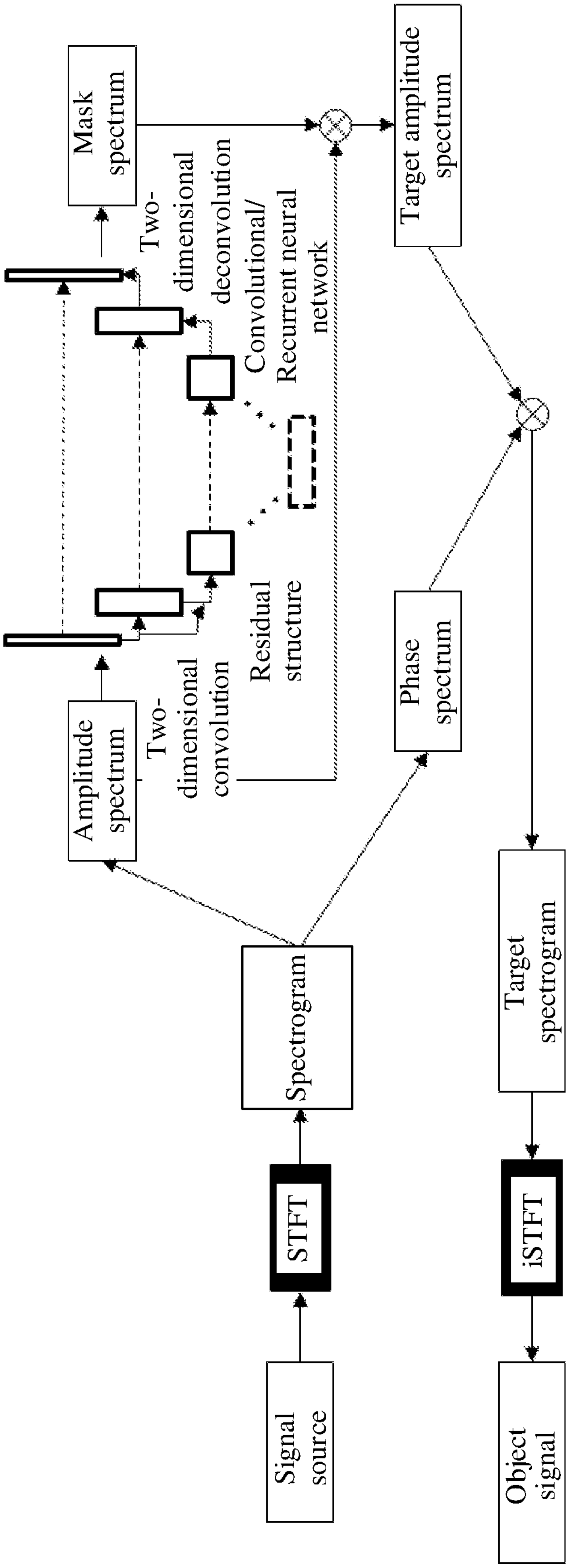
FIG. 7 is a schematic diagram of a structure of another separation network according to this application.

In another possible implementation, the separation network is shown in FIG. 7. Before a signal source is input into the separation network, the signal source may be first preprocessed, for example, STFT mapping processing is performed on the signal source, to obtain a spectrogram. Transform is performed on an amplitude spectrum in the spectrogram through two-dimensional convolution and deconvolution, to obtain a mask spectrum (a spectrum obtained through screening). The mask spectrum and the amplitude spectrum are combined to obtain a target amplitude spectrum. Then, the target amplitude spectrum is multiplied by a phase spectrum to obtain a target spectrogram. Inverse short-time Fourier transform (iSTFT) mapping is performed on the target spectrogram to obtain an object signal (a single audio track corresponding to a sound object). Different output layers may also be connected to improve a relationship between a high-dimensional feature and a low-dimensional feature, a residual structure may also be added to improve gradient transfer efficiency, and a recurrent neural network module may also be added to improve a time sequence correlation.

The input in FIG. 6 may also be understood as a one-dimensional time-domain signal, and the input in FIG. 7 is a two-dimensional spectrogram signal.

The foregoing two separation models are merely examples. In actual application, there is another possible structure. The input of the separation model may be a time-domain signal and the output of the separation model may be a time-domain signal, the input of the separation model may be a time-frequency domain signal and the output of the separation model may be a time-frequency domain signal, or the like. The structure, the input, or the output of the separation model is not specifically limited herein.

Optionally, before being input into the separation network, the multi-audio track in the multimedia file may be further identified first by using an identification network, to identify a quantity of audio tracks and an object type (for example, a human sound, a drum sound, or the like) that are included in the multi-audio track, so that training duration of the separation network can be reduced. Certainly, the separation network may alternatively include a multi-audio track identification subnetwork. This is not specifically limited herein. An input of the identification network may be a time-domain signal, and an output of the identification network may be a class probability. It is equivalent that the time-domain signal is input into the identification network, an obtained object is a probability of a class, and a class whose probability exceeds a threshold is selected as a class of classification. The object herein may also be understood as a sound object.

For example, the input in the identification network is a multimedia file obtained by combining audio corresponding to a vehicle A and audio corresponding to a vehicle B. The multimedia file is input into the identification network, and the identification network may output a vehicle class. Certainly, when the training data is comprehensive enough, the identification network may also identify a specific vehicle type. This is equivalent to further fine-grained identification. The identification network is set based on an actual requirement. This is not specifically limited herein.

It should be noted that, in the training process, another training method may be used instead of the foregoing training method. This is not limited herein.

Figure 8:
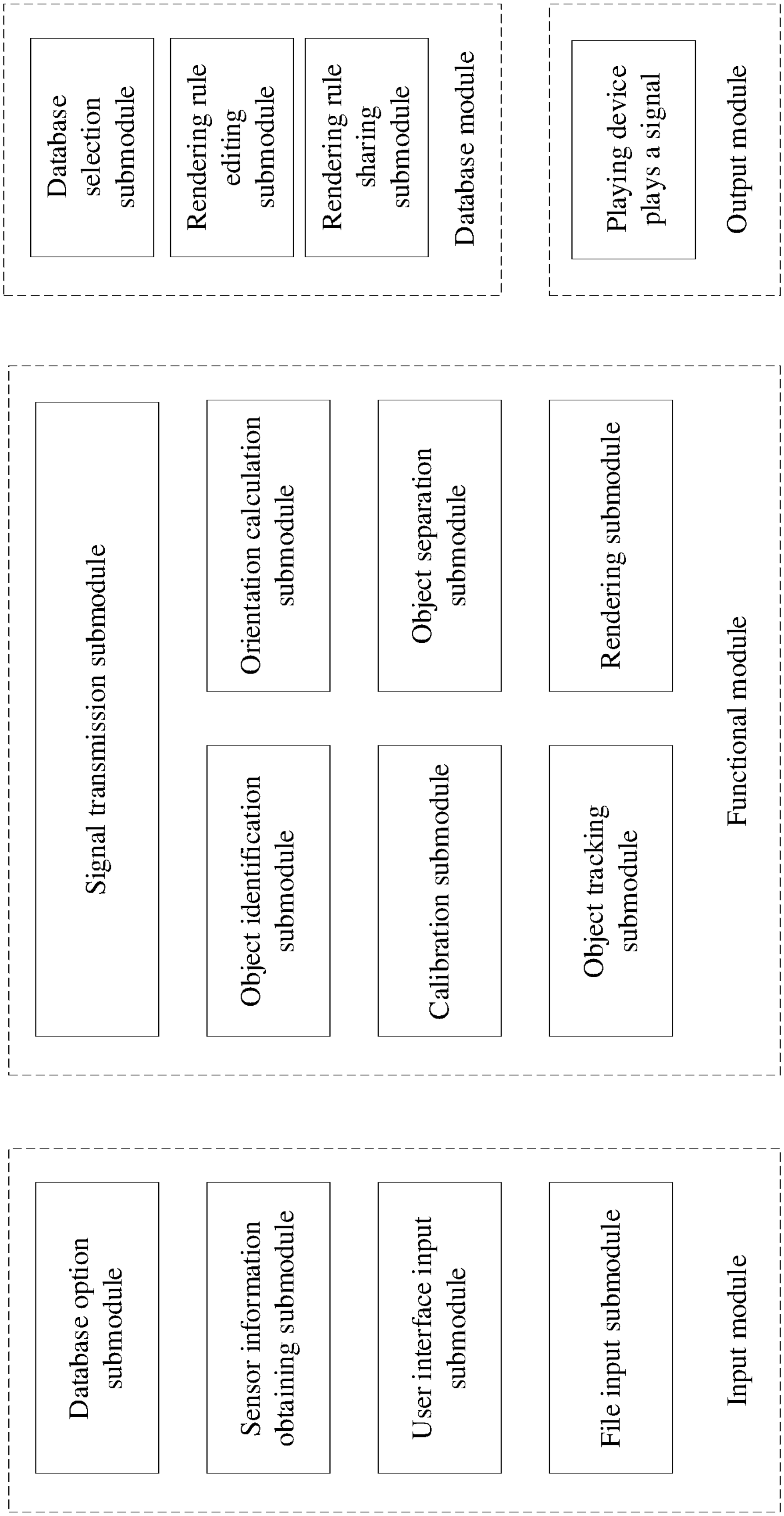
FIG. 8 is a schematic diagram of another system architecture according to this application.

FIG. 8 shows another system architecture according to this application. The system architecture includes an input module, a functional module, a database module, and an output module. The following describes each module in detail.

1. Input Module

The input module includes a database option submodule, a sensor information obtaining submodule, a user interface input submodule, and a file input submodule. The foregoing four submodules may also be understood as four input manners.

The database option submodule is configured to perform spatial rendering in a rendering manner that is stored in a database and that is selected by a user.

The sensor information obtaining submodule is configured to specify a spatial position of a specific sound object by using a sensor (which may be a sensor in a rendering device, or may be another sensor device, which is not specifically limited herein). In this manner, a user may select a position of the specific sound object.

The user interface input submodule is configured to determine a spatial position of a specific sound object in response to an operation of a user in a user interface. Optionally, the user may control the spatial position of the specific sound object in a manner of tapping, dragging, or the like.

The file input submodule is configured to: track a specific sound object based on image information or text information (for example, lyrics, subtitles, or the like), and determine a spatial position of the specific sound object based on a tracked position of the specific sound object.

2. Functional Module

The functional module includes a signal transmission submodule, an object identification submodule, a calibration submodule, an object tracking submodule, an orientation calculation submodule, an object separation submodule, and a rendering submodule.

The signal transmission submodule is configured to receive and send information. Specifically, the signal transmission submodule may receive input information of the input module, and output feedback information to another module. For example, the feedback information includes information such as position change information of the specific sound object, a single-object audio track obtained through separation, and the like. Certainly, the signal transmission submodule may be further configured to feed back identified object information to the user through the user interface (UI), and the like. This is not specifically limited herein.

The object identification submodule is configured to identify all object information of multi-audio track information sent by the input module and received by the signal transmission submodule. The object herein is a sound object (or referred to as a sound-emitting object), for example, a human sound, a drum sound, an airplane sound, or the like. Optionally, the object identification submodule may be an identification subnetwork in the identification network or the separation network described in the embodiment shown in FIG. 5.

The calibration submodule is configured to calibrate an initial state of a playing device. For example, when the playing device is a headset, the calibration submodule is configured to calibrate the headset; or when the playing device is a loudspeaker device, the calibration submodule is configured to calibrate the loudspeaker device. For headset calibration, an initial state of a sensor (a relationship between a sensor device and the playing device is described in FIG. 9) may be considered as that the mobile phone is directly front direction by default, and calibration is subsequently performed based on the directly front direction. Alternatively, a real position of the sensor placed by the user may be obtained, to ensure that a directly front direction of a sound image is a directly front direction of the headset. For loudspeaker device calibration, a coordinate position of each loudspeaker device is first obtained (which may be obtained through interaction by using a sensor of a user terminal, and a corresponding description is subsequently provided in FIG. 9). After calibrating the playing device, the calibration submodule transmits information about the calibrated playing device to the database module through the signal transmission submodule.

The object tracking submodule is configured to track a motion track of the specific sound object. The specific sound object may be a sound object in text or an image displayed in a multi-modal file (for example, audio information and video information corresponding to the audio information, audio information and text information corresponding to the audio information, or the like). Optionally, the object tracking submodule may be further configured to render a motion track on an audio side. In addition, the object tracking submodule may further include a target identification network and a depth estimation network. The target identification network is configured to identify the specific sound object that needs to be tracked, and the depth estimation network is configured to obtain relative coordinates of the specific sound object in the image (a detailed description is provided in a subsequent embodiment), so that the object tracking submodule renders, based on the relative coordinates, an orientation and a motion track of audio corresponding to the specific sound object.

The orientation calculation submodule is configured to convert information (for example, sensor information, input information of the UI interface, file information, or the like) obtained by the input module into orientation information (which may also be referred to as a sound source position). There are corresponding conversion methods for different information, and a specific conversion process is described in detail in a subsequent embodiment.

The object separation submodule is configured to separate at least one single-object audio track from a multimedia file (or referred to as multimedia information) or multi-audio track information, for example, extract a separate human sound track (that is, an audio file including only a human hound) from a song. The object separation submodule may be the separation network in the embodiment shown in FIG. 5. Further, a structure of the object separation submodule may be the structure shown in FIG. 6 or FIG. 7. This is not specifically limited herein.

The rendering submodule is configured to: obtain the sound source position obtained by the orientation calculation submodule, and perform spatial rendering on the sound source position. Further, a corresponding rendering method may be determined based on a playing device selected based on the input information of the UI in the input module. For different playing devices, rendering manners are different. A rendering process is described in detail in a subsequent embodiment.

3. Database Module

The database module includes a database selection submodule, a rendering rule editing submodule, and a rendering rule sharing submodule.

The database selection submodule is configured to store a rendering rule. The rendering rule may be a default rendering rule of converting a dual-channel/multi-channel audio track into a three-dimensional (3D) spatial sense that is provided by a system during initialization of the system, or may be a rendering rule stored by the user. Optionally, different objects may correspond to a same rendering rule, or different objects may correspond to different rendering rules.

The rendering rule editing submodule is configured to re-edit a stored rendering rule. Optionally, the stored rendering rule may be a rendering rule stored in the database selection submodule, or may be a newly input rendering rule. This is not specifically limited herein.

The rendering rule sharing submodule is configured to upload a rendering rule to a cloud, and/or configured to download a specific rendering rule from a rendering rule database of a cloud. For example, the rendering rule sharing module may upload a rendering rule customized by the user to the cloud, and share the rendering rule with another user. The user may select, from the rendering rule database stored in the cloud, a rendering rule that is shared by another user and that matches multi-audio track information to be played, and download the rendering rule to a database on a terminal side as a data file for an audio 3D rendering rule.

4. Output Module

The output module is configured to play a rendered single-object audio track or a target audio track (which is obtained based on an original audio track and the rendered single-object audio track) by using the playing device.

First, an application scenario to which the rendering method provided in embodiments of this application is applied is described.

Figure 9:
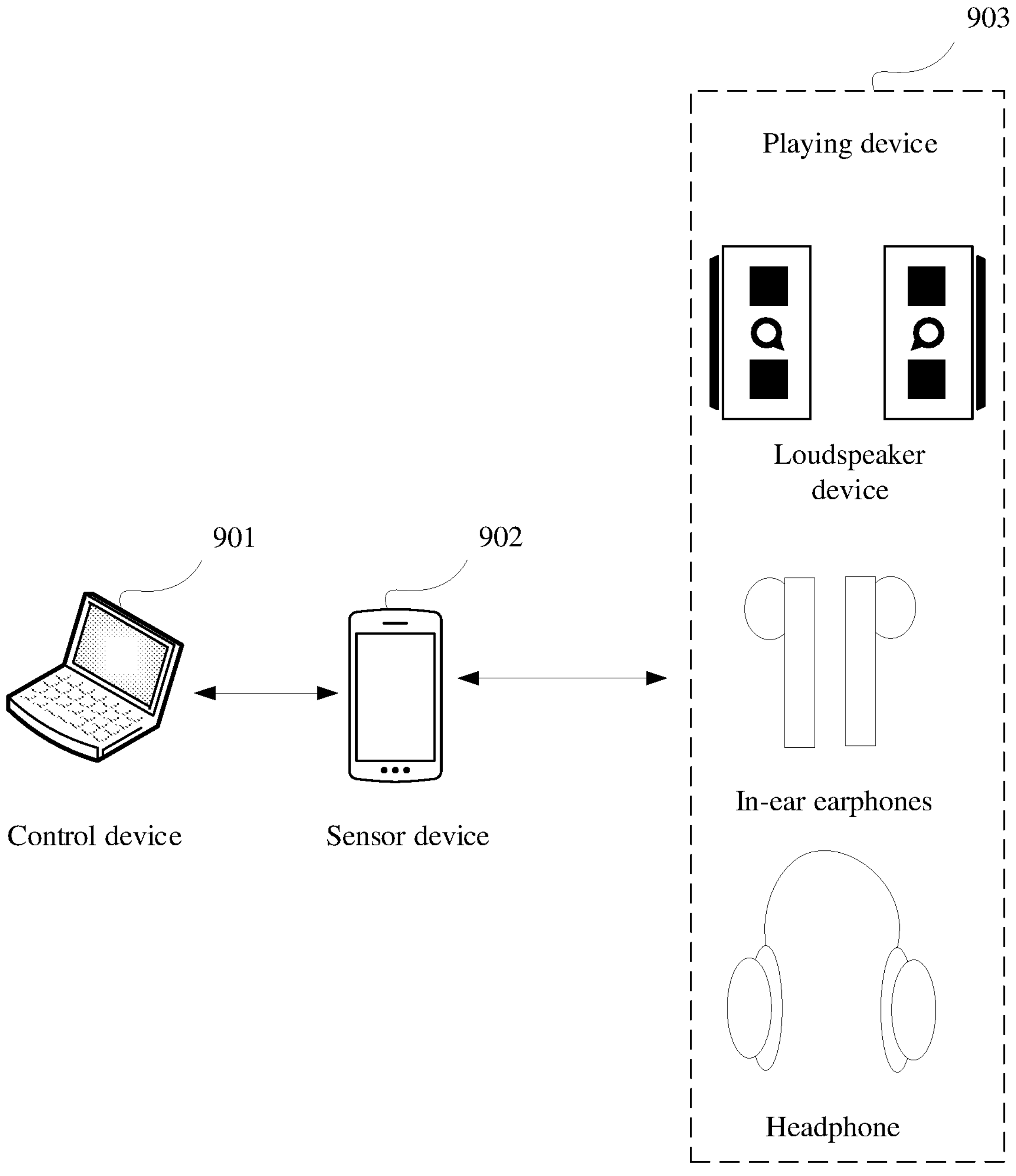
FIG. 9 is a schematic diagram of an application scenario according to this application.

Refer to FIG. 9. The application scenario includes a control device 901, a sensor device 902, and a playing device 903.

The playing device 903 in this embodiment of this application may be a loudspeaker device, or may be a headset (for example, in-ear earphones, a headphone, or the like), or may be a large screen (for example, a projection screen), or the like. This is not specifically limited herein.

The control device 901 and the sensor device 902, and the sensor device 902 and the playing device 903 may be connected in a wired manner, a wireless fidelity (Wi-Fi) manner, a mobile data network manner, or another connection manner. This is not specifically limited herein.

The control device 901 in this embodiment of this application is a terminal device configured to serve a user. The terminal device may include a head-mounted display (HMD) device. The head-mounted display device may be a combination of a virtual reality (VR) box and a terminal, an all-in-one VR headset, a personal computer (PC) VR, an augmented reality (AR) device, a mixed reality (MR) device, or the like. The terminal device may alternatively include a cellular phone (cellular phone), a smartphone (smartphone), a personal digital assistant (PDA), a tablet computer, a laptop computer (laptop computer), a personal computer (PC), a vehicle-mounted terminal, or the like. This is not specifically limited herein.

The sensor device 902 in this embodiment of this application is a device configured to sense an orientation and/or a position, and may be a laser pointer, a mobile phone, a smartwatch, a smart band, a device having an inertial measurement unit (IMU), a device having a simultaneous localization and mapping (SLAM) sensor, or the like. This is not specifically limited herein.

The playing device 903 in this embodiment of this application is a device configured to play audio or a video, and may be a loudspeaker device (for example, a speaker, or a terminal device having an audio or video playing function), or may be an in-ear monitoring device (for example, in-ear earphones, a headphone, an AR device, a VR device, or the like). This is not specifically limited herein.

It may be understood that, in the application scenario shown in FIG. 9, for each device, there may be one or more such devices. For example, there may be a plurality of loudspeaker devices. For each device, a quantity is not specifically limited herein.

In this embodiment of this application, the control device, the sensor device, and the playing device may be three devices, or may be two devices, or may be one device. This is not specifically limited herein.

In a possible implementation, the control device and the sensor device in the application scenario shown in FIG. 9 are a same device. For example, the control device and the sensor device are a same mobile phone, and the playing device is a headset. For another example, the control device and the sensor device are a same mobile phone, and the playing device is a loudspeaker device (which may also be referred to as a loudspeaker device system, where the loudspeaker device system includes one or more loudspeaker devices).

In another possible implementation, the control device and the playing device in the application scenario shown in FIG. 9 are a same device. For example, the control device and the playing device are a same computer. For another example, the control device and the playing device are a same large screen.

In another possible implementation, the control device, the sensor device, and the playing device in the application scenario shown in FIG. 9 are a same device. For example, the control device, the sensor device, and the playing device are a same tablet computer.

The following describes in detail the rendering method in embodiments of this application with reference to the foregoing application scenario and accompanying drawings.

Figure 10:
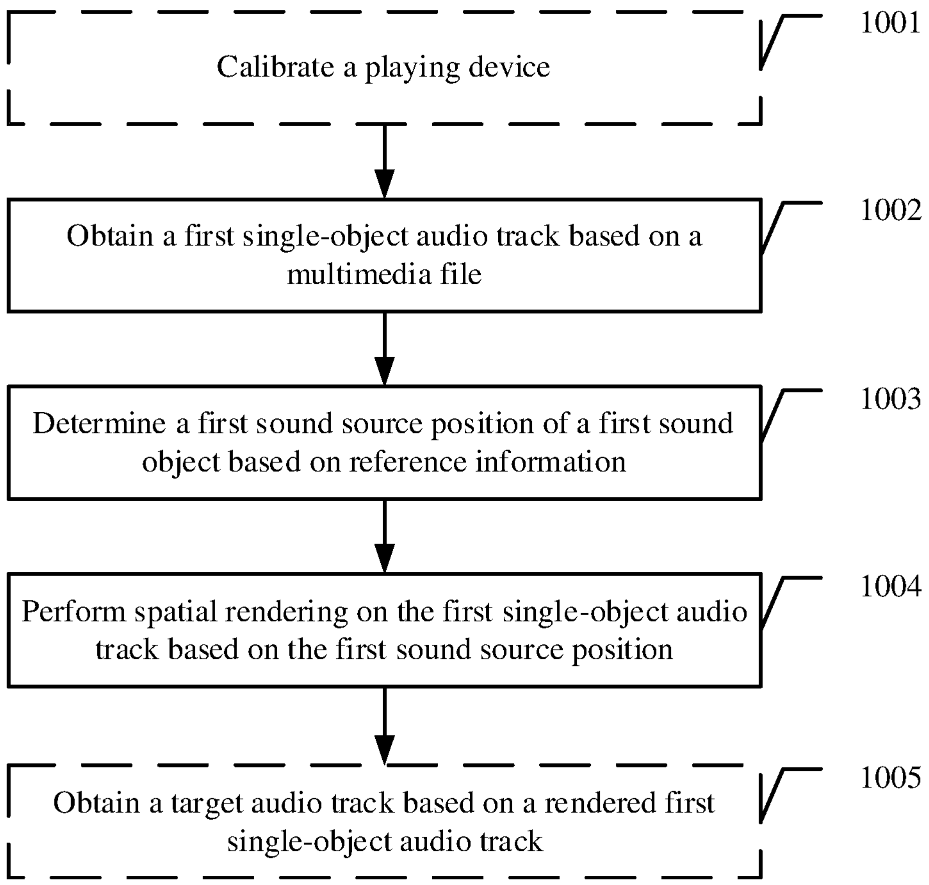
FIG. 10 is a schematic flowchart of a rendering method according to this application.

FIG. 10 shows an embodiment of the rendering method provided in embodiments of this application. The method may be performed by a rendering device, or may be performed by a component (for example, a processor, a chip, a chip system, or the like) of a rendering device. This embodiment includes step 1001 to step 1004.

In this embodiment of this application, the rendering device may have a function of the control device in FIG. 9, a function of the sensor device in FIG. 9, and/or a function of the playing device in FIG. 9. This is not specifically limited herein. The following describes the rendering method by using an example in which the rendering device is a control device (for example, a notebook computer), a sensor device is a device (for example, a mobile phone) having an IMU, and a playing device is a loudspeaker device (for example, a speaker).

A sensor described in embodiments of this application may be a sensor in the rendering device, or may be a sensor in a device (for example, the foregoing sensor device) other than the rendering device. This is not specifically limited herein.

Step 1001: Calibrate the playing device. This step is optional.

Optionally, before the playing device plays a rendered audio track, the playing device may be first calibrated. Calibration aims to improve realness of spatial effect of the rendered audio track.

Figure 11:
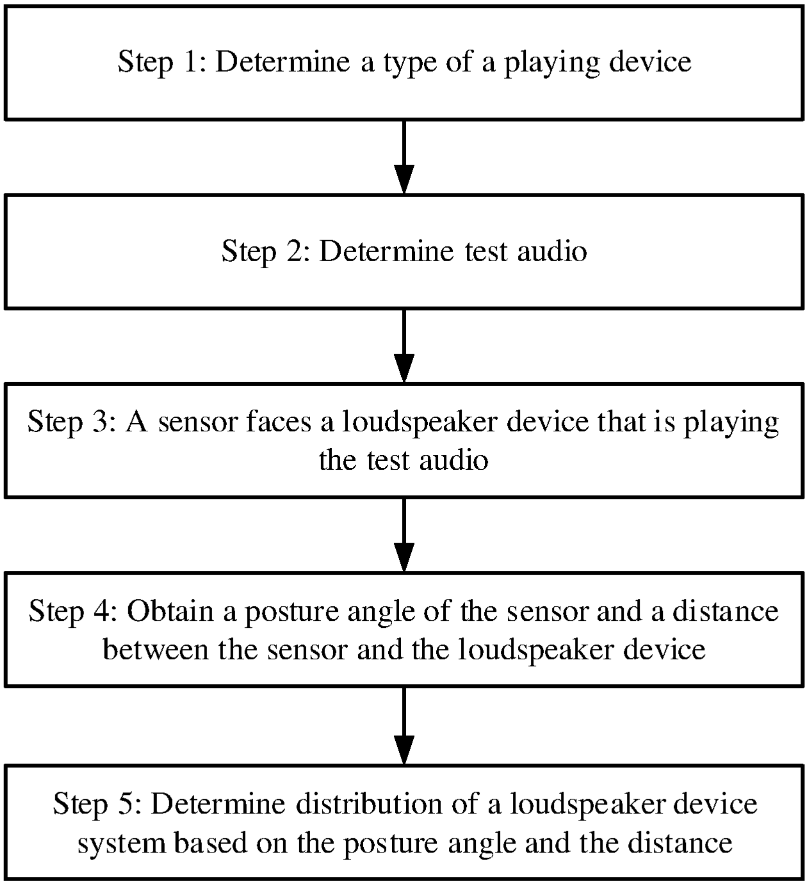
FIG. 11 is a schematic flowchart of a playing device calibration method according to this application.

In this embodiment of this application, there may be a plurality of manners of calibrating the playing device. The following describes, by using only an example in which the playing device is a loudspeaker device, a process of calibrating the playing device. FIG. 11 shows a playing device calibration method provided in this embodiment. The method includes step 1 to step 5.

Optionally, before calibration, a mobile phone held by a user establishes a connection to the loudspeaker device. A connection manner is similar to a connection manner between the sensor device and the playing device in the embodiment shown in FIG. 9. Details are not described herein again.

Step 1: Determine a type of the playing device.

In this embodiment of this application, the rendering device may determine the type of the playing device based on an operation of the user, or may adaptively detect the type of the playing device, or may determine the type of the playing device based on a default setting, or may determine the type of the playing device in another manner. This is not specifically limited herein.

Figure 12:
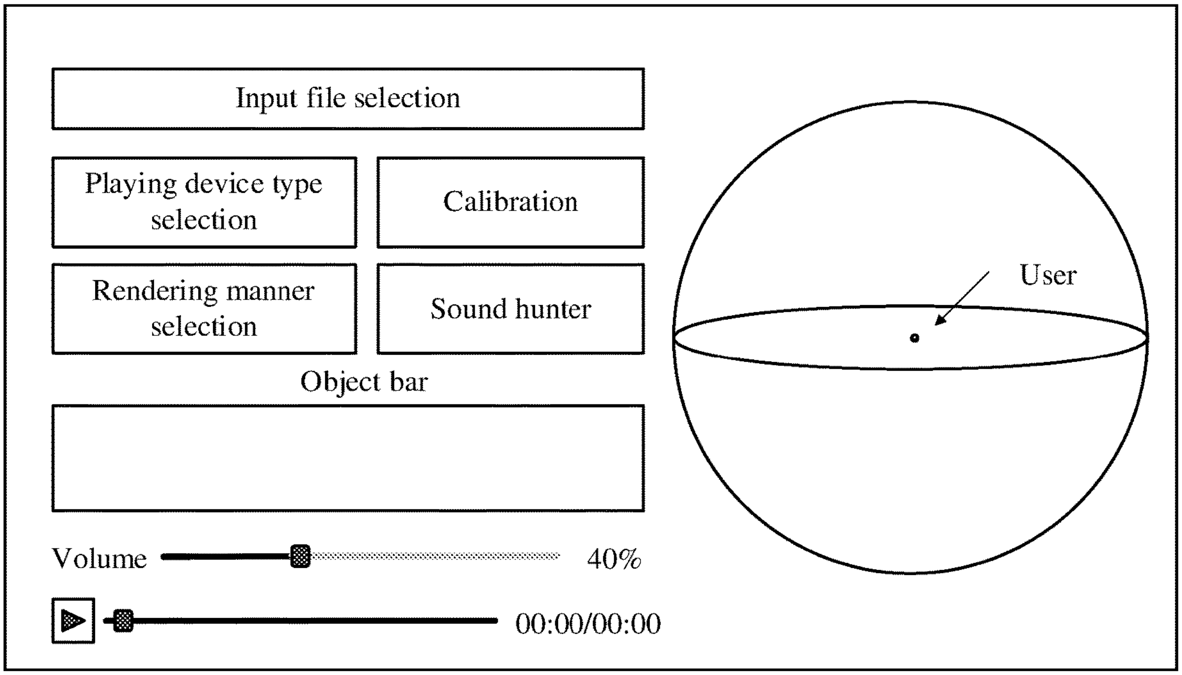
FIG. 12 to FIG. 17 are several schematic diagrams of display interfaces of a rendering device according to this application.
Figure 13:
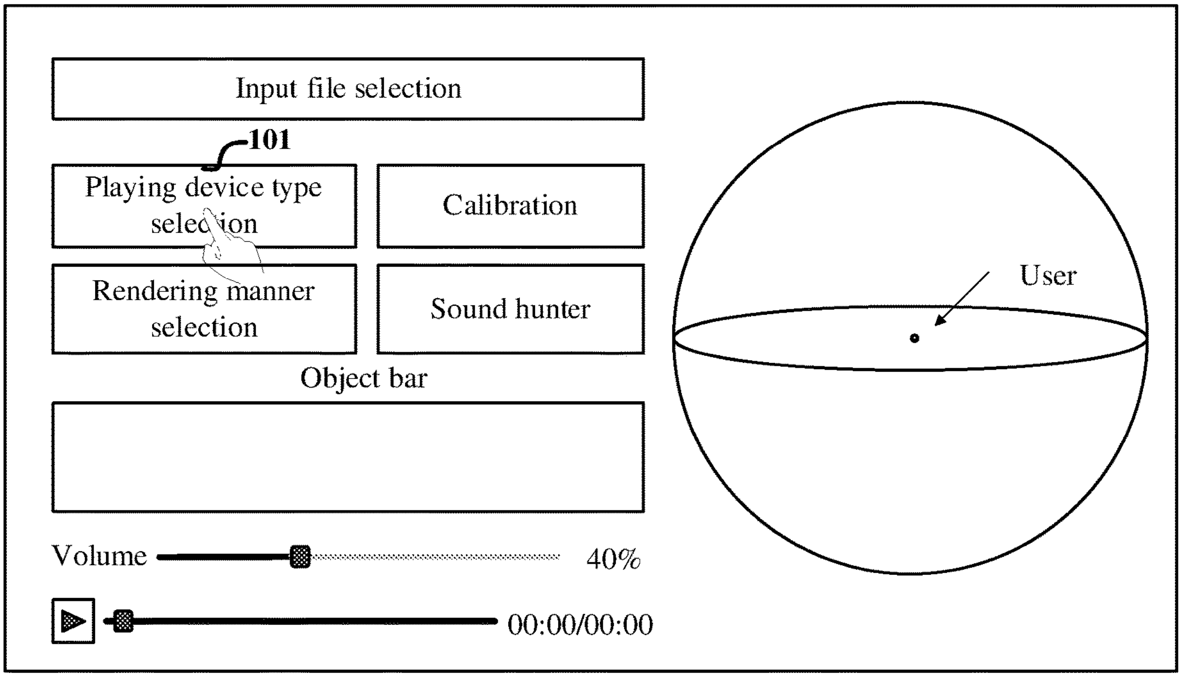
Figure 14:
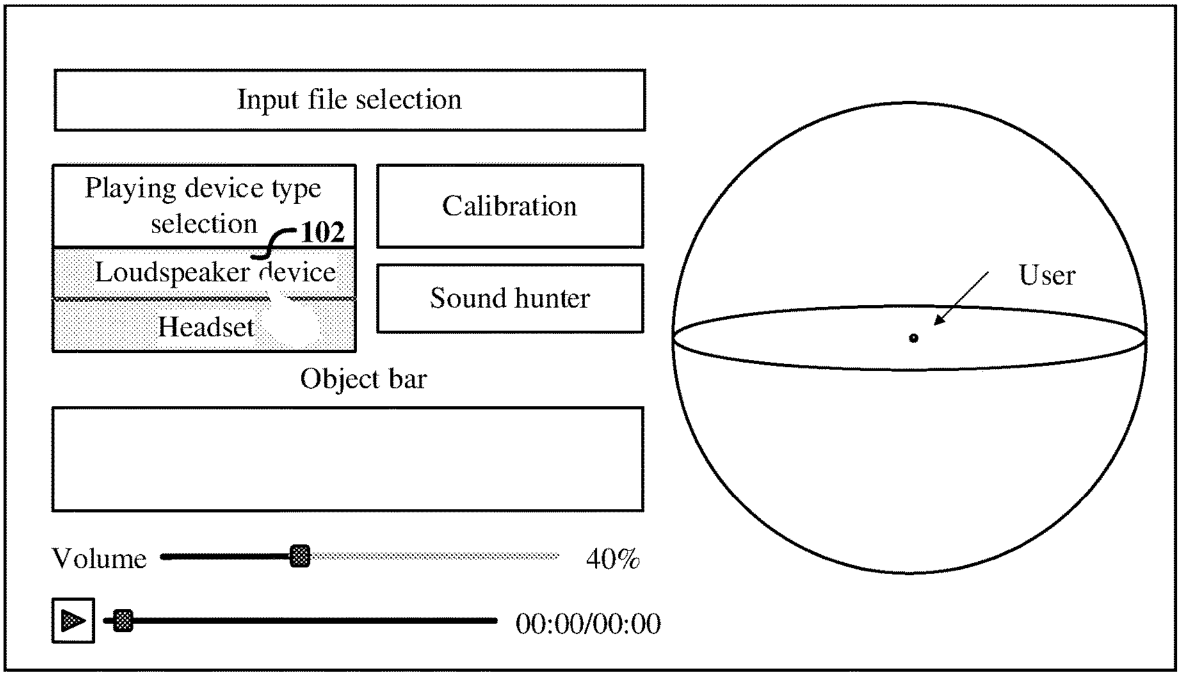
Figure 15:
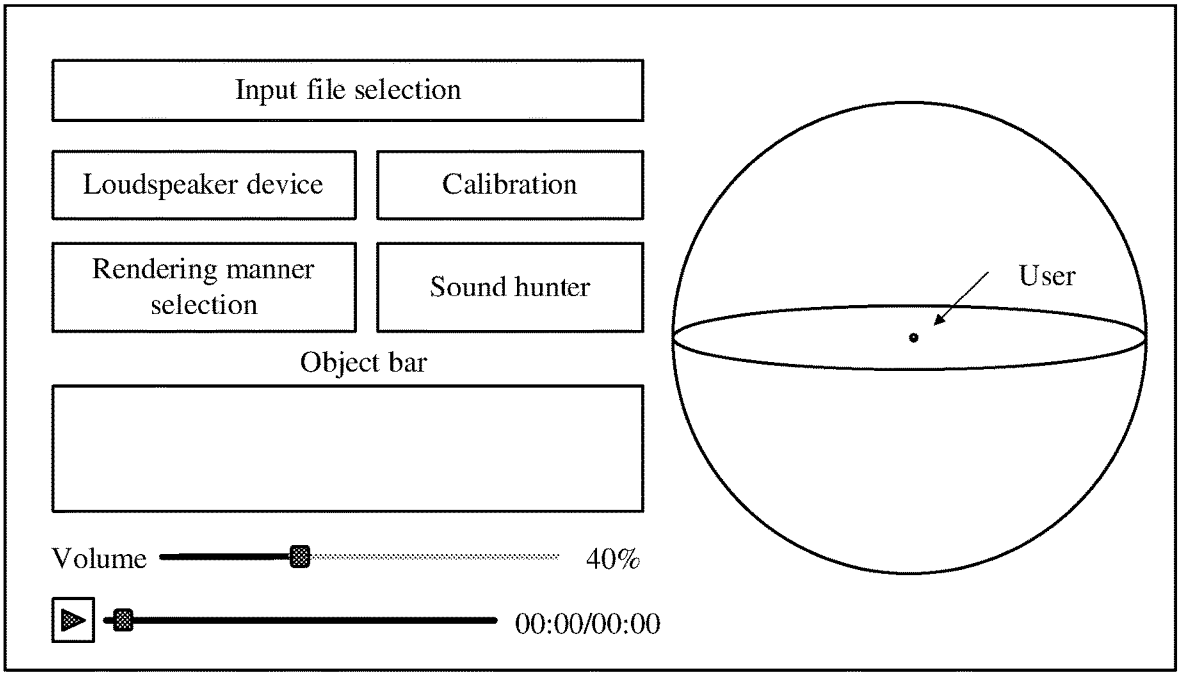

For example, if the rendering device determines the type of the playing device based on the operation of the user, the rendering device may display an interface shown in FIG. 12. The interface includes a playing device type selection icon. In addition, the interface may further include an input file selection icon, a rendering manner selection (that is, a reference information option) icon, a calibration icon, a sound hunter icon, an object bar, volume, a duration progress, and a spherical view (or referred to as a three-dimensional view). As shown in FIG. 13, the user may tap a "playing device type selection icon" 101. As shown in FIG. 14, the rendering device displays a drop-down list in response to the tapping operation. The drop-down list may include a "loudspeaker device option" and a "headset option". Further, the user may tap a "loudspeaker device option" 102, to determine that the type of the playing device is a loudspeaker device. As shown in FIG. 15, in an interface displayed by the rendering device, "playing device type selection" may be replaced with the "loudspeaker device", to prompt the user that the current type of the playing device is the loudspeaker device. It may also be understood that the rendering device displays the interface shown in FIG. 12, the rendering device receives a fifth operation (that is, the tapping operations shown in FIG. 13 or FIG. 14) of the user, and in response to the fifth operation, the rendering device selects, from a playing device type option, the loudspeaker device as the type of the playing device.

Figure 16:
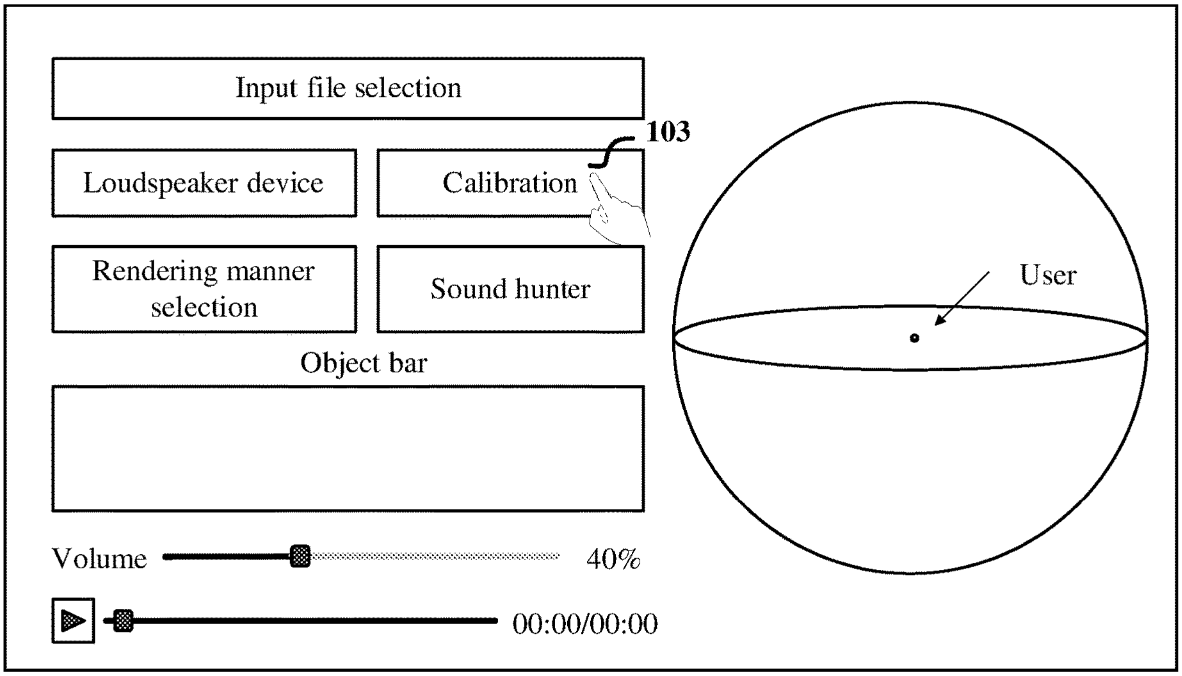
Figure 17:
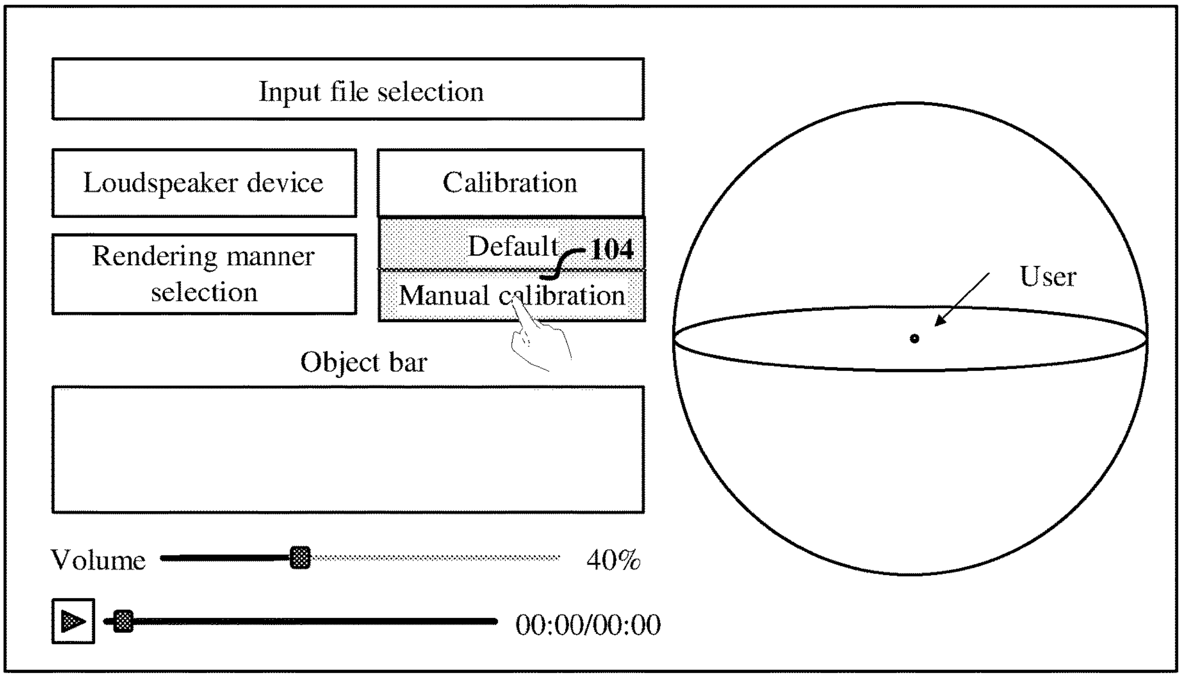

In addition, because the method is used to calibrate the playing device, as shown in FIG. 16, the user may further tap a "calibration icon" 103. As shown in FIG. 17, the rendering device displays a drop-down list in response to the tapping operation. The drop-down list may include a "default option" and a "manual calibration option". Further, the user may tap a "manual calibration option" 104, to determine that a calibration manner is manual calibration. Manual calibration may be understood as that the user calibrates the playing device by using the mobile phone (that is, the sensor device).

In FIG. 14, only an example in which the drop-down list of the "playing device type selection icon" includes the "loudspeaker device option" and the "headset option" is used. In actual application, the drop-down list may further include a specific headset type option, for example, an option such as a headphone, in-ear earphones, a wired headset, a Bluetooth headset, or the like. This is not specifically limited herein.

In FIG. 17, only an example in which the drop-down list of the "calibration icon" includes the "default option" and the "manual calibration option" is used. In actual application, the drop-down list may further include another type of option. This is not specifically limited herein.

Step 2: Determine test audio.

Figure 5:
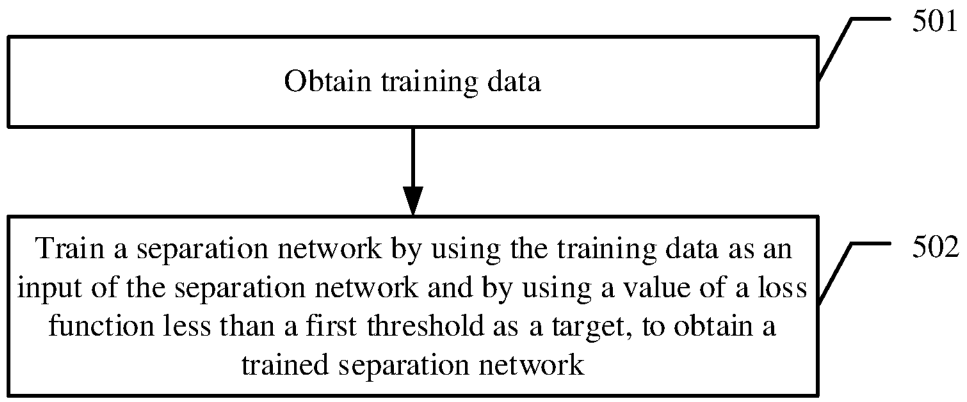
FIG. 5 is a schematic flowchart of a separation network training method according to this application.

The test audio in this embodiment of this application may be a test signal (for example, pink noise) specified by default, or may be a single-object audio track that corresponds to a human sound and that is separated from a song (that is, a multimedia file is the song) by using the separation network in the embodiment shown in FIG. 5, or may be audio corresponding to another single-object audio track in the song, or may be audio that includes only a single-object audio track. This is not specifically limited herein.

For example, the user may tap the "input file selection icon" in the interface displayed by the rendering device, to select the test audio.

Step 3: Obtain a posture angle of the mobile phone and a distance between the sensor and the loudspeaker device.

After a test audio is determined, the loudspeaker device plays the test audio in sequence, and the user holds the sensor device (for example, the mobile phone) to point to the loudspeaker device that is playing the test audio. After the mobile phone is stably placed, a current orientation of the mobile phone and signal energy of the received test audio are recorded, and a distance between the mobile phone and the loudspeaker device is calculated according to the following formula 1. When there are a plurality of loudspeaker devices, operations are similar. Details are not described herein again. That the mobile phone is stably placed may be understood as that a variance of orientations of the mobile phone is less than a threshold (for example, 5 degrees) within a period of time (for example, 200 milliseconds).

Optionally, if the playing device is two loudspeaker devices, a first loudspeaker device first plays the test audio, and the user holds the mobile phone to point to the first loudspeaker device. After the first loudspeaker device is calibrated, the user holds the mobile phone to point to a second loudspeaker device to perform calibration.

Figure 18:
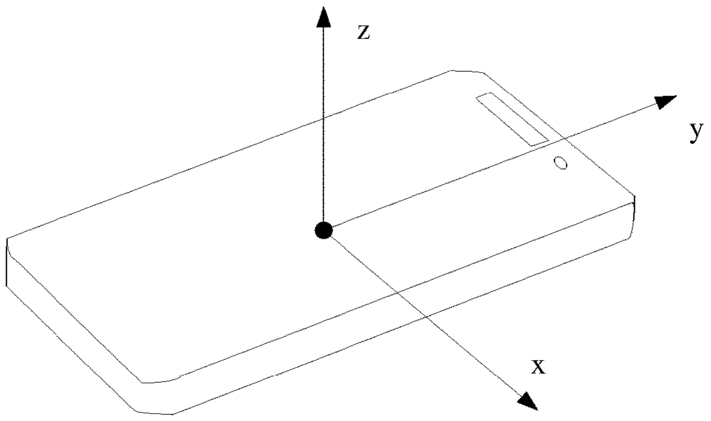
FIG. 18 is a schematic diagram of an orientation of a mobile phone according to this application.

In this embodiment of this application, the orientation of the mobile phone may be the posture angle of the mobile phone. The posture angle may include an azimuth and an oblique angle (or referred to as a tilt angle), or the posture angle includes an azimuth, an oblique angle, and a pitch angle. The azimuth represents an angle around a z-axis, the oblique angle represents an angle around a y-axis, and the pitch angle represents an angle around an x-axis. A relationship between the orientation of the mobile phone and the x-axis, the y-axis, and the z-axis may be shown in FIG. 18.

For example, the foregoing example is still used. The playing device is two loudspeaker devices. The first loudspeaker device first plays the test audio. The user holds the mobile phone to point to the first loudspeaker device, and records a current orientation of the mobile phone and signal energy of the received test audio. Then, the second loudspeaker device plays the test audio. The user holds the mobile phone to point to the second loudspeaker device, and records a current orientation of the mobile phone and signal energy of the received test audio.

Figure 19:
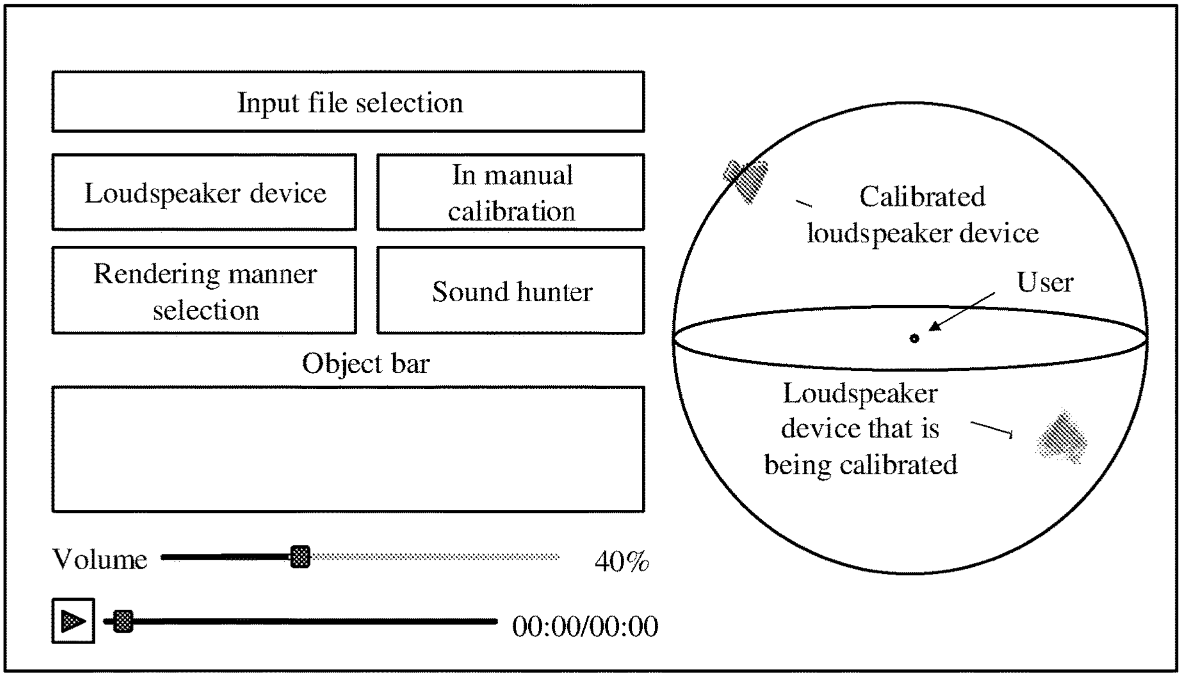
FIG. 19 is another schematic diagram of a display interface of a rendering device according to this application.

Further, in a process of calibrating the loudspeaker device, the rendering device may display an interface shown in FIG. 19. The right side of the interface shows a spherical view. A loudspeaker device that has been calibrated and a loudspeaker device that is being calibrated may be displayed in the spherical view. In addition, an uncalibrated loudspeaker device (not shown in the figure) may be further displayed. This is not specifically limited herein. A circle center of the spherical view is a position of the user (which may also be understood as a position at which the user holds the mobile phone, and because the user holds the mobile phone, a position of the mobile phone is approximate to the position of the user). A radius may be a distance between the position of the user (or the position of the mobile phone) and the loudspeaker device, or may be set to a default value (for example, 1 meter), or the like. This is not specifically limited herein.

Figure 20:
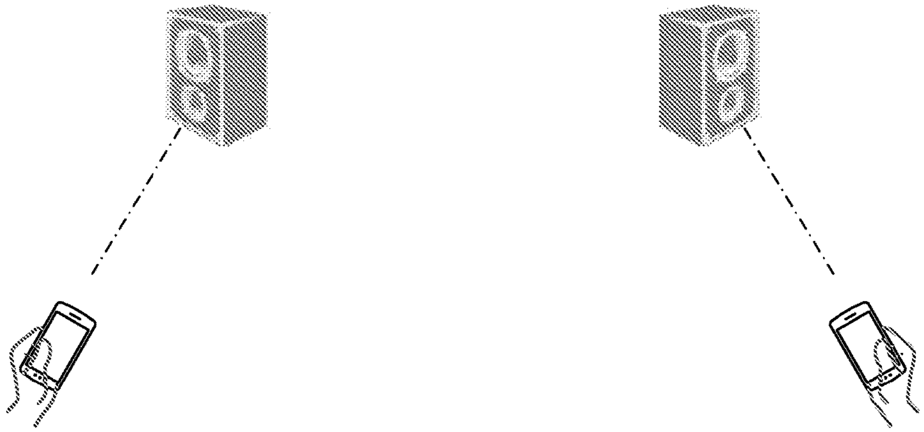
FIG. 20 is a schematic diagram of determining a sound source position by using an orientation of a mobile phone according to this application.

For ease of understanding, FIG. 20 is an effect diagram of an example in which the user holds the mobile phone towards a loudspeaker device.

In this embodiment of this application, there are N loudspeaker devices, where N is a positive integer. An $i^{th}$ loudspeaker device is a loudspeaker device in the N loudspeaker devices, where i is a positive integer, and $i \leq N$. In all formulas in this embodiment of this application, the $i^{th}$ loudspeaker device is used as an example for calculation, and calculation for another loudspeaker device is similar to calculation for the $i^{th}$ loudspeaker device.

The formula 1 used for calibrating the $i^{th}$ loudspeaker device may be as follows:

$$r_i = \frac{\sum X(t)}{\sum X(t)} r_S \quad \text{Formula 1}$$

x(t) represents energy of a test signal received by the mobile phone at a moment t, X(t) represents energy of the test signal played by the loudspeaker device at the moment t, t is a positive number, $r_i$ represents a distance between the mobile phone and the $i^{th}$ loudspeaker device (because the user holds the mobile phone, the distance may also be understood as a distance between the user and the $i^{th}$ loudspeaker device), $r_s$ represents a normalized distance, the normalized distance may be understood as a coefficient and is used to convert a ratio of x(t) to X(t) into a distance, the coefficient may be specified based on an actual situation of the loudspeaker device, and a specific value of $r_s$ is not limited herein.

In addition, when there are a plurality of loudspeaker devices, test signals are sequentially played, the mobile phone faces the loudspeaker devices, and distances are obtained by using the formula 1.

It may be understood that the formula 1 is an example. In actual application, the formula 1 may alternatively be in another form, for example, removal or the like. This is not specifically limited herein.

Step 4: Determine position information of the loudspeaker device based on the posture angle and the distance.

In step 3, the mobile phone has recorded a posture angle of the mobile phone towards each loudspeaker device, and calculates a distance between the mobile phone and each loudspeaker device by using the formula 1. Certainly, the mobile phone may alternatively send the measured and to the rendering device, and the rendering device calculates a distance between the mobile phone and each loudspeaker device by using the formula 1. This is not specifically limited herein.

After obtaining the posture angle of the mobile phone and the distance between the mobile phone and the loudspeaker device, the rendering device may convert the posture angle of the mobile phone and the distance between the mobile phone and the loudspeaker device into position information of the loudspeaker device in a spherical coordinate system by using a formula 2. The position information includes an azimuth, an oblique angle, and a distance (to be specific, a distance between the sensor device and the playing device). When there are a plurality of loudspeaker devices in the loudspeaker device system, determining of position information of another loudspeaker device is similar. Details are not described herein again.

The formula 2 may be as follows:

$$\begin{bmatrix} \lambda(t) \\ \Phi(t) \\ d(t) \end{bmatrix} = \begin{bmatrix} \begin{cases} \Omega(t)[0]\%360 \\ (\Omega(t)[0]-180)\%360 \end{cases} & \text{if } |\Omega(t)[1]| \le 90 \\ \Omega(t)[1] & \text{if } |\Omega(t)[1]| > 90 \\ \text{sign}\,(\Omega(t)[1])(180-|\Omega(t)[1]|) & \text{if } |\Omega(t)[1]| \le 90 \\ r_i & \text{if } |\Omega(t)[1]| > 90 \end{bmatrix} \quad \text{Formula 2}$$

λ(t) represents an azimuth of the $i^{th}$ loudspeaker device in the spherical coordinate system at a moment t, Φ(t) represents an oblique angle of the $i^{th}$ loudspeaker device in the spherical coordinate system at the moment t, and d(t) represents the distance between the mobile phone and the $i^{th}$ loudspeaker device. Ω(t)[0] represents an azimuth of the mobile phone at the moment t (that is, a rotation angle of the mobile phone around a z axis), and (2(1)[1] represents a pitch angle of the mobile phone at the moment t (that is, a rotation angle of the mobile phone around an x axis). $r_i$ represents the distance calculated by using the formula 1, and sign represents a positive or negative value; and if Ω(t)[1] is positive, sign is positive; or if Ω(t)[1] is negative, sign is negative. %360 is used to adjust an angle range to 0 degrees to 360 degrees, for example, if an angle of Ω(t)[0] is −80 degrees, Ω(t)[0]%360 represents −80+360=280 degrees.

It may be understood that the formula 2 is merely an example. In actual application, the formula 2 may be in another form. This is not specifically limited herein.

Figure 21:
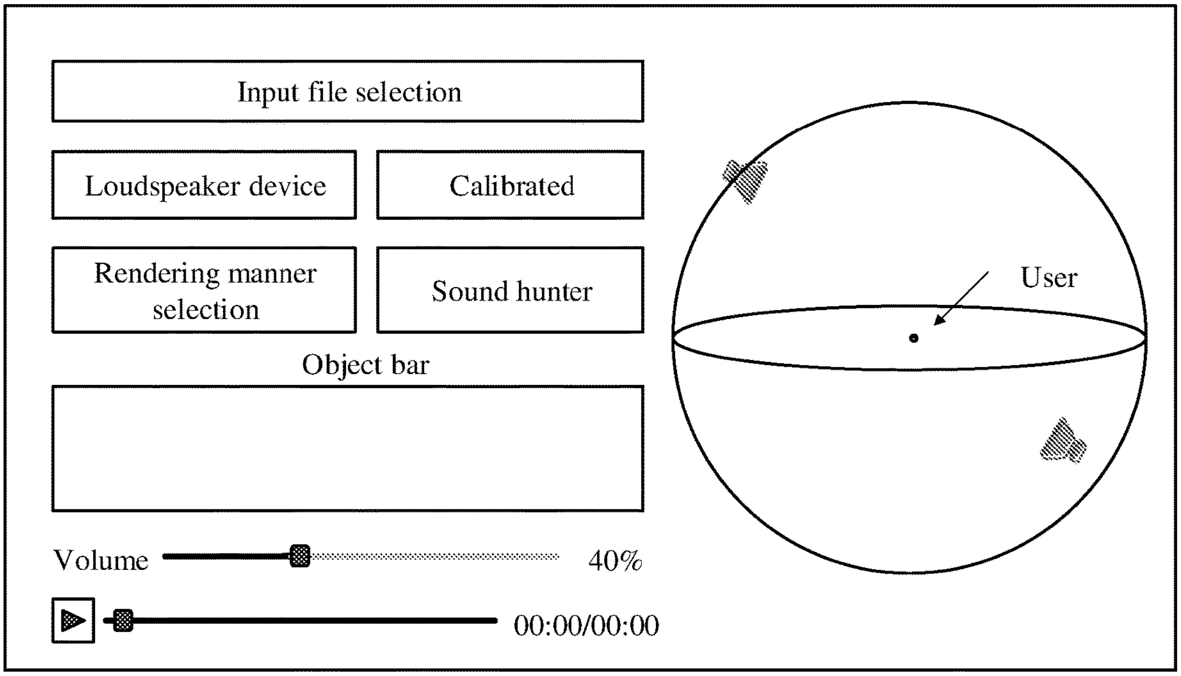
FIG. 21 to FIG. 47 are several other schematic diagrams of display interfaces of a rendering device according to this application.

For example, after the user calibrates the loudspeaker device, the rendering device may display an interface shown in FIG. 21. The interface displays a "calibrated icon", and a position of the calibrated loudspeaker device may be displayed in a spherical view on the right side.

The playing device is calibrated, so that a problem of calibrating an irregular loudspeaker device can be resolved. In this way, the user obtains spatial positioning of each loudspeaker device in a subsequent operation, so that a position required for a single-object audio track is precisely rendered, and realness of spatial effect of rendering the audio track is improved.

Step 1002: Obtain a first single-object audio track based on the multimedia file.

In this embodiment of this application, the rendering device may obtain the multimedia file in a manner of directly recording a sound made by a first sound object, or may obtain the multimedia file sent by another device, for example, receive the multimedia file sent by a capturing device (for example, a camera, a recorder, a mobile phone, or the like). In actual application, the multimedia file may be obtained in another manner. A specific manner of obtaining the multimedia file is not limited herein.

The multimedia file in this embodiment of this application may be specifically audio information, for example, stereo audio information multi-channel audio information, or the like. Alternatively, the multimedia file may be specifically multi-modal information. For example, the multi-modal information is video information, image information corresponding to audio information, text information, or the like. It may also be understood that, in addition to an audio track, the multimedia file may further include a video track, a text track (or referred to as a bullet screen track), or the like. This is not specifically limited herein.

In addition, the multimedia file may include the first single-object audio track, or include an original audio track. The original audio track is obtained by combining at least two single-object audio tracks. This is not specifically limited herein. The original audio track may be a single audio track, or may be a multi-audio track. This is not specifically limited herein. The original audio track may include an audio track generated by a sound object (or referred to as a sound-emitting object), such as a human sound track, a musical instrument track (for example, a drum track, a piano track, a trumpet track, or the like), an airplane sound, or the like. A specific type of the sound object corresponding to the original audio track is not limited herein.

According to a plurality of cases of the original audio track in the multimedia file, processing manners of this step may be different and are separately described in the following.

In a first manner, the audio track in the multimedia file is a single-object audio track.

In this case, the rendering device may directly obtain the first single-object audio track from the multimedia file.

In a second manner, the audio track in the multimedia file is a multi-object audio track.

This case may also be understood as that the original audio track in the multimedia file corresponds to a plurality of sound objects. Optionally, in addition to the first sound object, the original audio track further corresponds to a second sound object. In other words, the original audio track is obtained by combining at least the first single-object audio track and a second single-object audio track. The first single-object audio track corresponds to the first sound object, and the second single-object audio track corresponds to the second sound object.

In this case, the rendering device may separate the first single-object audio track from the original audio track, or may separate the first single-object audio track and the second single-object audio track from the original audio track. This is not specifically limited herein.

Optionally, the rendering device may separate the first single-object audio track from the original audio track by using the separation network in the embodiment shown in FIG. 5. In addition, the rendering device may alternatively separate the first single-object audio track and the second single-object audio track from the original audio track by using the separation network. This is not specifically limited herein. Different outputs depend on different manners of training the separation network. For details, refer to the description in the embodiment shown in FIG. 5. Details are not described herein again.

Optionally, after determining the multimedia file, the rendering device may identify sound objects of the original audio track in the multimedia file by using an identification network or the separation network. For example, the sound objects included in the original audio track include the first sound object and the second sound object. The rendering device may randomly select one of the sound objects as the first sound object, or may determine the first sound object based on selection of the user. Further, after determining the first sound object, the rendering device may obtain the first single-object audio track by using the separation network. Certainly, after determining the multimedia file, the rendering device may first obtain a sound object by using the identification network, and then obtain a single-object audio track of the sound object by using the separation network. Alternatively, a sound object included in the multimedia file and a single-object audio track corresponding to the sound object may be directly obtained by using the identification network and/or the separation network. This is not specifically limited herein.

For example, the foregoing example is still used. After the playing device is calibrated, the rendering device may display the interface shown in FIG. 21 or an interface shown in FIG. 22. The user may select a multimedia file by tapping an "input file selection icon" 105. For example, the multimedia file herein is "Dream it possible. wav". It may also be understood that the rendering device receives a fourth operation of the user, and in response to the fourth operation, the rendering device selects "Dream it possible.wav" (that is, a target file) from at least one multimedia file stored in a storage area as the multimedia file. The storage area may be a storage area in the rendering device, or may be a storage area in an external device (for example, a USB flash drive). This is not specifically limited herein. After the user selects the multimedia file, the rendering device may display an interface shown in FIG. 23. In the interface, "input file selection" may be replaced with "Dream it possible.wav", to prompt the user that the current multimedia file is Dream it possible.wav. In addition, by using the identification network and/or the separation network in the embodiment shown in FIG. 4, the rendering device may identify sound objects in "Dream it possible.wav", and separate a single-object audio track corresponding to each sound object. For example, the rendering device identifies that the sound objects included in "Dream it possible.wav" are a person, a piano, a violin, and a guitar. As shown in FIG. 23, the interface displayed by the rendering device may further include an object bar, and icons such as a "human sound icon", a "piano icon", a "violin icon", a "guitar icon", and the like may be displayed in the object bar, for the user to select a to-be-rendered sound object. Optionally, a "combination icon" may be further displayed in the object bar, and the user may stop selecting a sound object by tapping the "combination icon".

Figure 24:
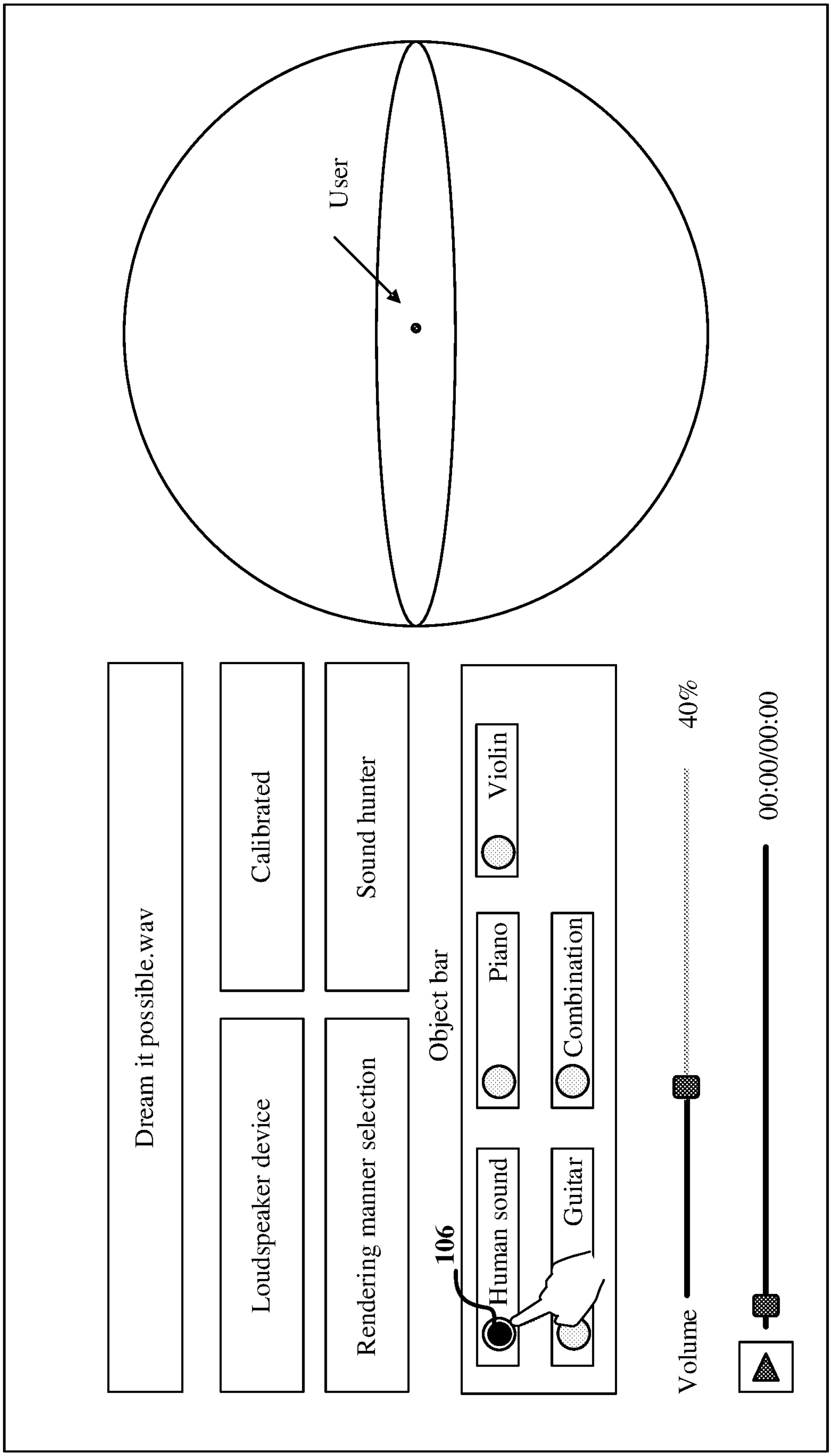

Further, as shown in FIG. 24, the user may determine, by tapping a "human sound icon" 106, that a to-be-rendered audio track is a single-object audio track corresponding to a human sound. It may also be understood that the rendering device identifies "Dream it possible.wav" and the rendering device displays an interface shown in FIG. 24, the rendering device receives the tapping operation of the user, and in response to the tapping operation, the rendering device selects a first icon (that is, the "human sound icon" 106) in the interface, so that the rendering device determines that the first single-object audio track is the human sound.

Figure 22:
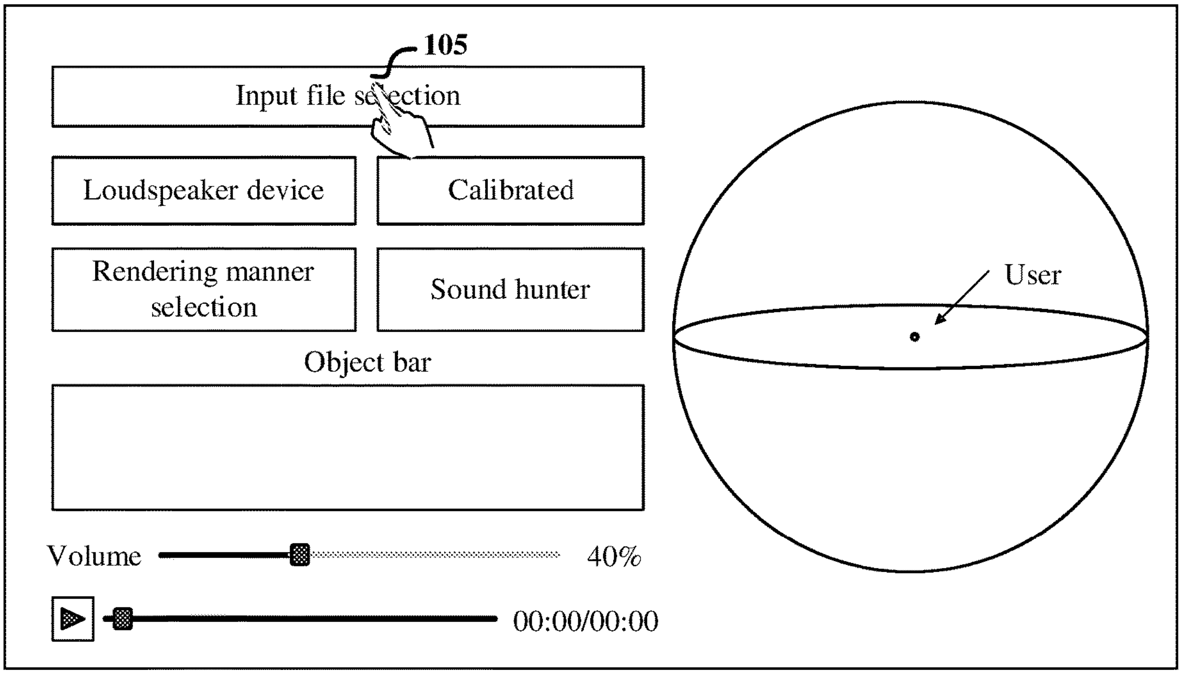
Figure 23:
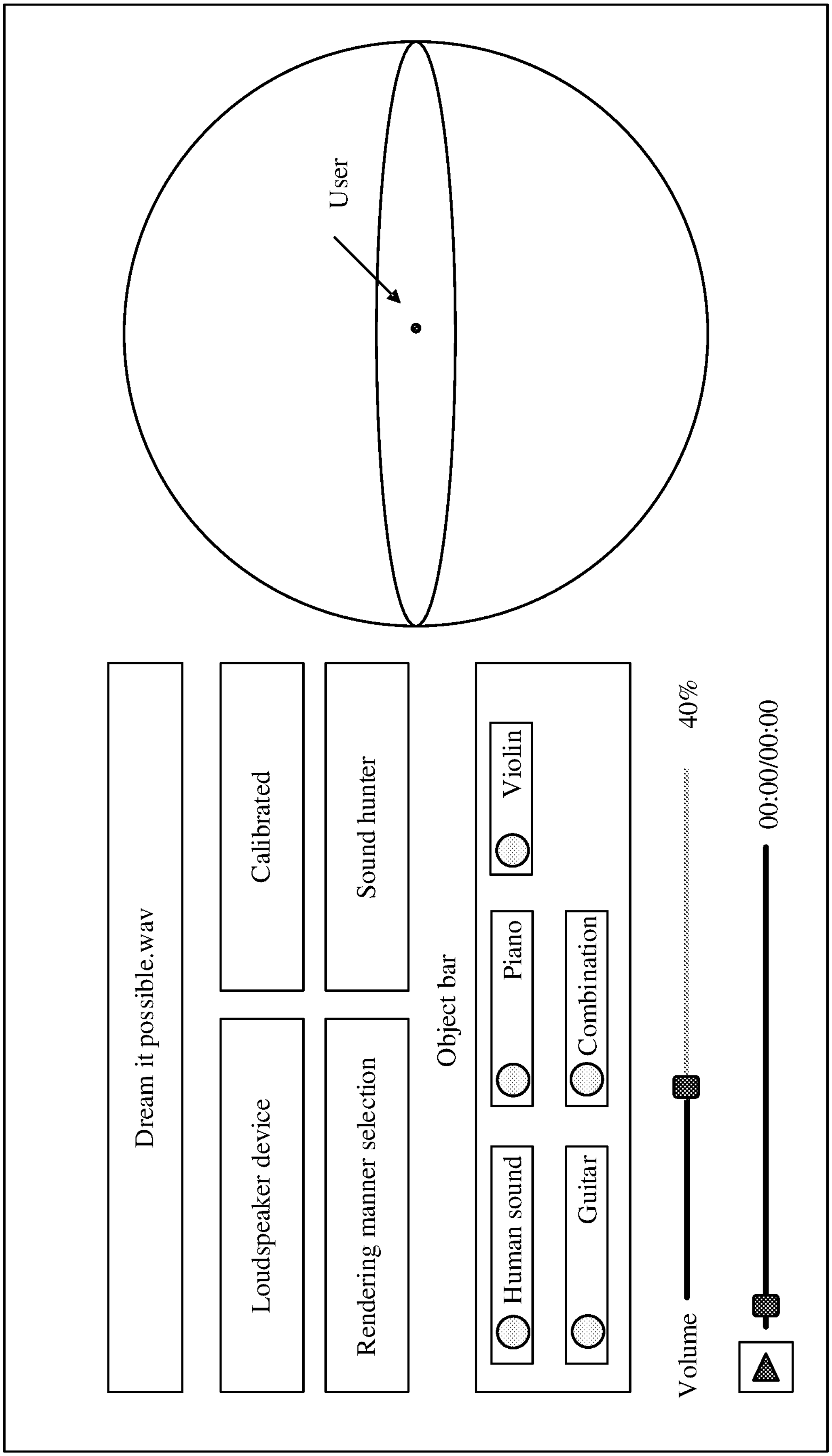

It may be understood that an example in which the playing device shown in FIG. 22 to FIG. 24 is a loudspeaker device is merely used. Certainly, the user may select a headset as the type of the playing device. An example in which a loudspeaker device is selected by the user as the type of the playing device during calibration is merely used for description in the following.

Figure 25:
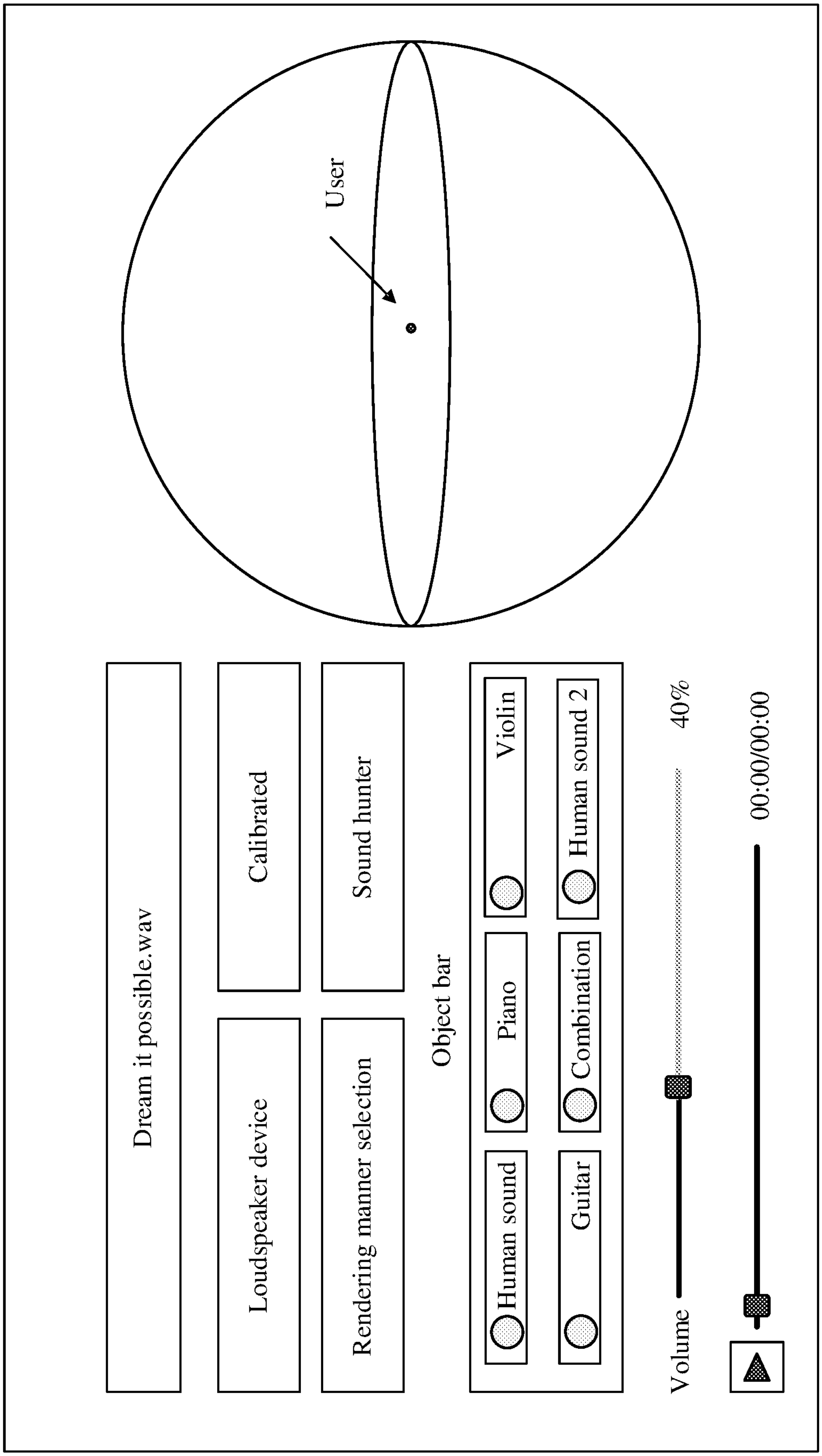

In addition, the rendering device may further duplicate one or more single-object audio tracks in the original audio track. For example, as shown in FIG. 25, the user may further duplicate a "human sound icon" in an object bar to obtain a "human sound 2 icon", where a single-object audio track corresponding to a human sound 2 is the same as the single-object audio track corresponding to the human sound. A duplication manner may be that the user double-taps the "human sound icon", or may double-tap a human sound in a spherical view. This is not specifically limited herein. After the user obtains the "human sound 2 icon" in the duplication manner, it may be considered by default that the user may lose control permission for the human sound, and start to control the human sound 2. Optionally, after the user obtains the human sound 2 in the duplication manner, a first sound source position of the human sound may be further displayed in the spherical view. Certainly, the user may duplicate a sound object, or may delete a sound object.

Step 1003: Determine a first sound source position of the first sound object based on reference information.

In this embodiment of this application, when the original audio track of the multimedia file includes a plurality of sound objects, a sound source position of one sound object may be determined based on the reference information, or a plurality of sound source positions corresponding to the plurality of sound objects may be determined based on the reference information. This is not specifically limited herein.

Figure 26:
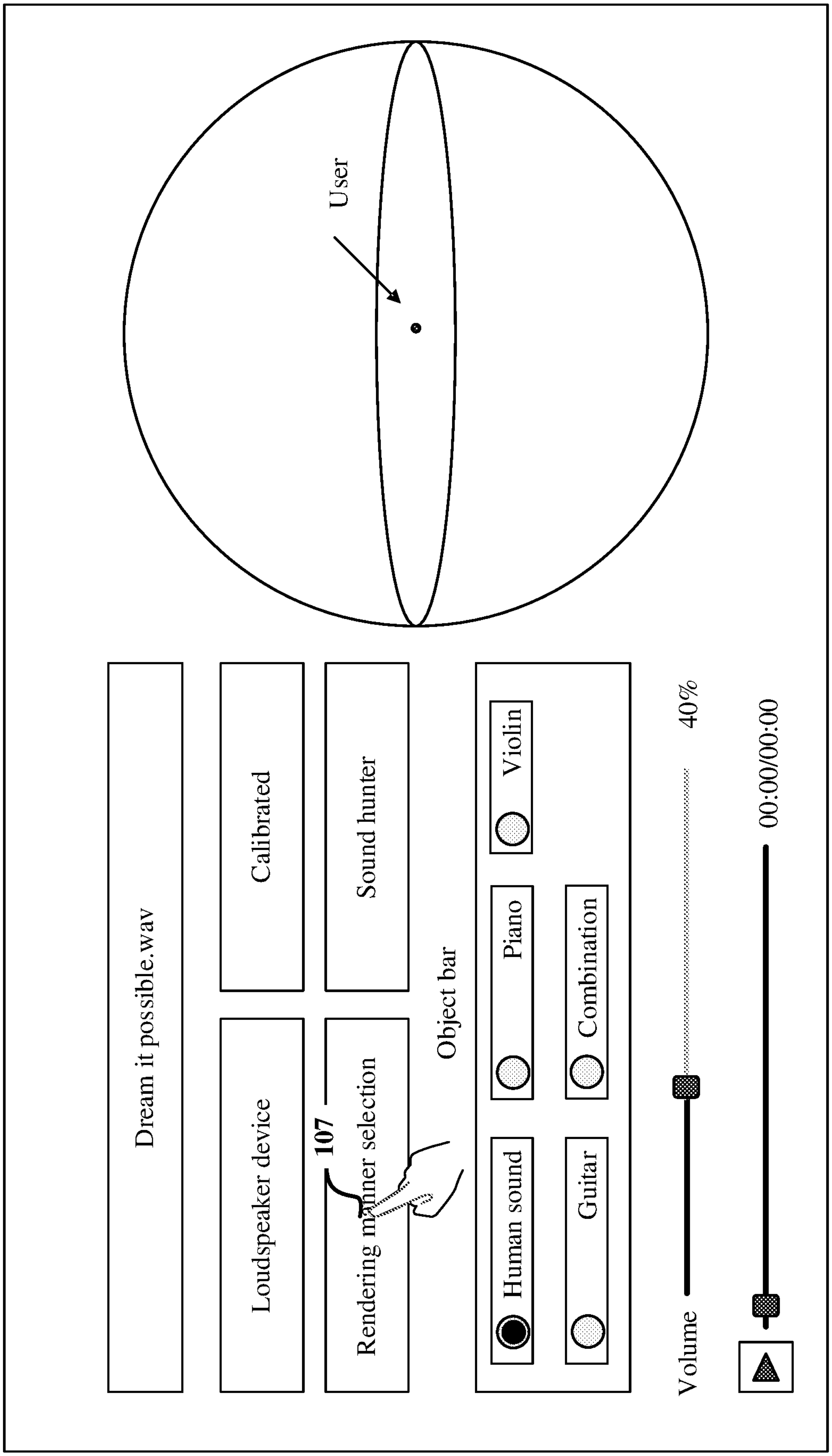
Figure 27:
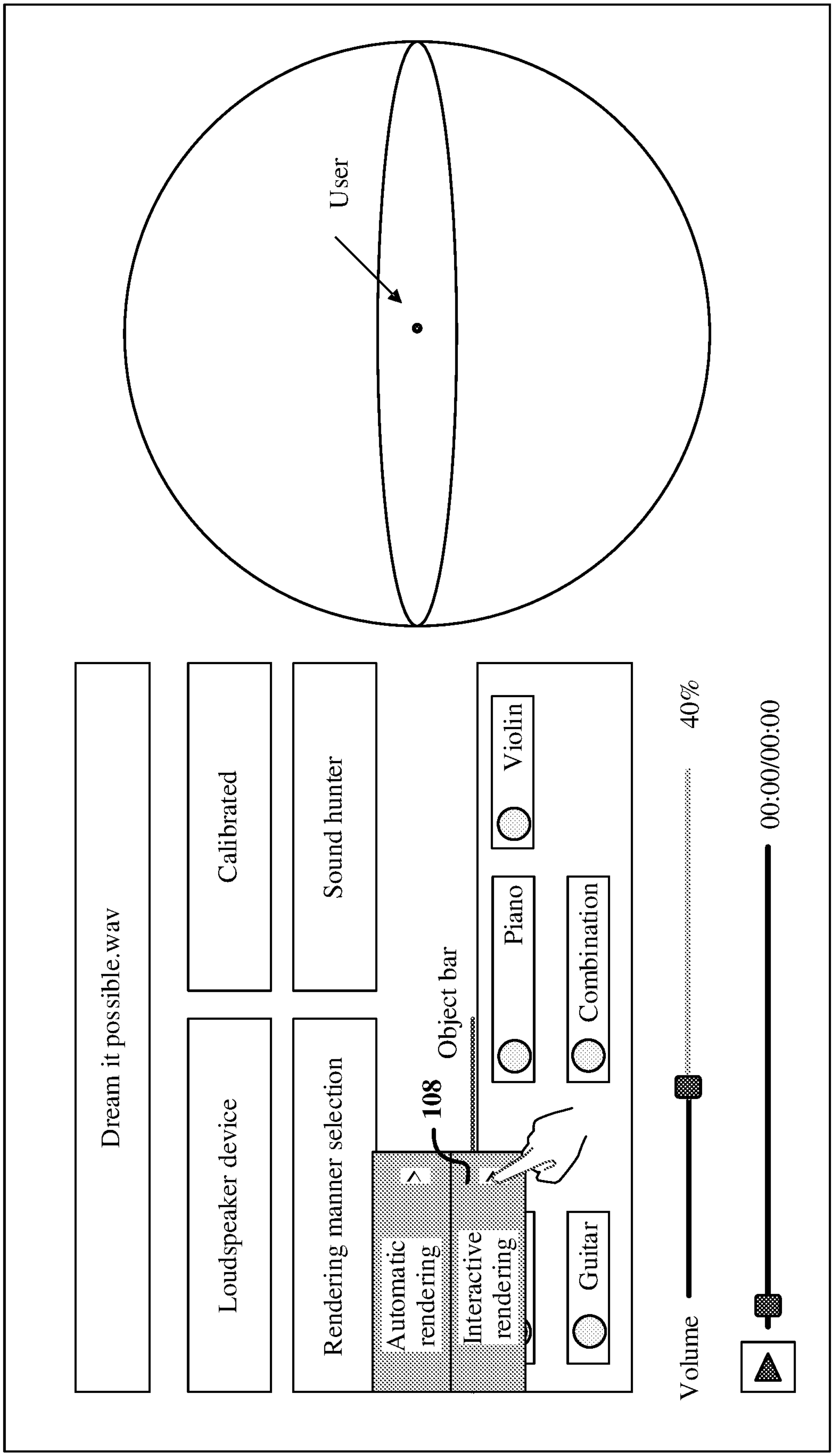

For example, the foregoing example is still used. The rendering device determines that the first sound object is the human sound, and the rendering device may display an interface shown in FIG. 26. The user may tap a "rendering manner selection icon" 107 to select the reference information, where the reference information is used to determine the first sound source position of the first sound object. As shown in FIG. 27, the rendering device may display a drop-down list in response to a first operation (that is, the foregoing tapping operation) of the user. The drop-down list may include an "automatic rendering option" and an "interactive rendering option". The "interactive rendering option" corresponds to reference position information, and the "automatic rendering option" corresponds to media information.

It may also be understood that the rendering manner includes an automatic rendering manner and an interactive rendering manner. The automatic rendering manner means that the rendering device automatically obtains a rendered first single-object audio track based on the media information in the multimedia file. The interactive rendering manner means that a rendered first single-object audio track is obtained through interaction between the user and the rendering device. In other words, when the automatic rendering manner is determined, the rendering device may obtain the rendered first single-object audio track in a preset manner; or when the interactive rendering manner is determined, the rendering device obtains the reference position information in response to a second operation of the user, determines the first sound source position of the first sound object based on the reference position information, and renders the first single-object audio track based on the first sound source position, to obtain the rendered first single-object audio track. The preset manner includes: obtaining the media information of the multimedia file; determining the first sound source position of the first sound object based on the media information; and rendering the first single-object audio track based on the first sound source position, to obtain the rendered first single-object audio track.

In addition, sound source positions (the first sound source position and a second sound source position) in this embodiment of this application may be fixed positions at a moment, or may be a plurality of positions (for example, motion tracks) in a time period. This is not specifically limited herein.

In this embodiment of this application, the reference information has a plurality of cases. The following separately describes the cases.

In a first case, the reference information includes the reference position information.

The reference position information in this embodiment of this application indicates the sound source position of the first sound object. The reference position information may be first position information of the sensor device, may be second position information selected by the user, or the like. This is not specifically limited herein.

In this embodiment of this application, the reference position information has a plurality of cases. The following separately describes the cases.

1. The reference position information is the first position information of the sensor device (referred to as a sensor below).

For example, the foregoing example is still used. As shown in FIG. 27, further, the user may tap an "interactive rendering option" 108, to determine that the rendering manner is interactive rendering. The rendering device may display a drop-down list in response to the tapping operation. The drop-down list may include an "orientation control option", a "position control option", and an "interface control option".

In this embodiment of this application, the first position information has a plurality of cases. The following separately describes the cases.

1.1. The first position information includes a first posture angle of the sensor.

Similar to that the loudspeaker device is previously calibrated by using the orientation of the sensor, the user may adjust an orientation of a handheld sensor device (for example, the mobile phone) through a second operation (for example, up, down, left, and right translation), to determine the first sound source position of the first single-object audio track. It may also be understood that the rendering device may receive a first posture angle of the mobile phone, and obtain the first sound source position of the first single-object audio track according to the following formula 3, where the first sound source position includes an azimuth, an oblique angle, and a distance between the loudspeaker device and the mobile phone.

Further, the user may further determine the second sound source position of the second single-object audio track by adjusting the orientation of the handheld mobile phone again. It may also be understood that the rendering device may receive the first posture angle (including the azimuth and the oblique angle) of the mobile phone, and obtain the second sound source position of the second single-object audio track according to the following formula 3, where the second sound source position includes an azimuth, an oblique angle, and a distance between the loudspeaker device and the mobile phone.

Optionally, if no connection is established between the mobile phone and the rendering device, the rendering device may send reminder information to the user, where the reminder information is used to remind the user to connect the mobile phone to the rendering device. Certainly, the mobile phone and the rendering device may alternatively be a same mobile phone. In this case, the reminder information does not need to be sent.

The formula 3 may be as follows:

$$\begin{bmatrix} \lambda(t) \\ \Phi(t) \\ d(t) \end{bmatrix} = \begin{bmatrix} \begin{cases} \Omega(t)[0]\ \%360 & \text{if } |\Omega(t)[1]| \le 90 \\ (\Omega(t)[0]-180)\ \%360 & \text{if } |\Omega(t)[1]| > 90 \end{cases} \\ \Omega(t)[1] \quad \text{if } |\Omega(t)[1]| \le 90 \\ \text{sign}\ (\Omega(t)[1])(180-|\Omega(t)[1]|) \quad \text{if } |\Omega(t)[1]| > 90 \\ d(t) \end{bmatrix} \quad \text{Formula 3}$$

λ(t) represents an azimuth of the $i^{th}$ loudspeaker device in the spherical coordinate system at a moment t, Φ(t) represents an oblique angle of the $i^{th}$ loudspeaker device in the spherical coordinate system at the moment t, and d(t) represents a distance between the mobile phone and the $i^{th}$ loudspeaker device at the moment t. Ω(t)[0] represents an azimuth of the mobile phone at the moment t (that is, a rotation angle of the mobile phone around a z axis), and Ω(t)[1] represents an oblique angle of the mobile phone at the moment t (that is, a rotation angle of the mobile phone around a y axis). d(t) represents the distance between the mobile phone and the $i^{th}$ loudspeaker device at the moment t, where the distance may be the distance calculated by using the formula 1 during calibration, or may be set to a default value (for example, 1 meter); and d(t) may be adjusted based on a requirement. sign represents a positive or negative value; and if Ω(t)[1] is positive, sign is positive; or if Ω(t)[1] is negative, sign is negative. %360 is used to adjust an angle range to 0 degrees to 360 degrees, for example, if an angle of Ω(t)[0] is −80 degrees, Ω(t)[0]%360 represents −80+360=280 degrees.

It may be understood that the formula 3 is merely an example. In actual application, the formula 3 may be in another form. This is not specifically limited herein.

Figure 28:
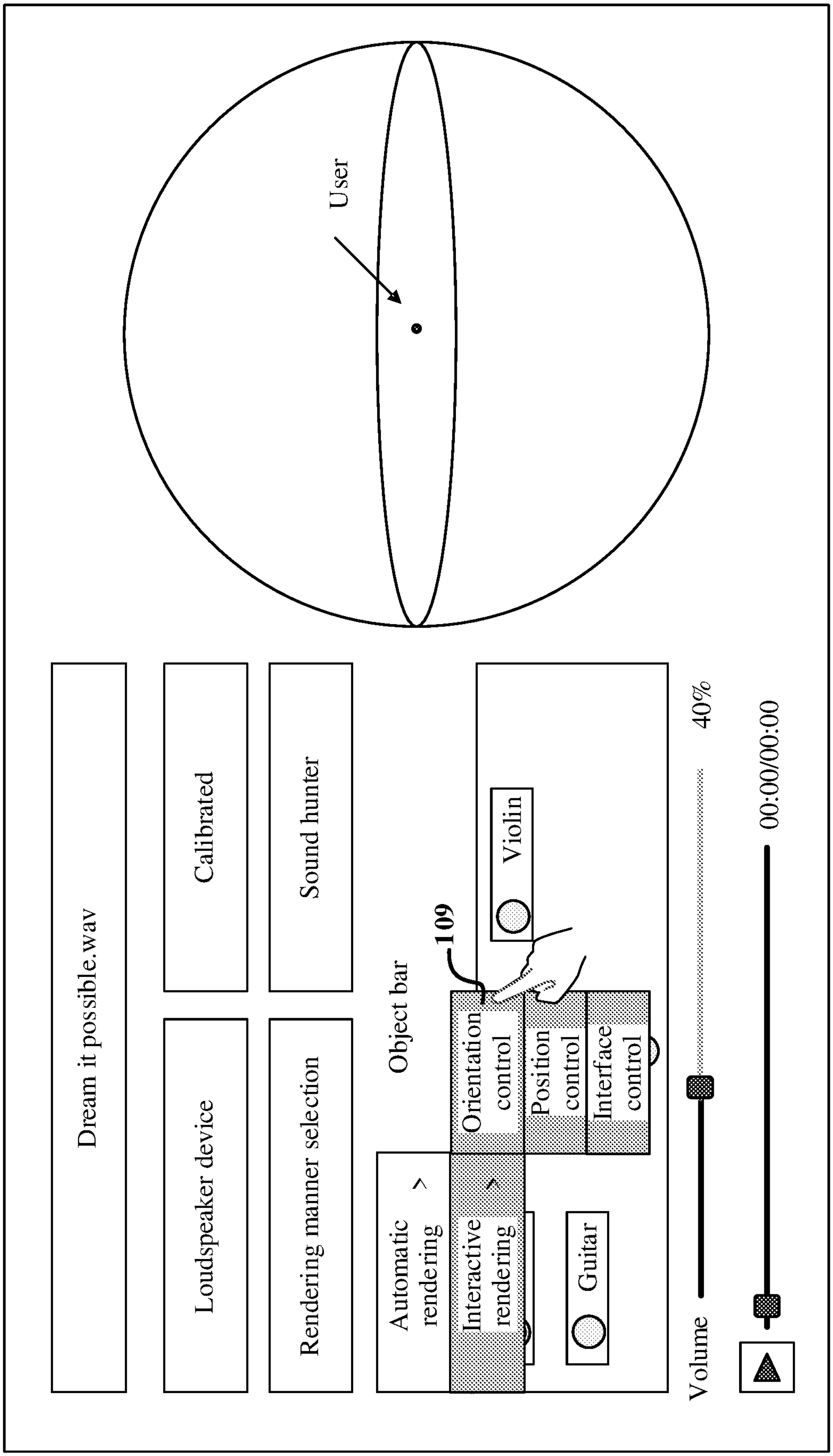
Figure 29:
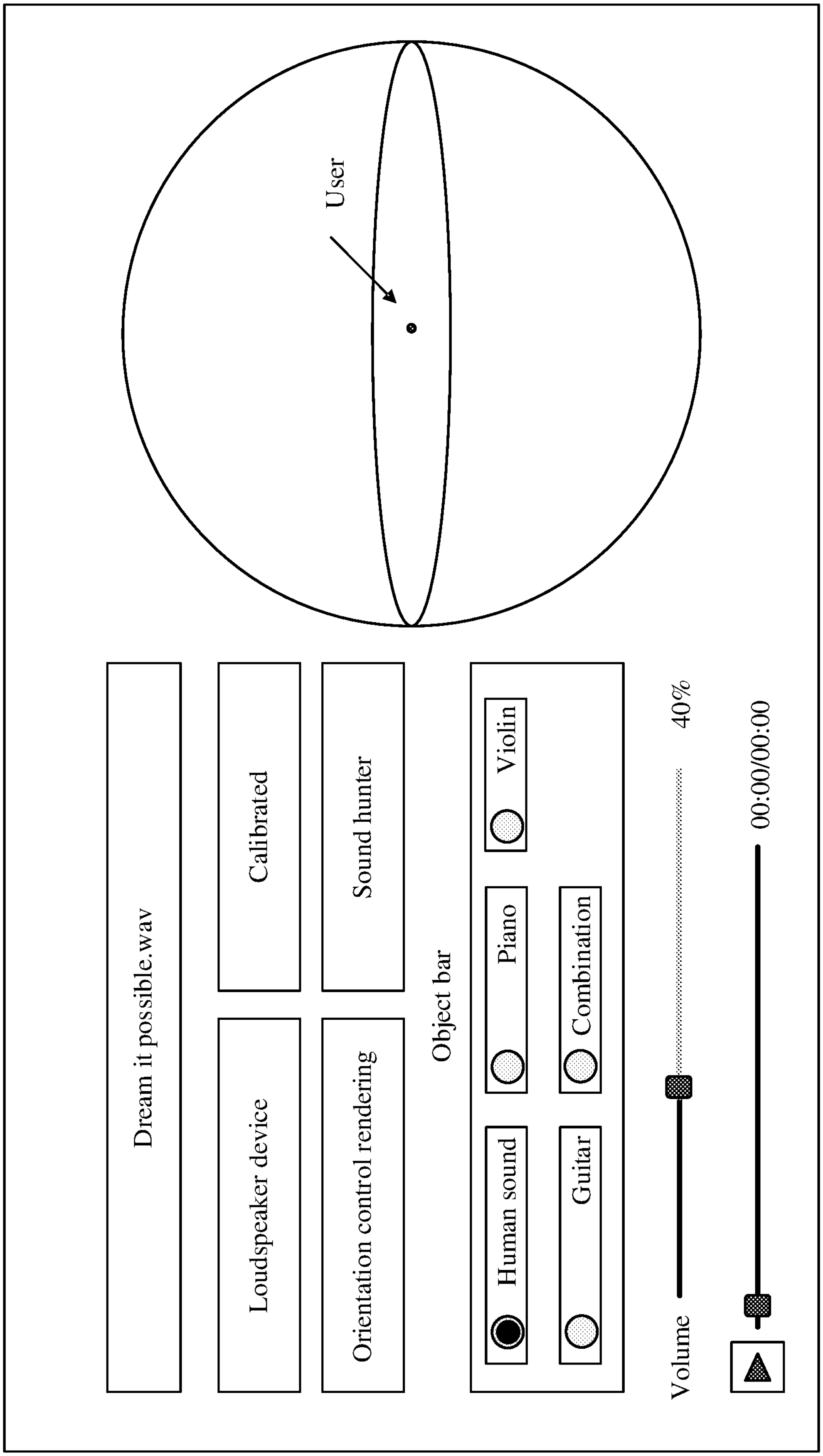
Figure 30:
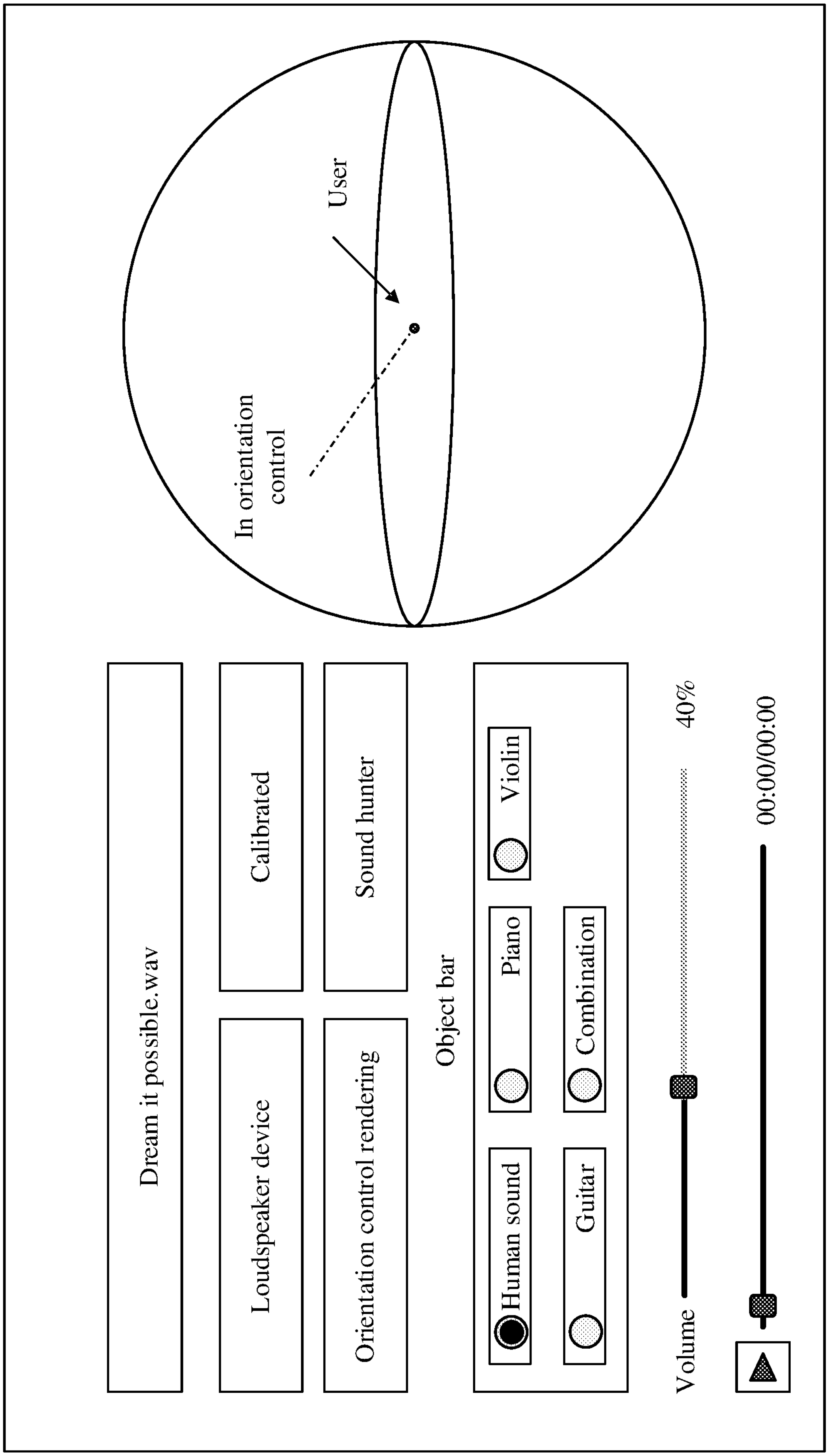
Figure 31:
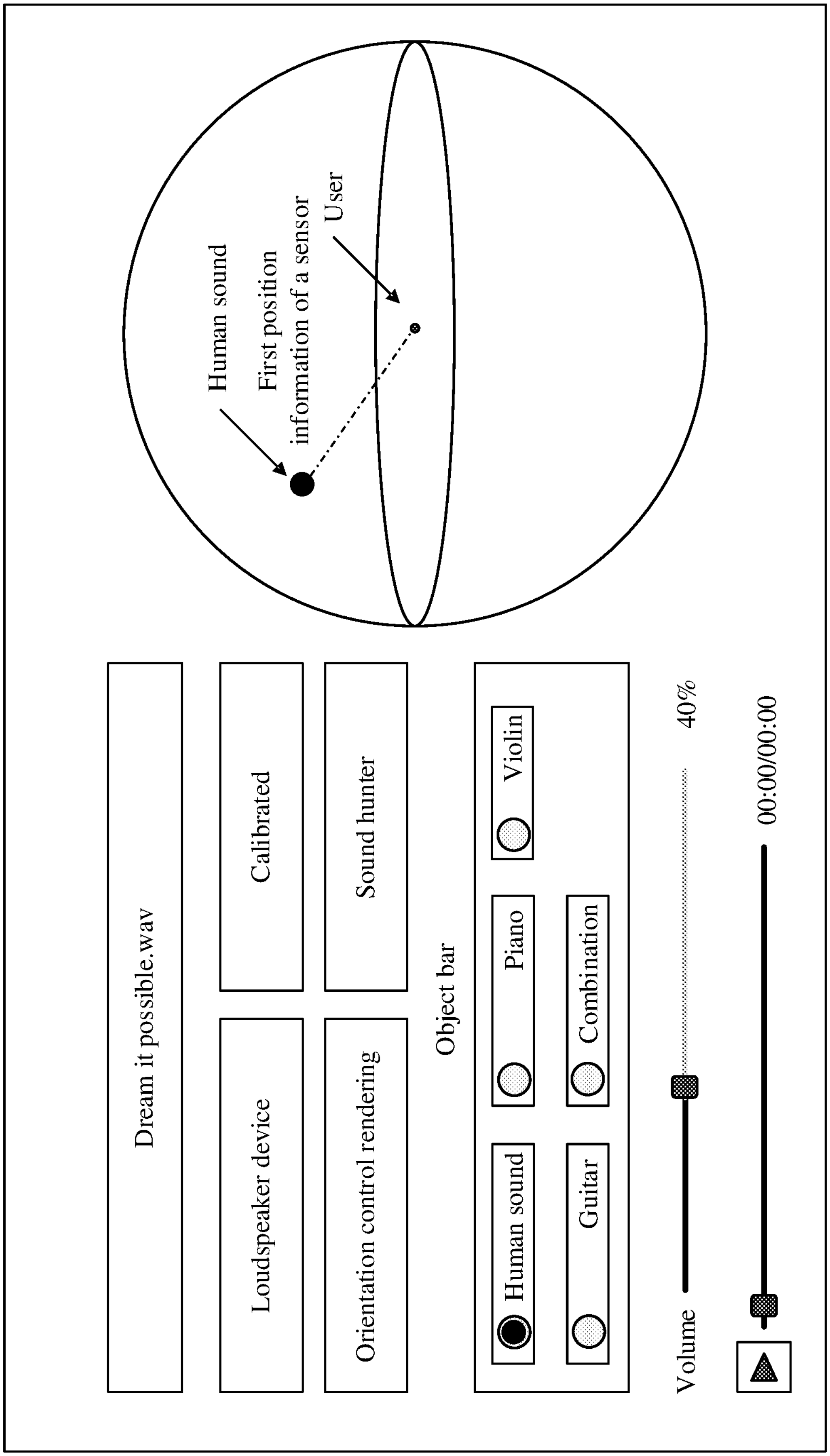

For example, the foregoing example is still used. As shown in FIG. 28, the rendering device may display a drop-down list. The drop-down list may include an "orientation control option", a "position control option", and an "interface control option". The user may tap an "orientation control option" 109, to determine that the rendering manner is orientation control in interactive rendering. In addition, after the user selects orientation control, the rendering device may display an interface shown in FIG. 29. In the interface, "rendering manner selection" may be replaced with "orientation control rendering", to prompt the user that a current rendering manner is orientation control. In this case, the user may adjust an orientation of the mobile phone. When the user adjusts the orientation of the mobile phone, as shown in FIG. 30, a dashed line may be displayed in a spherical view in a display interface of the rendering device, and the dashed line represents a current orientation of the mobile phone. In this way, the user can intuitively view the orientation of the mobile phone in the spherical view, to help the user determine the first sound source position. After the orientation of the mobile phone is stable (refer to the foregoing explanation about that the mobile phone is stably placed, and details are not described herein again), a current first posture angle of the mobile phone is determined. Further, the first sound source position is obtained by using the formula 3. In addition, if a position of the user does not change compared with that during calibration, the distance between the mobile phone and the loudspeaker device that is obtained during calibration may be used as d(t) in the formula 3. In this way, the user determines the first sound source position of the first sound object based on the first posture angle. Alternatively, the first sound source position of the first sound object is understood as the first sound source position of the first single-object audio track. Further, the rendering device may display an interface shown in FIG. 31. A spherical view in the interface includes the first position information of the sensor (that is, the first position information of the mobile phone) corresponding to the first sound source position.

Figure 32:
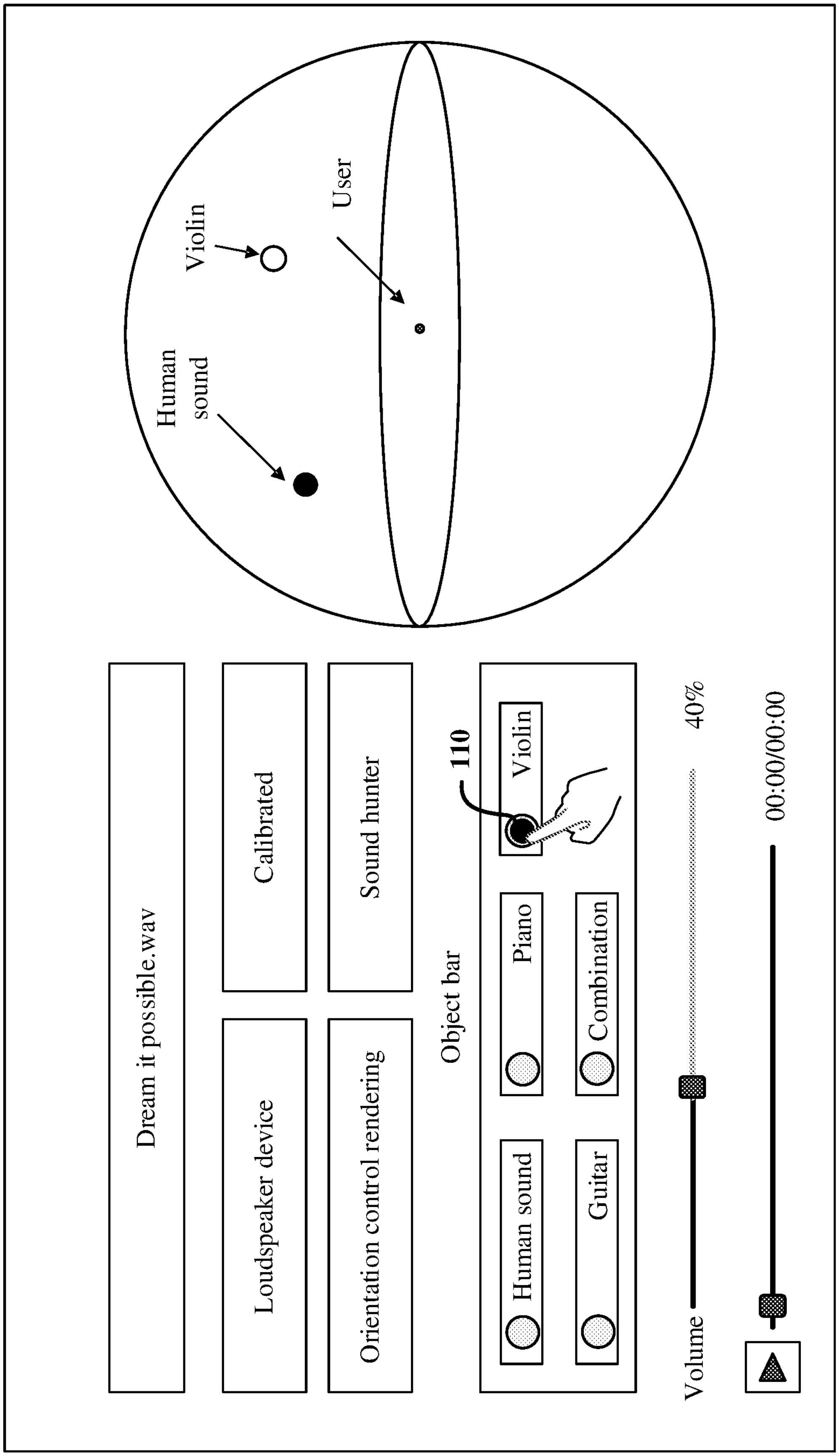

In addition, the foregoing example is an example of determining the first sound source position. Further, the user may determine the second sound source position of the second single-object audio track. For example, as shown in FIG. 32, the user may determine, by tapping a "violin icon" 110, that the second sound object is a violin. The rendering device monitors a posture angle of the mobile phone, and determines the second sound source position by using the formula 3. As shown in FIG. 32, a spherical view in a display interface of the rendering device may display the currently determined first sound source position of the first sound object (the person) and the currently determined second sound source position of the second sound object (the violin).

In this manner, the user may perform real-time or subsequent dynamic rendering on the selected sound object based on the orientation (that is, the first posture angle) provided by the sensor. In this case, the sensor is similar to a laser pointer, and a position to which a laser points is the sound source position. This may assign a specific spatial orientation and specific motion to the sound object, so that interaction production between the user and audio is implemented, to provide new experience for the user.

1.2. The first position information includes a second posture angle and acceleration of the sensor.

The user may control a position of the sensor device (for example, the mobile phone) through a second operation, to determine the first sound source position. It may also be understood that the rendering device may receive a second posture angle (including an azimuth, an oblique angle, and a pitch angle) and acceleration of the mobile phone, and obtain the first sound source position according to the following formula 4 and formula 5. The first sound source position includes an azimuth, an oblique angle, and a distance between the loudspeaker device and the mobile phone. To be specific, the second posture angle and the acceleration of the mobile phone are first converted into coordinates of the mobile phone in a spatial rectangular coordinate system by using the formula 4, and then the coordinates of the mobile phone in the spatial rectangular coordinate system are converted into coordinates of the mobile phone in the spherical coordinate system by using the formula 5, that is, the first sound source position.

The formula 4 and the formula 5 may be as follows:

Formula 4

$$\begin{bmatrix} x(t) \\ y(t) \\ z(t) \end{bmatrix} = \int_0^t \left( a'(t) - \begin{bmatrix} 0 \\ 0 \\ g \end{bmatrix} \right) t\,dt - \begin{bmatrix} 0 \\ -0.2 \\ 0 \end{bmatrix}, \text{ where}$$

$$a'(t) = \begin{bmatrix} 1 & 0 & 0 \\ 0 & \cos(\Omega(t)[2]) & \sin(\Omega(t)[2]) \\ 0 & -\sin(\Omega(t)[2]) & \cos(\Omega(t)[2]) \end{bmatrix} \begin{bmatrix} \cos(\Omega(t)[1]) & 0 & -\sin(\Omega(t)[1]) \\ 0 & 1 & 0 \\ \sin(\Omega(t)[1]) & 0 & \cos(\Omega(t)[1]) \end{bmatrix} \begin{bmatrix} \cos(\Omega(t)[0]) & \sin(\Omega(t)[0]) & 0 \\ -\sin(\Omega(t)[0]) & \cos(\Omega(t)[0]) & 0 \\ 0 & 0 & 1 \end{bmatrix} a(t)$$

Formula 5

$$\begin{bmatrix} \lambda(t) \\ \Phi(t) \\ d(t) \end{bmatrix} = \begin{bmatrix} \arccos\frac{z}{\sqrt{x^2(t)+y^2(t)+z^2(t)}} \\ \mathrm{Arctan}(y, x) \\ \sqrt{x^2(t)+y^2(t)+z^2(t)} \end{bmatrix}$$

x(t), y(t), and z(t) represent position information of the mobile phone in the spatial rectangular coordinate system at a moment t, g represents gravity acceleration, a(t) represents acceleration of the mobile phone at the moment t, Ω(t)[0] represents an azimuth of the mobile phone at the moment t (that is, a rotation angle of the mobile phone around a z axis), Ω(t)[1] represents a pitch angle of the mobile phone at the moment t (that is, a rotation angle of the mobile phone around an x axis), Ω(t)[2] represents an oblique angle of the mobile phone at the moment t (that is, a rotation angle of the mobile phone around a y axis), 2(1) represents an azimuth of the $i^{th}$ loudspeaker device at the moment t, Φ(t) represents an oblique angle of the $i^{th}$ loudspeaker device at the moment t, and d(t) represents a distance between the $i^{th}$ loudspeaker device and the mobile phone at the moment t.

It may be understood that the formula 4 and the formula 5 are merely examples. In actual application, the formula 4 and the formula 5 each may alternatively be in another form. This is not specifically limited herein.

Figure 33:
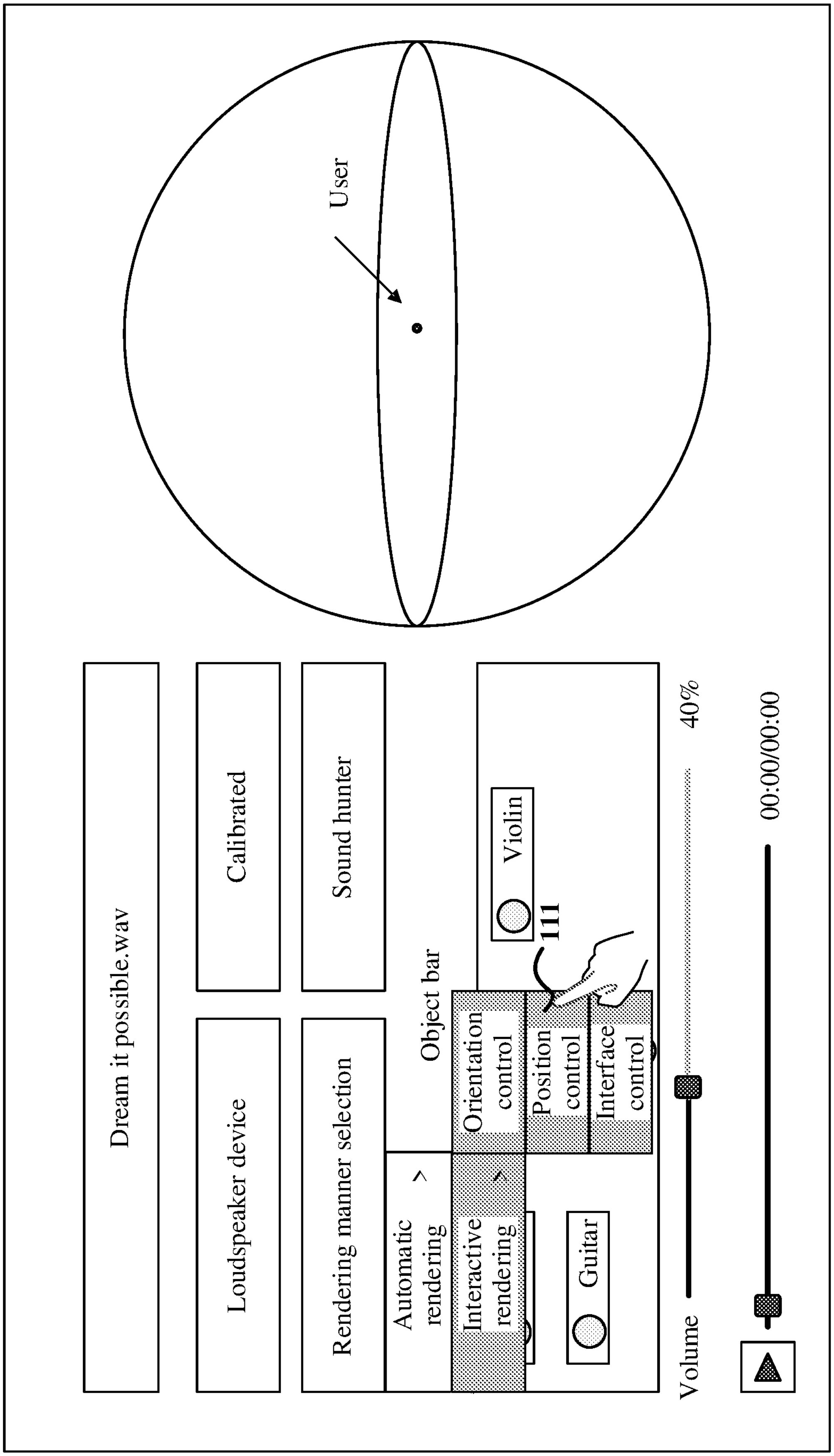
Figure 34:
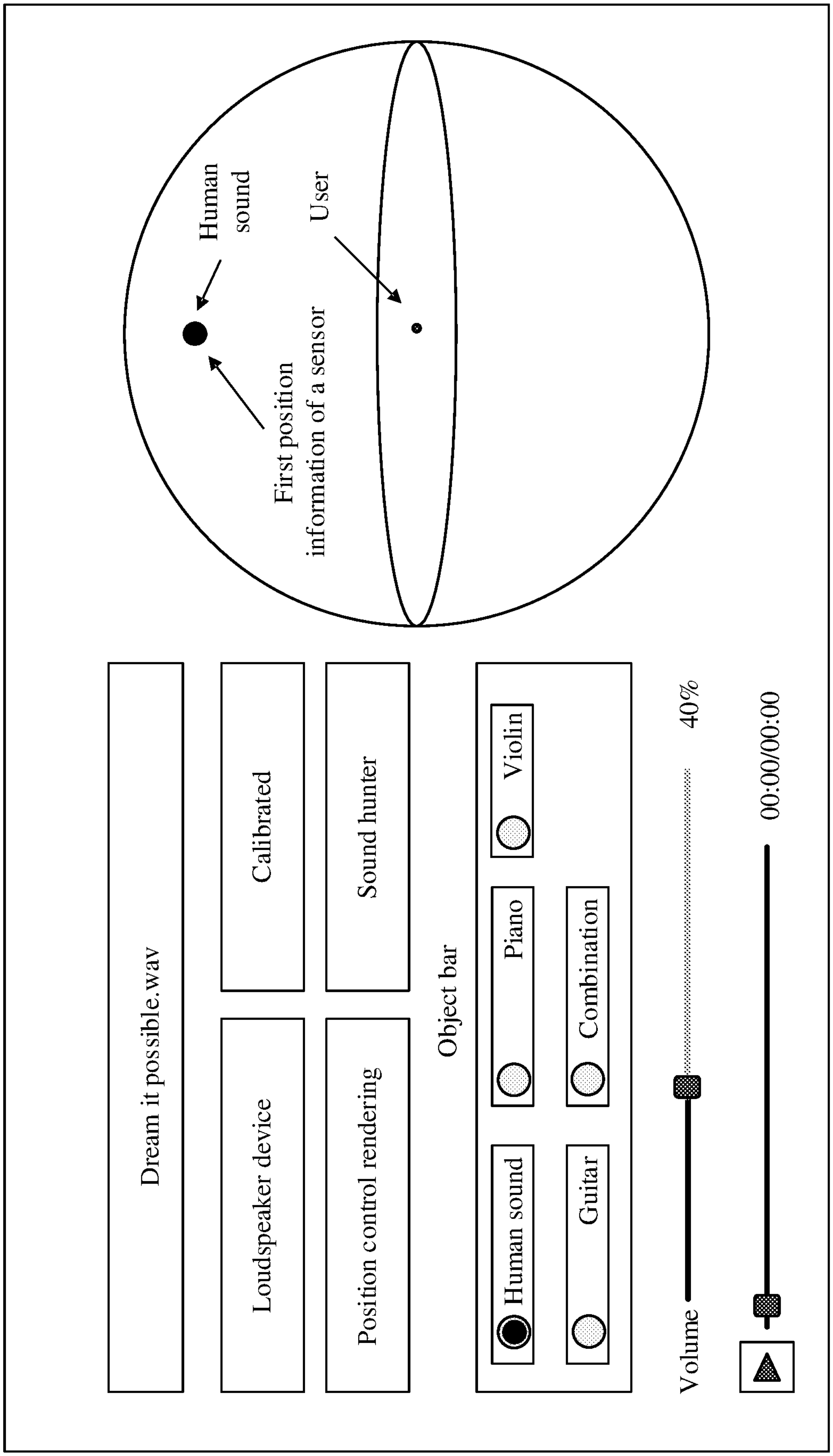

For example, the foregoing example is still used. If the rendering device displays an interface shown in FIG. 27, after the user determines that the rendering manner is interactive rendering, the rendering device may display a drop-down list. The drop-down list may include an "orientation control option", a "position control option", and an "interface control option". The user may tap the "orientation control option". As shown in FIG. 33, the user may tap a "position control option" 111, to determine that the rendering manner is position control in interactive rendering. In addition, after the user selects position control, in a display interface of the rendering device, "rendering manner selection" may be replaced with "position control rendering", to prompt the user that a current rendering manner is position control. In this case, the user may adjust the position of the mobile phone. After the position of the mobile phone is stable (refer to the foregoing explanation about that the mobile phone is stably placed, and details are not described herein again), a current second posture angle and current acceleration of the mobile phone are determined. Further, the first sound source position is obtained by using the formula 4 and the formula 5. In this way, the user determines the first sound source position of the first sound object based on the second posture angle and the acceleration. Alternatively, the first sound source position of the first sound object is understood as the first sound source position of the first single-object audio track. Further, in a process in which the user adjusts the mobile phone, or after the position of the mobile phone is stable, the rendering device may display an interface shown in FIG. 34. A spherical view in the interface includes the first position information of the sensor (that is, the first position information of the mobile phone) corresponding to the first sound source position. In this way, the user can intuitively view the position of the mobile phone in the spherical view, to help the user determine the first sound source position. If the interface of the rendering device displays the first position information in the spherical view in a process in which the user adjusts the position of the mobile phone, the first sound source position may changes in real time based on a position change of the mobile phone.

In addition, the foregoing example is an example of determining the first sound source position. Further, the user may determine the second sound source position of the second single-object audio track. A manner of determining the second sound source position is similar to a manner of determining the first sound source position. Details are not described herein again.

It may be understood that the foregoing two manners of the first position information are merely examples. In actual application, the first position information may alternatively have another case. This is not specifically limited herein.

In this manner, a single-object audio track corresponding to a sound object in audio is separated, the sound object is controlled by using actual position information of the sensor as a sound source position, and real-time or subsequent dynamic rendering is performed. In this way, a motion track of the sound object can be simply and completely controlled, so that editing flexibility is greatly improved.

2. The reference position information is the second position information selected by the user.

The rendering device may provide a spherical view for the user to select the second position information. A spherical center of the spherical view is a position of the user, and a radius of the spherical view is a distance between the position of the user and the loudspeaker device. The rendering device obtains the second position information selected by the user in the spherical view, and converts the second position information into the first sound source position. It may also be understood that the rendering device obtains second position information of a point selected by the user in the spherical view, and converts the second position information of the point into the first sound source position. The second position information includes two-dimensional coordinates and a depth (that is, a distance between a tangent plane and the spherical center) of a point selected by the user on the tangent plane in the spherical view.

Figure 35:
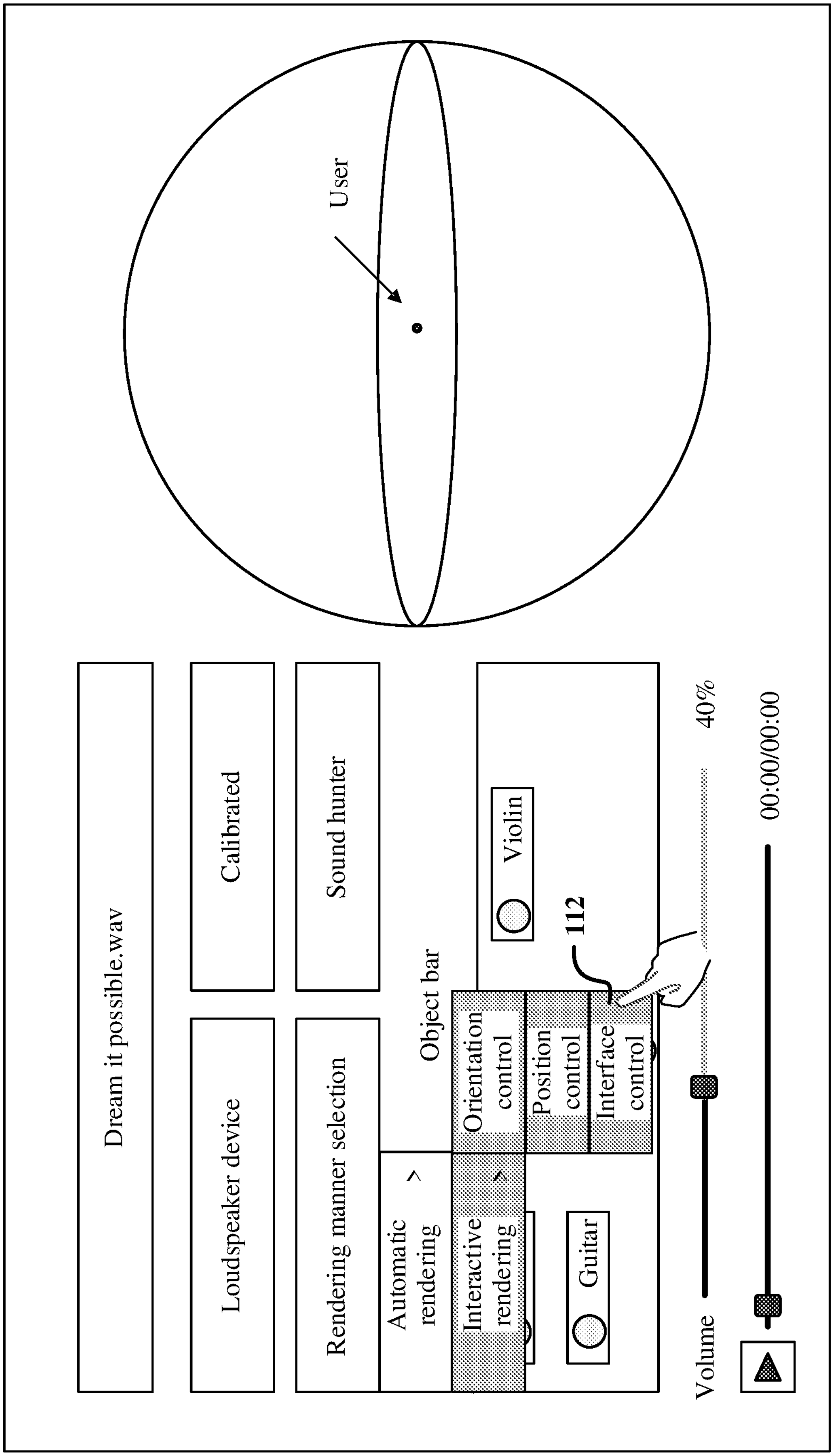
Figure 36:
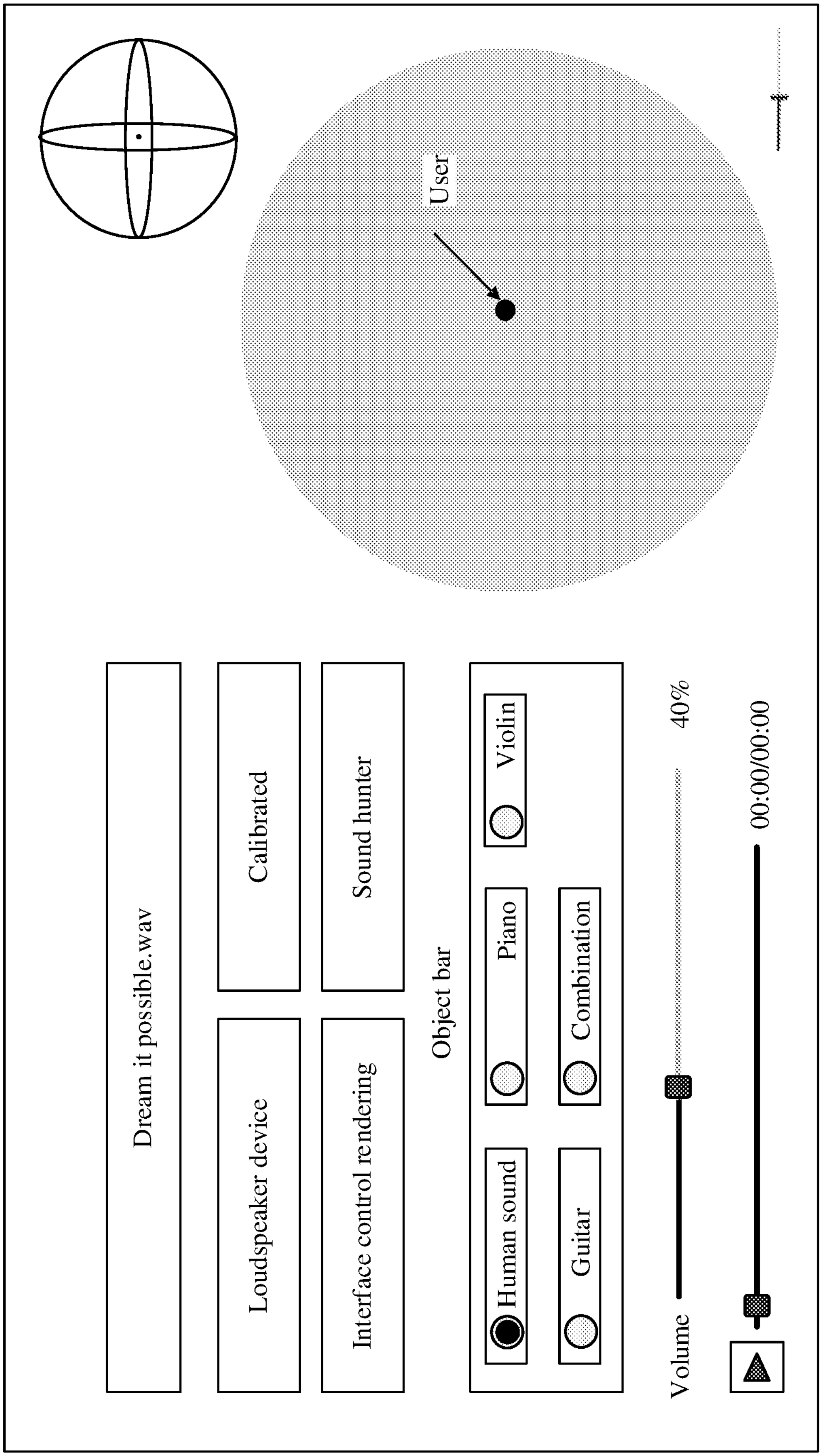

For example, the foregoing example is still used. If the rendering device displays the interface shown in FIG. 27, after the user determines that the rendering manner is interactive rendering, the rendering device may display a drop-down list. The drop-down list may include an "orientation control option", a "position control option", and an "interface control option". The user may tap the "interface control option". As shown in FIG. 35, the user may tap an "interface control option" 112, to determine that the rendering manner is interface control in interactive rendering. In addition, after the user selects interface control, the rendering device may display an interface shown in FIG. 36. In the interface, "rendering manner selection" may be replaced with "interface control rendering", to prompt the user that a current rendering manner is interface control.

In this embodiment of this application, the second position information has a plurality of cases. The following separately describes the cases.

2.1. The second position information is obtained based on selection of the user on a vertical tangent plane.

The rendering device obtains two-dimensional coordinates of a point selected by the user on the vertical tangent plane and a distance (referred to as a depth below) between the vertical tangent plane on which the point is located and a circle center, and converts the two-dimensional coordinates and the depth into the first sound source position according to the following formula 6, where the first sound source position includes an azimuth, an oblique angle, and a distance between the loudspeaker device and the mobile phone.

Figure 37:
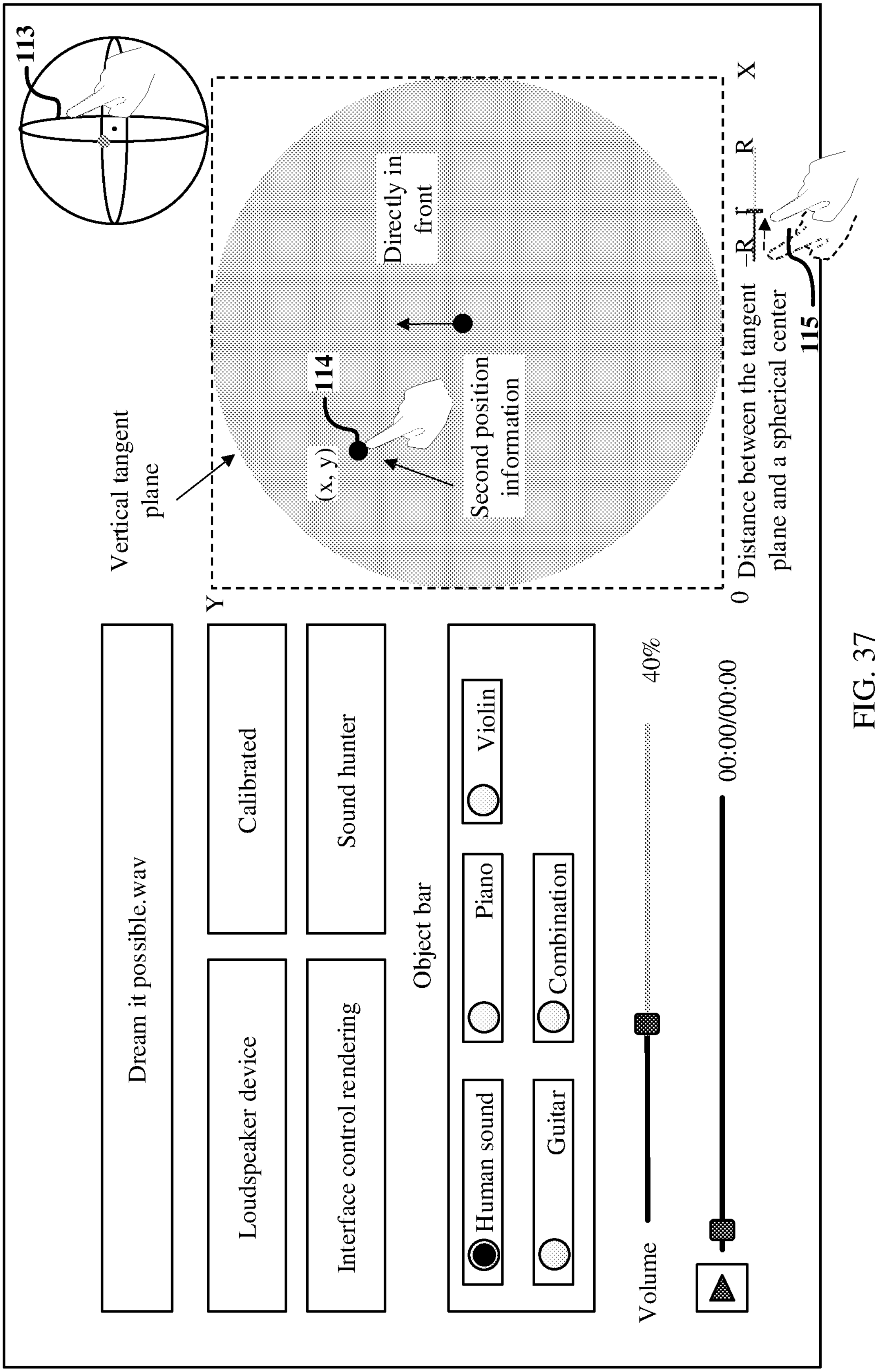

For example, the foregoing example is still used. Further, if the vertical tangent plane is jumped to by default, as shown in FIG. 37, a spherical view, the vertical tangent plane, and a depth control bar may be displayed on the right side of an interface of the rendering device. The depth control bar is used to adjust a distance between the vertical tangent plane and a spherical center. The user may tap a point (x, y) (as shown by 114) on a horizontal plane. Correspondingly, a position of the point in the spherical coordinate system is displayed in the spherical view in the upper right corner. In addition, if a horizontal tangent plane is jumped to by default, the user may tap a meridian (as shown by 113 in FIG. 37) in the spherical view. In this case, the interface displays the vertical tangent plane in the interface shown in FIG. 37. Certainly, the user may alternatively adjust the distance between the vertical tangent plane and the spherical center through a sliding operation (as shown by 115 in FIG. 37). The second position information includes two-dimensional coordinates (x, y) and a depth r of the point. The first sound source position is obtained by using the formula 6.

The formula 6 may be as follows:

Formula 6

$$\lambda = \begin{cases} \arctan\left(r, y - \frac{Y}{2}\right) \%360 & y > \frac{Y}{2} \\ \arctan\left(r, y - \frac{Y}{2}\right) + 180 & y \le \frac{Y}{2} \end{cases};$$

$$\Phi = \arctan\left(x - \frac{X}{2}, \sqrt{r^2 + \left(y - \frac{Y}{2}\right)^2}\right); \text{ and}$$

-continued $$d=\sqrt{r^2+\left(x-\frac{X}{2}\right)^2+\left(y-\frac{Y}{2}\right)^2}$$

x represents a horizontal coordinate of the point selected by the user on the vertical tangent plane, y represents a vertical coordinate of the point selected by the user on the vertical tangent plane, r represents the depth, λ represents an azimuth of the $i^{th}$ loudspeaker device, Φ represents an oblique angle of the $i^{th}$ loudspeaker device, and & represents a distance between the $i^{th}$ loudspeaker device and the mobile phone (which may also be understood as a distance between the $i^{th}$ loudspeaker device and the user). %360 is used to adjust an angle range to 0 degrees to 360 degrees, for example, if an angle of $$\arctan\left(r, y-\frac{Y}{2}\right)$$

is −60 degrees, $$\arctan\left(r, y-\frac{Y}{2}\right)\%360$$

represents −60+360=300 degrees.

It may be understood that the formula 6 is merely an example. In actual application, the formula 6 may be in another form. This is not specifically limited herein.

2.2. The second position information is obtained based on selection of the user on a horizontal tangent plane.

The rendering device obtains two-dimensional coordinates of a point selected by the user on the horizontal tangent plane and a distance (referred to as a depth below) between the horizontal tangent plane on which the point is located and a circle center, and converts the two-dimensional coordinates and the depth into the first sound source position according to the following formula 7, where the first sound source position includes an azimuth, an oblique angle, and a distance between the loudspeaker device and the mobile phone.

Figure 38:
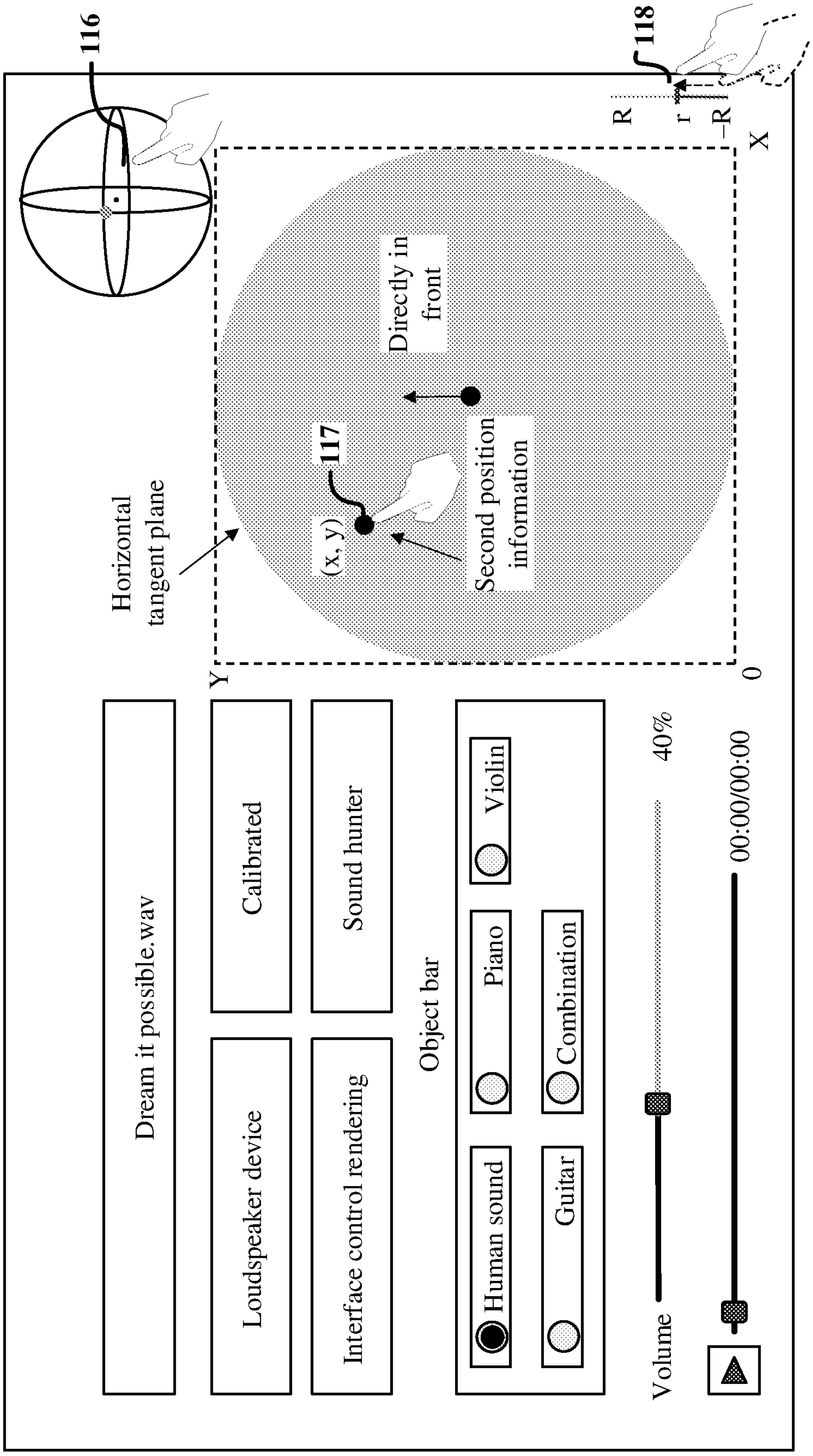

For example, the foregoing example is still used. Further, if the horizontal tangent plane is jumped to by default, as shown in FIG. 38, a spherical view, the horizontal tangent plane, and a depth control bar may be displayed on the right side of an interface of the rendering device. The depth control bar is used to adjust a distance between the horizontal tangent plane and a spherical center. The user may tap a point (x, y) (as shown by 117) on a horizontal plane. Correspondingly, a position of the point in the spherical coordinate system is displayed in the spherical view in the upper right corner. In addition, if a vertical tangent plane is jumped to by default, the user may tap a latitude (as shown by 116 in FIG. 38) in the spherical view. In this case, the interface displays the horizontal tangent plane in the interface shown in FIG. 38. Certainly, the user may alternatively adjust the distance between the horizontal tangent plane and the spherical center through a sliding operation (as shown by 118 in FIG. 38). The second position information includes two-dimensional coordinates (x, y) and a depth r of the point. The first sound source position is obtained by using the formula 7.

The formula 7 may be as follows:

Formula 7

$$\lambda=\begin{cases}\arctan\left(\frac{X}{2}-x, y-\frac{Y}{2}\right)\%360 & y>\frac{Y}{2}\\ \arctan\left(\frac{X}{2}-x, y-\frac{Y}{2}\right)+180 & y\leq\frac{Y}{2}\end{cases};$$

$$\Phi=\arctan\left(r, \sqrt{\left(x-\frac{X}{2}\right)^2+\left(y-\frac{Y}{2}\right)^2}\right); \text{and}$$

$$d=\sqrt{r^2+\left(x-\frac{X}{2}\right)^2+\left(y-\frac{Y}{2}\right)^2}$$

x represents a horizontal coordinate of the point selected by the user on the horizontal tangent plane, y represents a vertical coordinate of the point selected by the user on the horizontal tangent plane, r represents the depth, λ represents an azimuth of the $i^{th}$ loudspeaker device, Φ represents an oblique angle of the $i^{th}$ loudspeaker device, and d represents a distance between the $i^{th}$ loudspeaker device and the mobile phone (which may also be understood as a distance between the $i^{th}$ loudspeaker device and the user). %360 is used to adjust an angle range to 0 degrees to 360 degrees, for example, if an angle of $$\arctan\left(\frac{X}{2}-x, y-\frac{Y}{2}\right)$$

is −50 degrees, $$\arctan\left(\frac{X}{2}-x, y-\frac{Y}{2}\right)\%360$$

represents −50+360=310 degrees.

It may be understood that the formula 7 is merely an example. In actual application, the formula 7 may be in another form. This is not specifically limited herein.

It may be understood that the foregoing two manners of the reference position information are merely examples. In actual application, the reference position information may alternatively have another case. This is not specifically limited herein.

In this manner, the user may select the second position information (for example, through a second operation such as tapping, dragging, sliding, or the like) by using the spherical view, to control the selected sound object and perform real-time or subsequent dynamic rendering, and may assign a specific spatial orientation and specific motion to the sound object, so that interaction production between the user and audio is implemented, to provide new experience for the user In addition, a sound image may be further edited for the sound object when the user does not have any sensor.

In a second case, the reference information includes the media information of the multimedia file.

The media information in this embodiment of this application includes at least one of: text that needs to be displayed in the multimedia file, an image that needs to be displayed in the multimedia file, a music feature of music in the multimedia file, a sound source type corresponding to the first sound object, and the like. This is not specifically limited herein.

In addition, determining the first sound source position of the first sound object based on the music feature of the music in the multimedia file or the sound source type corresponding to the first sound object may be understood as automatic 3D remixing. Determining the first sound source position of the first sound object based on position text that needs to be displayed in the multimedia file or the image that needs to be displayed in the multimedia file may be understood as multi-modal remixing. Descriptions are separately provided in the following.

Figure 39:
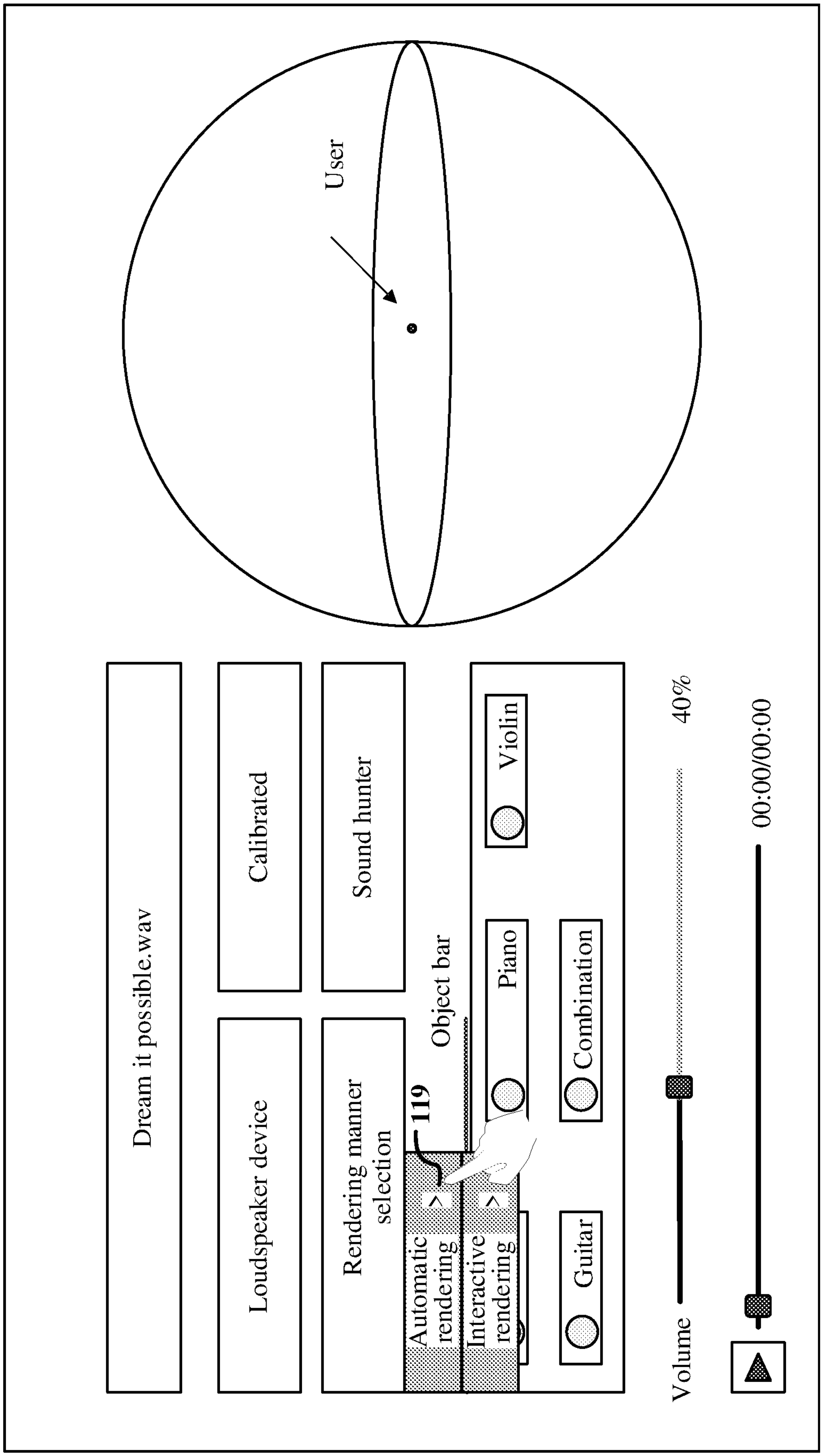

For example, the foregoing example is still used. The rendering device determines that the first sound object is the human sound, and the rendering device may display the interface shown in FIG. 26. The user may tap the "rendering manner selection icon" 107 to select the rendering manner, where the rendering manner is used to determine the first sound source position of the first sound object. As shown in FIG. 39, the rendering device may display a drop-down list in response to the tapping operation. The drop-down list may include an "automatic rendering option" and an "interactive rendering option". The "interactive rendering option" corresponds to the reference position information, and the "automatic rendering option" corresponds to the media information. Further, as shown in FIG. 39, the user may tap an "automatic rendering option" 119, to determine that the rendering manner is automatic rendering.

1. Automatic 3D Remixing

Figure 40:
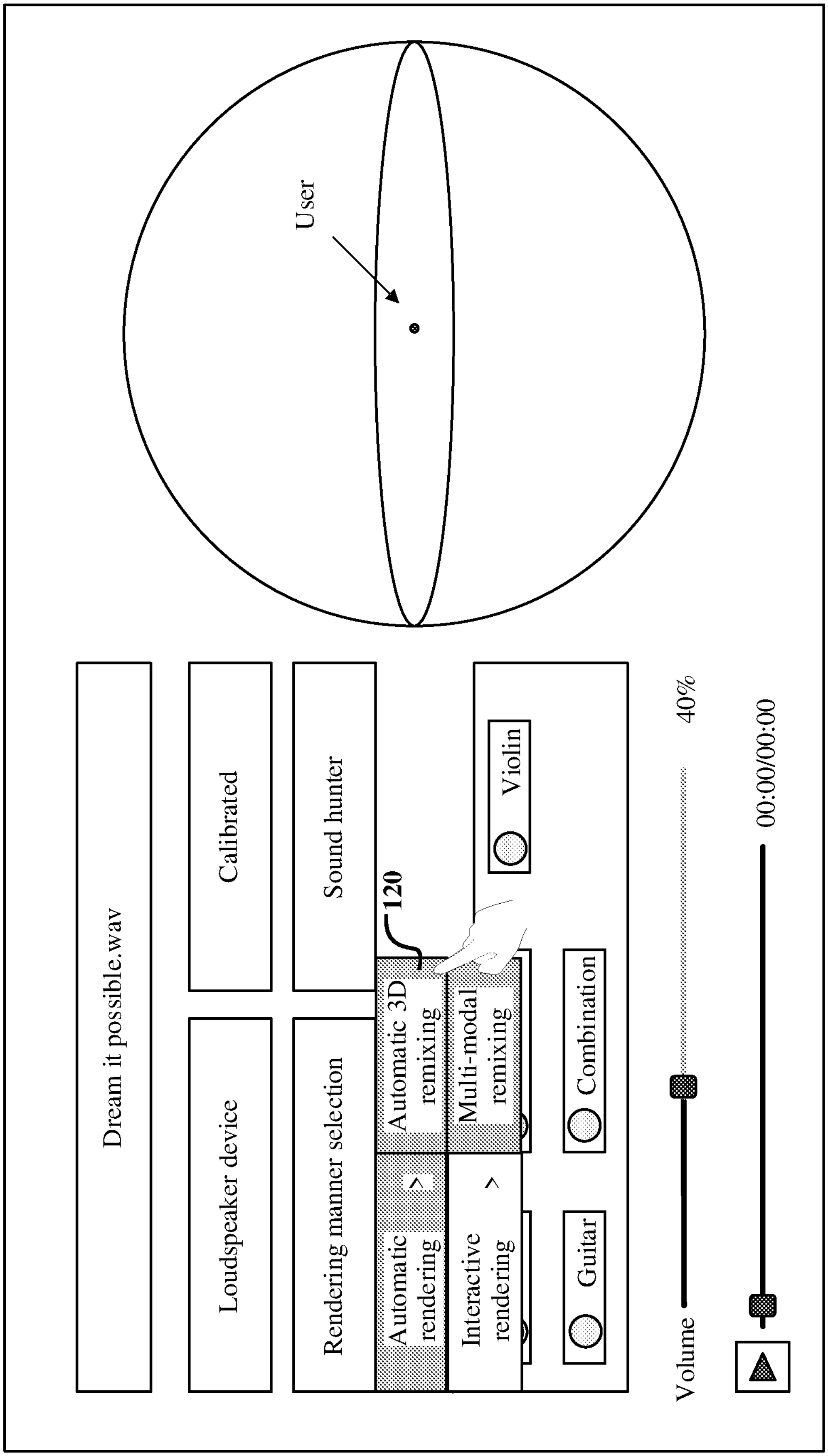
Figure 41:
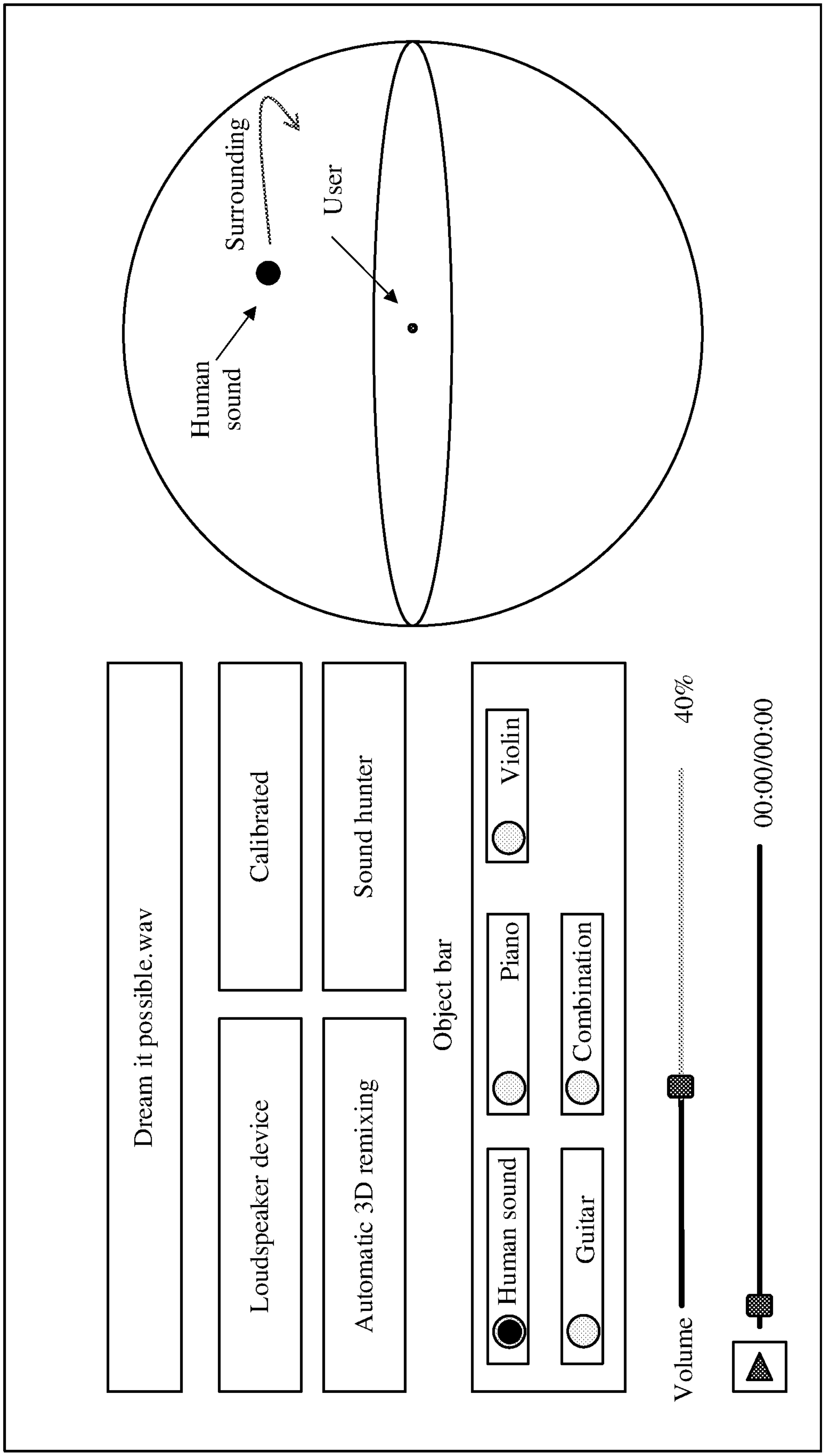

For example, as shown in FIG. 39, the user may tap the "automatic rendering option" 119. The rendering device may display, in response to the tapping operation, a drop-down list shown in FIG. 40. The drop-down list may include an "automatic 3D remixing option" and a "multi-modal remixing option". Further, the user may tap an "automatic 3D remixing option" 120. In addition, after the user selects automatic 3D remixing, the rendering device may display an interface shown in FIG. 41. In the interface, "rendering manner selection" may be replaced with "automatic 3D remixing", to prompt the user that a current rendering manner is automatic 3D remixing.

The following describes a plurality of cases of automatic 3D remixing.

1.1. The media information includes the music feature of the music in the multimedia file.

The music feature in this embodiment of this application may be at least one of: a music structure, a music emotion, a singing mode, and the like. The music structure may include a prelude, a prelude human sound, a verse, a bridge, a refrain, or the like; the music emotion includes happiness, sadness, panic, or the like; and the singing mode includes solo, chorus, accompaniment, or the like.

After determining the multimedia file, the rendering device may analyze a music feature in an audio track (which may also be understood as audio, a song, or the like) of the multimedia file. Certainly, the music feature may alternatively be identified in a manual manner or a neural network manner. This is not specifically limited herein. After the music feature is identified, the first sound source position corresponding to the music feature may be determined based on a preset association relationship. The association relationship is a relationship between the music feature and the first sound source position.

For example, the foregoing example is still used. The rendering device determines that the first sound source position is surrounding track, and the rendering device may display the interface shown in FIG. 41. A spherical view in the interface displays a motion track of the first sound source position.

As described above, the music structure may generally include at least one of: a prelude, a prelude human sound, a verse, a bridge, or a refrain. The following uses analyzing of a song structure as an example for illustrative description.

Optionally, a human sound and a musical instrument sound in a song may be separated in a manual manner or a neural network manner. This is not specifically limited herein. After the human sound is separated, the song may be segmented by determining a variance of a mute segment and a pitch of the human sound. Specific steps include: if the mute segment of the human sound is greater than a threshold (for example, 2 seconds), it is considered that the segment ends. Based on this, a large segment of the song is divided. If there is no human sound in a first large segment, it is determined that the large segment is a musical instrument prelude. If there is a human sound in a first large segment, it is determined that the first large segment is a human sound prelude. It is determined that a large middle mute segment is a bridge. Further, a center frequency of each large segment (referred to as a large human sound segment) that includes a human sound is calculated according to the following formula 8, and variances of center frequencies at all moments in large human sound segments are calculated. The large human sound segments are sorted based on the variances. Large human sound segments whose variances rank in the first 50% are marked as a refrain, and large human sound segments whose variances rank in the last 50% are marked as a verse. In other words, a music feature of the song is determined based on a fluctuation of a frequency. In subsequent rendering, for different large segments, a sound source position or a motion track of a sound source position may be determined based on a preset association relationship, and then different large segments of the song are rendered.

For example, if the music feature is a prelude, it is determined that the first sound source position is circling above the user (or understood as surrounding). First, a multi-channel is downmixed into a mono channel (for example, an average is calculated), and then the entire human sound is set to circling around the head in the entire prelude phase. A speed at each moment is determined based on a value of human sound energy (which is represented by an RMS or a variance). Higher energy indicates a higher rotation speed. If the music feature is panic, it is determined that the first sound source position is suddenly right and suddenly left. If the music feature is a chorus, a left-channel human sound and a right-channel human sound can be extended and widened to increase a delay. A quantity of musical instruments in each time period is determined. If there is a musical instrument solo, the musical instrument is enabled to circle based on energy in a solo time segment.

The formula 8 may be as follows:

$$f_c = \frac{\sum_{n=0}^{N-1} f(n)x(n)}{\sum_{n=0}^{N-1} X(n)} \qquad \text{Formula 8}$$

$f_c$ represents a central frequency of a large human sound segment per second, N represents a quantity of large segments, N is a positive integer, and 0<n<N−1. f(n) represents a frequency domain obtained by performing Fourier transform on a time-domain waveform corresponding to a large segment, and x(n) represents energy corresponding to a frequency.

It may be understood that the formula 8 is merely an example. In actual application, the formula 8 may be in another form. This is not specifically limited herein.

In this manner, orientation and dynamics settings are performed on an extracted specific sound object based on the music feature of the music, so that 3D rendering is more natural, and artistic is better reflected.

1.2. The media information includes the sound source type corresponding to the first sound object.

The sound source type in this embodiment of this application may be a person or a musical instrument, or may be a drum sound, a piano sound, or the like. In actual application, the sound source type may be classified based on a requirement. This is not specifically limited herein. Certainly, the rendering device may identify the sound source type in a manual manner or a neural network manner. This is not specifically limited herein.

After the sound source type is identified, the first sound source position corresponding to the sound source type may be determined based on a preset association relationship, where the association relationship is a relationship between the sound source type and the first sound source position (which is similar to the foregoing music feature, and details are not described herein again).

It may be understood that the foregoing two manners of automatic 3D remixing are merely examples. In actual application, automatic 3D remixing may have another case. This is not specifically limited herein.

2. Multi-Modal Remixing

Figure 42:
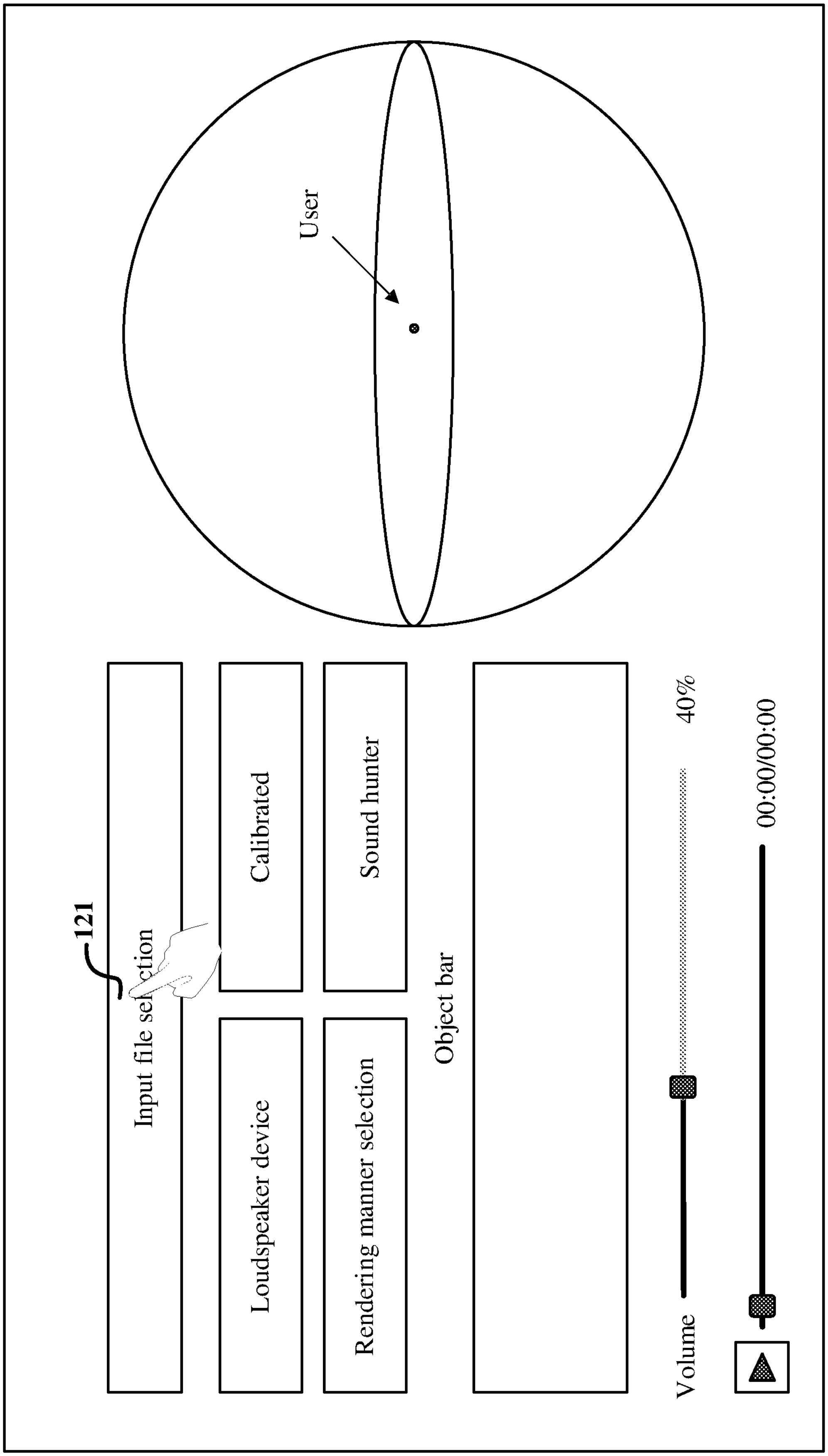
Figure 43:
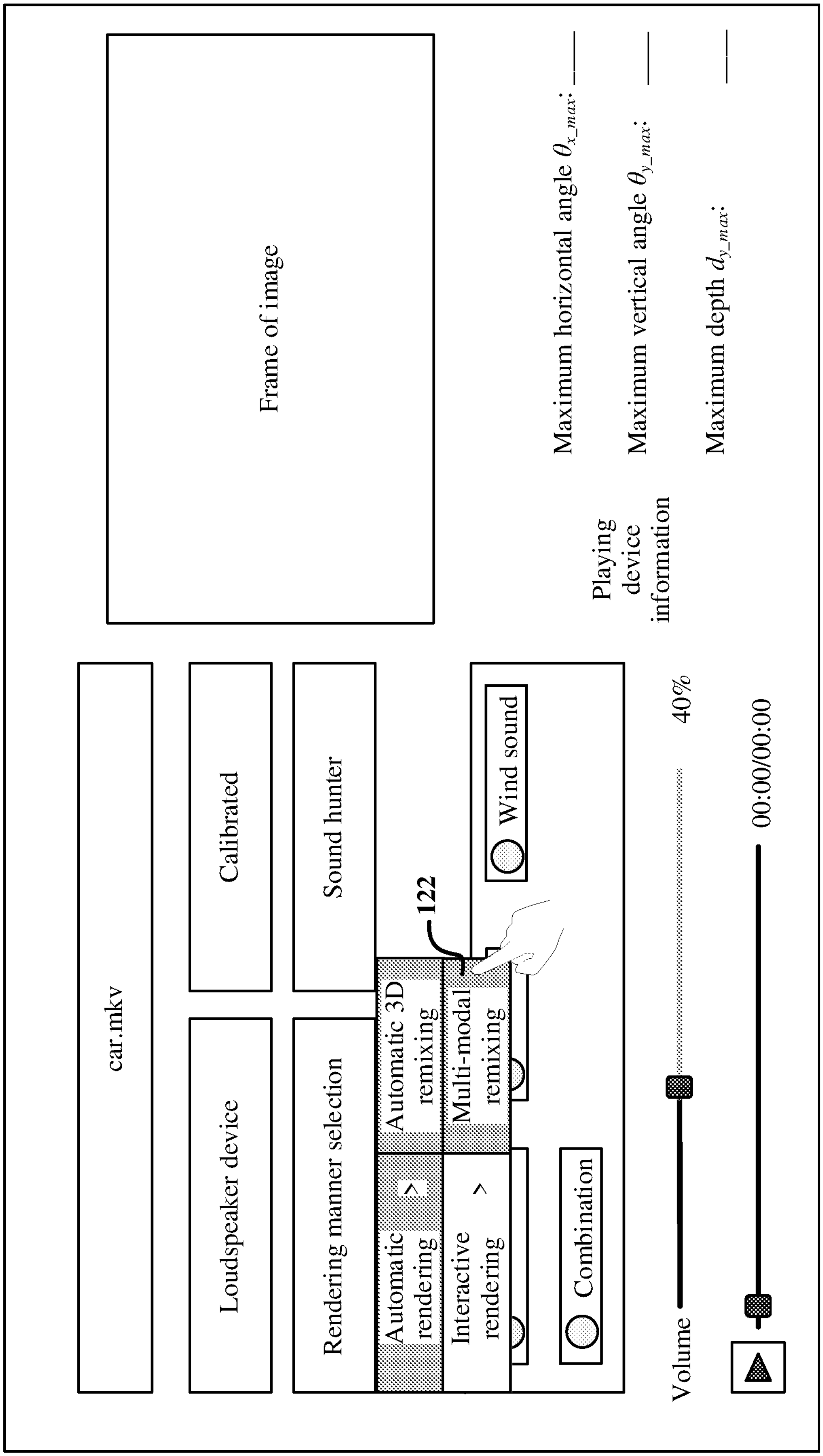
Figure 44:
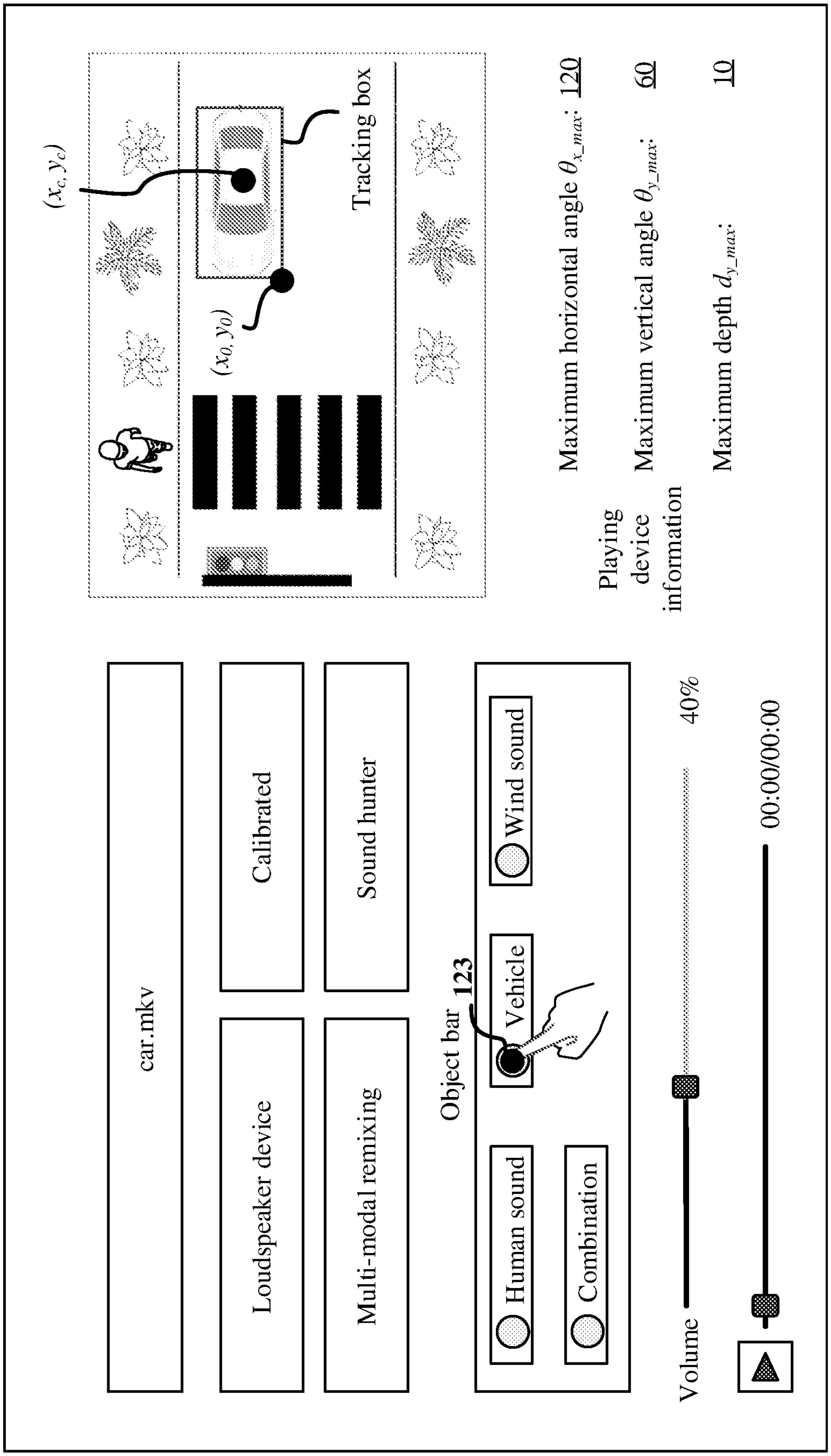

For example, as shown in FIG. 42, the user may select a multimedia file by tapping an "input file selection icon" 121. Herein, an example in which the multimedia file is "car.mkv" is used. It may also be understood that the rendering device receives a fourth operation of the user, and in response to the fourth operation, the rendering device selects "car.mkv" (that is, a target file) from a storage area as the multimedia file. The storage area may be a storage area in the rendering device, or may be a storage area in an external device (for example, a USB flash drive). This is not specifically limited herein. After the user selects the multimedia file, the rendering device may display an interface shown in FIG. 43. In the interface, "input file selection" may be replaced with "car.mkv", to prompt the user that the current multimedia file is car.mkv. In addition, by using the identification network and/or the separation network in the embodiment shown in FIG. 4, the rendering device may identify sound objects in "car.mkv", and separate a single-object audio track corresponding to each sound object. For example, the rendering device identifies that a sound object included in "car.mkv" is a person, a vehicle, or a wind sound. As shown in FIG. 43 and FIG. 44, interfaces displayed by the rendering device each may further include an object bar, and icons such as a "human sound icon", a "vehicle icon", a "wind sound icon", and the like may be displayed in the object bar, for the user to select a to-be-rendered sound object.

The following describes a plurality of cases of multi-modal remixing.

2.1. The media information includes the image that needs to be displayed in the multimedia file.

Optionally, after the rendering device obtains the multimedia file (including an audio track of an image or an audio track of a video), the video may be split into frames of images (there may be one or more frames of images), third position information of the first sound object is obtained based on the frame of image, and the first sound source position is obtained based on the third position information, where the third position information includes two-dimensional coordinates and a depth of the first sound object in the image.

Optionally, a specific step of obtaining the first sound source position based on the third position information may include: inputting the frame of image into a detection network, and obtaining tracking box information $(x_0, y_0, w_0, h_0)$ corresponding to the first sound object in the frame of image. Certainly, the frame of image and the first sound object may alternatively be used as inputs of a detection network, and the detection network outputs tracking box information of the first sound object. The tracking box information includes two-dimensional coordinates $(x_0, y_0)$ of a corner point in a tracking box, and a height $h_0$ and a width $w_0$ of the tracking box. The rendering device calculates the tracking box information $(x_0, y_0, w_0, h_0)$ by using a formula 9, to obtain coordinates $(x_c, y_c)$ of a center point in the tracking box; and then inputs the coordinates $(x_c, y_c)$ of the center point in the tracking box into a depth estimation network, to obtain a relative depth $Z_{(x_i,y_i)}$ of each point in the tracking box. Then, the relative depth $Z_{(x_i,y_i)}$ of each point in the tracking box is calculated by using a formula 10, to obtain an average depth $z_c$ of all points in the tracking box. Previously obtained $(x_c, y_c, z_c)$ is normalized, based on a size (a height $h_1$ and a width $w_1$) of the image and by using a formula 11, to $(x_{norm}, y_{norm}, z_{norm})$ norm belonging to [−1, 1], and then the first sound source position is obtained based on playing device information and by using a formula 12.

The formula 9 may be as follows:

$$x_c = x_0 + \frac{w_0}{2}; \text{ and} \qquad \text{Formula 9}$$

$$y_c = y_0 + \frac{h_0}{2}$$

$$z_c = \frac{1}{w_1 * h_1} * \sum_{i=0}^{w_0 * h_0} z_{(x_i, y_i)} \qquad \text{Formula 10}$$

$$X_{norm} = \frac{x_c}{\max(|x_c|)}; \qquad \text{Formula 11}$$

$$y_{norm} = \frac{y_c}{\max(|y_c|)}; \text{ and}$$

$$z_{norm} = \frac{z_c}{\max(|z_c|)}$$

$$\lambda_i = x_{norm} * \theta_{x\_max}; \qquad \text{Formula 12}$$

$$\Phi_i = y_{norm} * \theta_{y\_max}; \text{ and}$$

$$r_i = \frac{1 + z_{norm}}{2} d_{y\_max}$$

$(x_0, y_0)$ represents the two-dimensional coordinates of the corner point (for example, a corner point in a lower left corner) in the tracking box, $h_0$ represents the height of the tracking box, $w_0$ represents the width of the tracking box, $h_1$ represents the height of the image, and $w_1$ represents the width $W_1$ of the image. $Z_{(x_i,y_i)}$ represents the relative depth of each point in the tracking box, and $Z_c$ represents the average depth of all the points in the tracking box. $\theta_{x\_max}$ represents a maximum horizontal angle of the playing device (if the playing device is N loudspeaker devices, the N loudspeaker devices have same playing device information), $\theta_{y\_max}$ represents a maximum vertical angle of the playing device, and max represents a maximum depth of the playing device. $\lambda_i$ represents an azimuth of an $i^{th}$ loudspeaker device, $\Phi_i$ represents an oblique angle of the $i^{th}$ loudspeaker device, and $r_i$ represents a distance between the $i^{th}$ loudspeaker device and the user.

It may be understood that the formula 9 to the formula 12 are merely examples. In actual application, the formula 9 to the formula 12 each may be in another form. This is not specifically limited herein.

For example, as shown in FIG. 43, the user may tap a "multi-modal remixing option" 122. In response to the tapping operation, the rendering device may display the interface shown in FIG. 43. The right side of the interface includes a frame (for example, a first frame) of image of "car.mkv" and playing device information, where the playing device information includes a maximum horizontal angle, a maximum vertical angle, and a maximum depth. If the playing device is a headset, the user may input the playing device information. If the playing device is a loudspeaker device, the user may input the playing device information, or directly use calibration information obtained in a calibration phase as the playing device information. This is not specifically limited herein. In addition, after the user selects the multi-modal remixing option, the rendering device may display an interface shown in FIG. 44. In the interface, "rendering manner selection" may be replaced with "multi-modal remixing", to prompt the user that a current rendering manner is multi-modal remixing.

When the media information includes the image that needs to be displayed in the multimedia file, there are a plurality of manners of determining the first sound object in the image. The manners are separately described in the following.

(1) The first sound object is determined through tapping by the user in the object bar.

Optionally, the rendering device may determine the first sound object based on tapping by the user in the object bar.

For example, as shown in FIG. 44, the user may determine, by tapping a "vehicle icon" 123, that a to-be-rendered sound object is a vehicle. The rendering device displays a tracking box of the vehicle in the image of "car.mkv" on the right side, obtains third position information, and converts the third position information into the first sound source position by using the formula 9 to the formula 12. In addition, the interface further includes coordinates $(x_0, y_0)$ of a corner point in a lower left corner in the tracking box and coordinates $(x_c, y_c)$ of a center point in the tracking box. For example, in loudspeaker device information, a maximum horizontal angle is 120 degrees, a maximum vertical angle is 60 degrees, and a maximum depth is 10 (a unit may be meter, decimeter, or the like, which is not limited herein).

(2) The first sound object is determined through tapping by the user on the image.

Optionally, the rendering device may use, as the first sound object, a sound object determined by the user by performing a third operation (for example, tapping) on the image.

Figure 45:
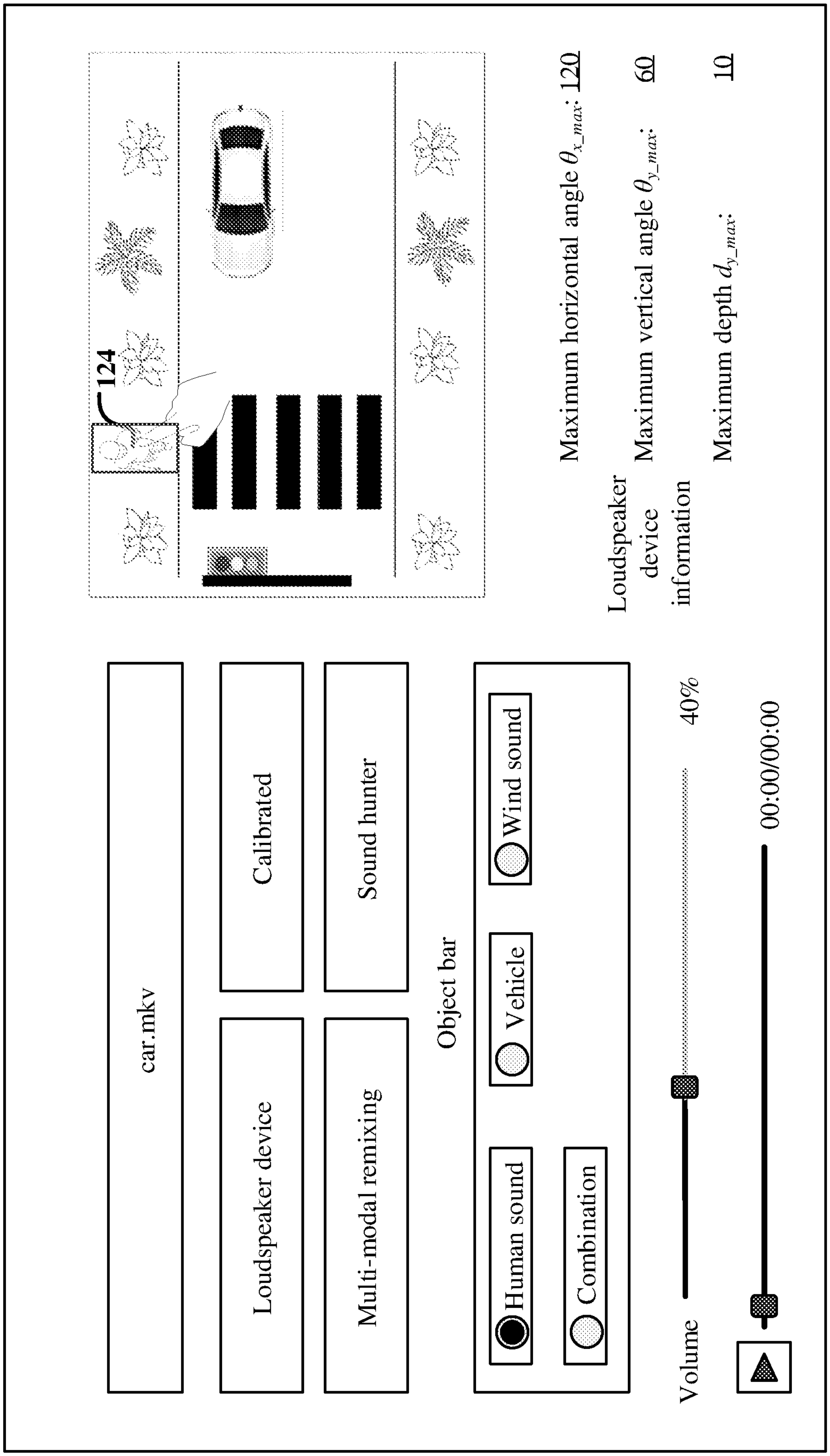

For example, as shown in FIG. 45, the user may determine the first sound object by tapping a sound object (as shown by 124) in the image.

(3) The first sound object is determined based on a default setting.

Optionally, the rendering device may identify a sound object by using an audio track corresponding to the image, track a default sound object or all sound objects in the image, and determine third position information. The third position information includes two-dimensional coordinates of the sound object in the image and a depth of the sound object in the image.

For example, the rendering device may select "combination" in the object bar by default, to be specific, track all sound objects in the image, and separately determine third position information of each sound object.

It may be understood that the foregoing several manners of determining the first sound object in the image are merely examples. In actual application, the first sound object in the image may alternatively be determined in another manner. This is not specifically limited herein.

In this manner, after coordinates of a sound object and a single-object audio track are extracted with reference to a multi-modal feature of audio, a video, and an image, a 3D immersive sense is obtained through rendering in a headset or loudspeaker environment. In this way, a sound and an image can be synchronized, so that the user obtains optimal sound effect experience. In addition, a technology of tracking and rendering object audio in an entire video after a sound object is selected may also be applied to professional mixing post-production, to improve work efficiency of a mixing engineer. A single-object audio track of audio in the video is separated, and a sound object in a video image is analyzed and tracked, to obtain motion information of the sound object, so as to perform real-time or subsequent dynamic rendering on the selected sound object. In this way, the video image is matched with a sound source direction of the audio, so that user experience is improved.

2.2. The media information includes the position text that needs to be displayed in the multimedia file.

In this case, the rendering device may determine the first sound source position based on the position text that needs to be displayed in the multimedia file, where the position text indicates the first sound source position.

Optionally, the position text may be understood as text having a meaning such as a position or an orientation, for example, the wind is blowing northward, the heaven, the hell, front, rear, left, right, or the like. This is not specifically limited herein. Certainly, the position text may be specifically lyrics, subtitles, advertising slogans, or the like. This is not specifically limited herein.

Optionally, semantics of the to-be-displayed position text may be identified based on reinforcement learning or a neural network, and then the first sound source position is determined based on the semantics.

In this manner, the position text related to the position is identified, and a 3D immersive sense is obtained through rendering in a headset or loudspeaker environment. In this way, a spatial sense corresponding to the position text is achieved, so that the user obtains optimal sound effect experience.

It may be understood that the foregoing two manners of the media information are merely examples. In actual application, the media information may alternatively have another case. This is not specifically limited herein.

Figure 46:
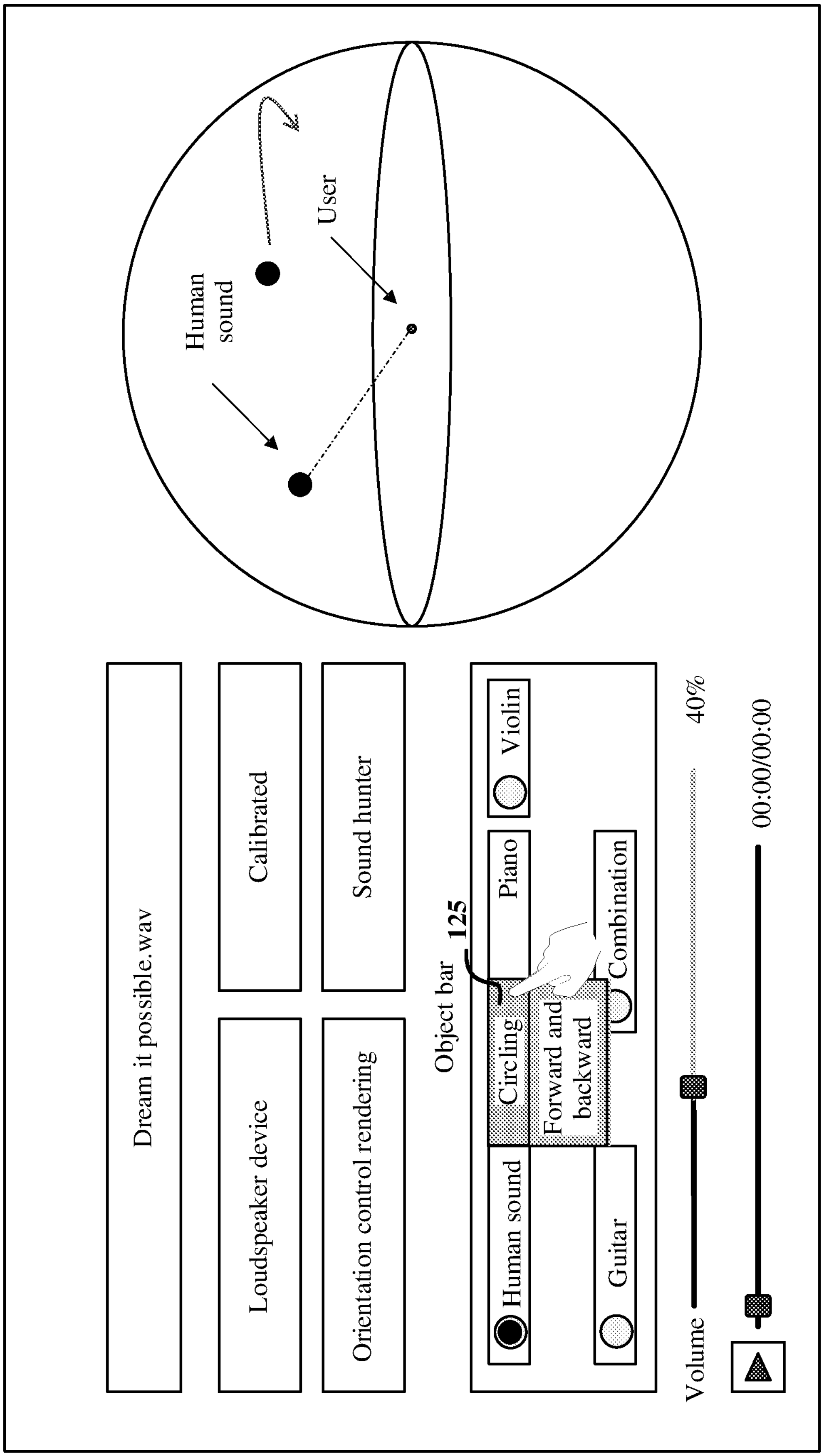

In addition, in step 1003, how to determine the first sound source position based on the reference information is described in a plurality of cases. In actual application, the first sound source position may alternatively be determined in a combination manner. For example, after the first sound source position is determined by using the orientation of the sensor, the motion track of the first sound source position is determined by using the music feature. For example, as shown in FIG. 46, the rendering device has determined, based on the first posture angle of the sensor, that the sound source position of the human sound is as shown on the right side of an interface in FIG. 46. Further, the user may determine a motion track of the human sound by tapping a "circling option" 125 in a menu on the right of a "human sound icon". It may also be understood that a first sound source position at a moment is first determined by using the orientation of the sensor, and then a motion track of the first sound source position is determined as circling by using the music feature or according to a preset rule. Correspondingly, as shown in FIG. 46, the interface of the rendering device may display a motion track of the sound object.

Optionally, in the foregoing process of determining the first sound source position, the user may control a distance in the first sound source position by controlling a volume button of the mobile phone or through tapping, dragging, sliding, or the like on a spherical view.

Step 1004: Perform spatial rendering on the first single-object audio track based on the first sound source position.

After determining the first sound source position, the rendering device may perform spatial rendering on the first single-object audio track, to obtain a rendered first single-object audio track.

Optionally, the rendering device performs spatial rendering on the first single-object audio track based on the first sound source position, to obtain the rendered first single-object audio track. Certainly, the rendering device may alternatively perform spatial rendering on the first single-object audio track based on the first sound source position, and perform rendering on the second single-object audio track based on the second sound source position, to obtain the rendered first single-object audio track and a rendered second single-object audio track.

Optionally, when spatial rendering is to be performed on a plurality of single-object audio tracks corresponding to a plurality of sound objects in the original audio track, a combination of a plurality of manners in step 1003 may be used in the method for determining a sound source position in this embodiment of this application. This is not specifically limited herein.

For example, as shown in FIG. 32, the first sound object is a person, the second sound object is a violin, a manner in interactive rendering may be used for the first sound source position of the first single-object audio track corresponding to the first sound object, and a manner in automatic rendering may be used for the second sound source position of the second single-object audio track corresponding to the second sound object. Specific manners of determining the first sound source position and the second sound source position may be any two manners of the foregoing step 1003. Certainly, specific manners of determining the first sound source position and the second sound source position may alternatively be a same manner. This is not specifically limited herein.

Figure 47:
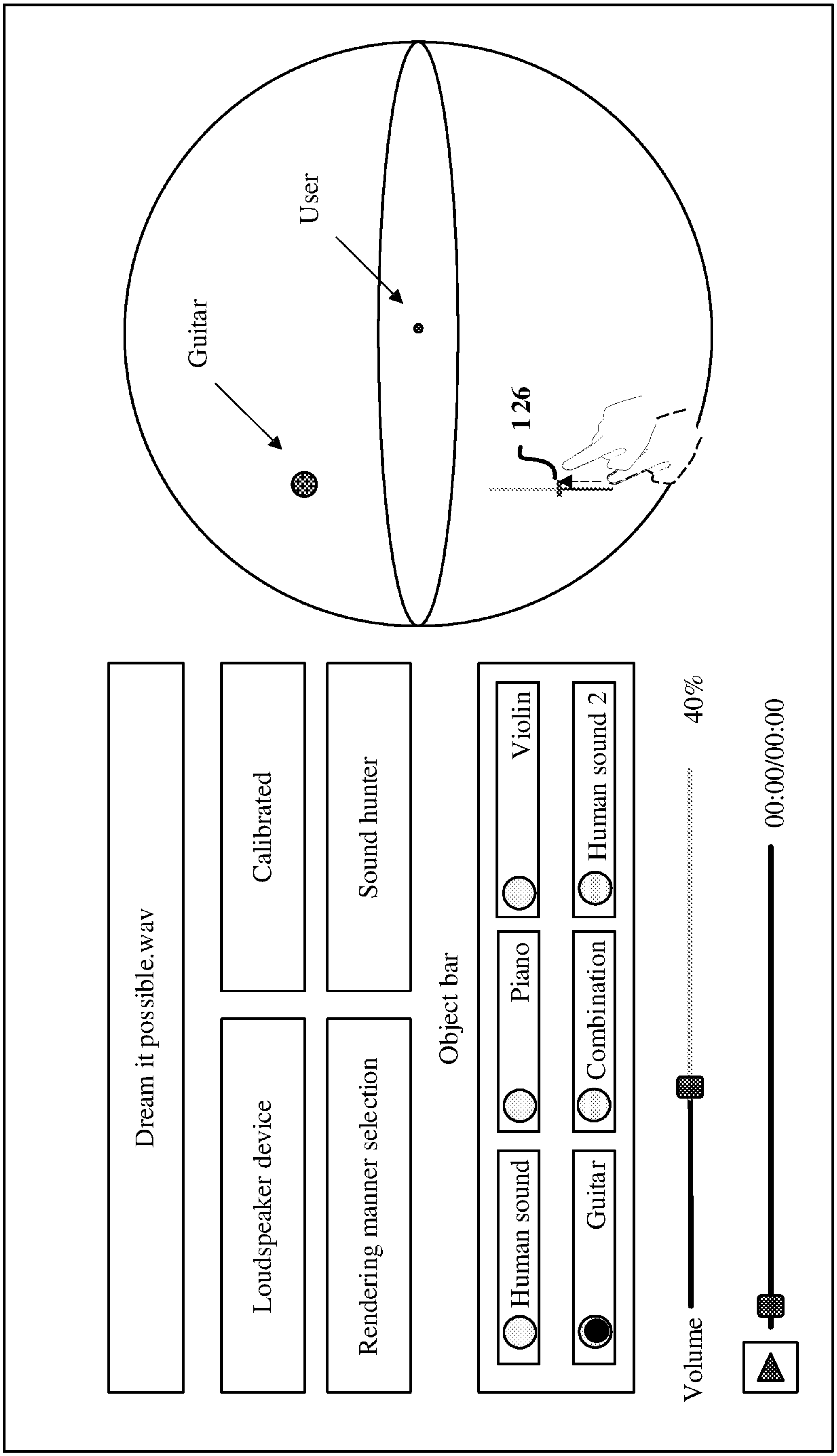

In addition, in the accompanying drawings including a spherical view, the spherical view may further include a volume bar. The user may control volume of the first single-object audio track by performing an operation such as finger sliding, mouse dragging, mouse wheel scrolling, or the like on the volume bar. This improves real-time performance of rendering an audio track. For example, as shown in FIG. 47, the user may adjust a volume bar 126, to adjust volume of a single-object audio track corresponding to a guitar.

Rendering manners in this step may vary with different types of playing devices. It may also be understood as that methods used by the rendering device to perform spatial rendering on the original audio track or the first single-object audio track based on the first sound source position and the type of the playing device vary with different types of playing devices, and are separately described in the following.

In a first case, the playing device is a headset.

In this case, after determining the first sound source position, the rendering device may render an audio track according to a formula 13 and based on an HRTF filter coefficient table. The audio track may be the first single-object audio track, or may be the second single-object audio track, or may be the first single-object audio track and the second single-object audio track. This is not specifically limited herein. The HRTF filter coefficient table indicates an association relationship between a sound source position and a coefficient. It may also be understood as that one sound source position corresponds to one HRTF filter coefficient.

The formula 13 may be as follows:

$$\sum_s \int_{-\infty}^{t} a_s(t) h_{i,s}(t) o_s(\tau - t) d\tau \qquad \text{Formula 13}$$

$$\sum_s \int_{-\infty}^{t} a_s(t) h_{i,s}(t) o_s(\tau - t) d\tau$$

represents the rendered first single-object audio track, S represents at least one sound object of the multimedia file and the at least one sound object includes the first sound object, i represents a left channel or a right channel, $a_s(t)$ represents an adjustment coefficient of the first sound object at a moment t, $h_{i,s}(t)$ represents a head-related transfer function HRTF filter coefficient that is of the left channel or the right channel corresponding to the first sound object and that is at the moment t, the HRTF filter coefficient that is of the left channel corresponding to the first sound object and that is at the moment t is generally different from the HRTF filter coefficient that is of the right channel corresponding to the first sound object and that is at the moment t, the HRTF filter coefficient is related to the first sound source position, $o_s(t)$ represents the first single-object audio track at the moment t, and τ represents an integration item.

It may be understood that the formula 13 is merely an example. In actual application, the formula 13 may be in another form. This is not specifically limited herein.

In a second manner, the type of the playing device is a loudspeaker device.

In this case, after determining the first sound source position, the rendering device may render an audio track according to a formula 14. The audio track may be the first single-object audio track, or may be the second single-object audio track, or may be the first single-object audio track and the second single-object audio track. This is not specifically limited herein.

The formula 14 may be as follows:

$$\sum_s a_s(t) g_s(t) o_s(t), \text{ where} \qquad \text{Formula 14}$$

$$g_s(t) = [\, r\cos\lambda\sin\Phi \quad r\sin\lambda\sin\Phi \quad r\cos\Phi \,]$$

$$\begin{bmatrix} r_1\cos\lambda_1\sin_1\Phi_1 & r_1\sin\lambda_1\sin_1\Phi_1 & r_1\cos\Phi_1 \\ \dots & \dots & \dots \\ r_N\cos\lambda_N\sin_N\Phi_N & r_1\sin\lambda_N\sin\Phi_N & r_N\cos\Phi_N \end{bmatrix}^{-1}, \text{ where}$$

$$r = \sqrt{\frac{\sum_{i=1}^{N} r_i^2}{N}}$$

There may be N loudspeaker devices, $$\sum_s a_s(t) g_s(t) o_s(t)$$

represents the rendered first single-object audio track, i represents an $i^{th}$ channel in a plurality of channels, S represents at least one sound object of the multimedia file and the at least one sound object includes the first sound object, $a_s(t)$ represents an adjustment coefficient of the first sound object at a moment t, $g_s(t)$ represents a translation coefficient of the first sound object at the moment t, $o_s(t)$ represents the first single-object audio track at the moment t, $\lambda_i$ represents an azimuth obtained when a calibrator (for example, the foregoing sensor device) calibrates an $i^{th}$ loudspeaker device, $\Phi_i$ represents an oblique angle obtained when the calibrator calibrates the $i^{th}$ loudspeaker device, $r_i$ represents a distance between the $i^{th}$ loudspeaker device and the calibrator, N is a positive integer, i is a positive integer, i≤N, and the first sound source position is in a tetrahedron formed by the N loudspeaker devices.

In addition, for spatial rendering for the original audio track, a single-object audio track corresponding to a sound object in the original audio track may be rendered, and for example, $S_1$ in the foregoing formula may be replaced. Alternatively, a single-object audio track corresponding to a sound object in the original audio track may be rendered after being duplicated and added, for example, $S_2$ in the foregoing formula. Certainly, it may alternatively be a combination of $S_1$ and $S_2$.

It may be understood that the formula 14 is merely an example. In actual application, the formula 14 may be in another form. This is not specifically limited herein.

Figure 48:
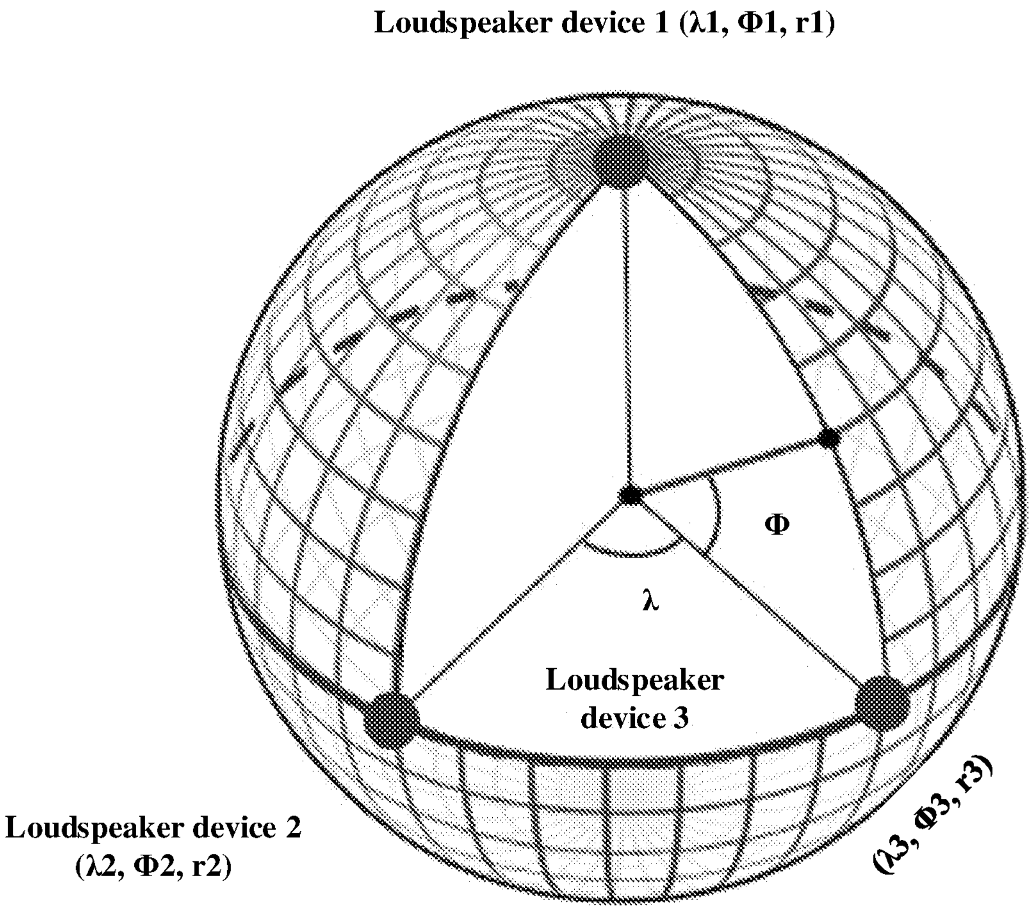
FIG. 48 is a schematic diagram of a structure of a loudspeaker device system in a spherical coordinate system according to this application.

For ease of understanding N, refer to FIG. 48. The figure is a schematic diagram of an architecture of a loudspeaker device in a spherical coordinate system. When a sound source position of a sound object is in a tetrahedron formed by four loudspeaker devices, N=4. When a sound source position of a sound object is on a surface of an area formed by three loudspeaker devices, N=3. If a sound source position of a sound object is on a connection line between two loudspeaker devices, N=2. When a sound source position of a sound object directly points to one loudspeaker device, N=1. Because a point in FIG. 48 is on a connection line between a loudspeaker device 1 and a loudspeaker device 2, N shown in FIG. 48 is 2.

Step 1005: Obtain a target audio track based on the rendered first single-object audio track.

Target audio tracks obtained in this step may vary with different types of playing devices. It may also be understood as methods used by the rendering device to obtain the target audio track vary with different types of playing devices, and are separately described in the following.

In a first case, the playing device is a headset.

In this case, after obtaining the rendered first single-object audio track and/or the rendered second single-object audio track, the rendering device may obtain the target audio track according to a formula 15 and based on the rendered audio track. The audio track may be the first single-object audio track, or may be the second single-object audio track, or may be the first single-object audio track and the second single-object audio track. This is not specifically limited herein.

The formula 15 may be as follows:

$$X_i^{3D}(t) = X_i(t) - \sum_{s\in S_1} o_s(t) + \sum_{s\in S_1+S_2} \int_{-\infty}^{\tau} a_s(t)h_{i,s}(t)o_s(\tau - t)d\tau \quad \text{Formula 15}$$

i represents a left channel or a right channel, $X_i^{3D}(t)$ represents the target audio track at a moment t, $X_i(t)$ represents the original audio track at the moment t, $$\sum_{s\in S_1} o_s(t)$$

represents the first single-object audio track that is not rendered at the moment t, $$\sum_s \int_{\infty}^{t} a_s(t)h_{i,s}(t)o_s(\tau - t)d\tau$$

represents the rendered first single-object audio track, $a_s(t)$ represents an adjustment coefficient of the first sound object at the moment t, $h_{i,s}(t)$ represents a head-related transfer function HRTF filter coefficient that is of the left channel or the right channel corresponding to the first sound object and that is at the moment t, the HRTF filter coefficient is related to the first sound source position, $o_s(t)$ represents the first single-object audio track at the moment t, τ represents an integration item, and $S_1$ represents a sound object that needs to be replaced in the original audio track; if the first sound object replaces the sound object in the original audio track, $S_1$ represents a null set; $S_2$ represents a sound object added in the target audio track compared with the original audio track, and if the first sound object is a duplicate of the sound object in the original audio track, $S_2$ represents a null set; and $S_1$ and/or $S_2$ represent/represents at least one sound object of the multimedia file and the at least one sound object includes the first sound object. If $S_2$ represents a null set, it may be understood that spatial rendering for an audio track is to replace a sound object. After spatial rendering is performed on a single-object audio track corresponding to the sound object, an initial single-object audio track in the multimedia file is replaced with a rendered single-object audio track. In other words, a single-object audio track corresponding to the sound object is not added in the target audio track compared with the original audio track in the multimedia file, but the initial single-object audio track in the multimedia file is replaced with the rendered single-object audio track.

It may be understood that the formula 15 is merely an example. In actual application, the formula 15 may be in another form. This is not specifically limited herein.

In a second manner, the type of the playing device is a loudspeaker device.

In this case, after obtaining the rendered first single-object audio track and/or the rendered second single-object audio track, the rendering device may obtain the target audio track according to a formula 16 and based on the rendered audio track. The audio track may be the first single-object audio track, or may be the second single-object audio track, or may be the first single-object audio track and the second single-object audio track. This is not specifically limited herein.

The formula 16 may be as follows:

Formula 16

$$X_i^{3D}(t) = X_i(t) - \sum_{s\in S_1} o_s(t) + \sum_{s\in S_1+S_2} a_s(t)g_{i,s}(t)o_s(t),$$

where $$g_s(t) = [\, r\cos\lambda\sin\Phi \quad r\sin\lambda\sin\Phi \quad r\cos\Phi \,] \begin{bmatrix} r_1\cos\lambda_1\sin\Phi_1 & r_1\sin\lambda_1\sin\Phi_1 & r_1\cos\Phi_1 \\ \cdots & \cdots & \cdots \\ r_N\cos\lambda_N\sin\Phi_N & r_1\sin\lambda_N\sin\Phi_N & r_N\cos\Phi_N \end{bmatrix}^{-1},$$

where $$r=\sqrt{\frac{\sum_{i=1}^{N} r_1^2}{N}}$$

There may be N loudspeaker devices, i represents a channel in a plurality of channels, $X_i^{3D}(t)$ represents the target audio track at a moment t, $X_i(t)$ represents the original audio track at the moment t, $$\sum_{s\in S_1} o_S(t)$$

represents the first single-object audio track that is not rendered at the moment t, $$\sum_{s} a_s(t) g_{i,s}(t) o_s(t)$$

represents the rendered first single-object audio track, $a_s(t)$ represents an adjustment coefficient of the first sound object at the moment t, $g_s(t)$ represents a translation coefficient of the first sound object at the moment t, $g_{i,s}(t)$ represents an $i^{th}$ row in $g_s(t)$, $o_s(t)$ represents the first single-object audio track at the moment t, and $S_1$ represents a sound object that needs to be replaced in the original audio track; if the first sound object replaces the sound object in the original audio track, $S_1$ represents a null set; $S_2$ represents a sound object added in the target audio track compared with the original audio track, and if the first sound object is a duplicate of the sound object in the original audio track, $S_2$ represents a null set; and $S_1$ and/or $S_2$ represent/represents at least one sound object of the multimedia file and the at least one sound object includes the first sound object, $\lambda_i$ represents an azimuth obtained when a calibrator calibrates an $i^{th}$ loudspeaker device, $\Phi_i$ represents an oblique angle obtained when the calibrator calibrates the $i^{th}$ loudspeaker device, $r_i$ represents a distance between the $i^{th}$ loudspeaker device and the calibrator, N is a positive integer, i is a positive integer, i≤N, and the first sound source position is in a tetrahedron formed by the N loudspeaker devices.

It may be understood that the formula 16 is merely an example. In actual application, the formula 16 may be in another form. This is not specifically limited herein.

Certainly, a new multimedia file may alternatively be generated based on the multimedia file and the target audio track. This is not specifically limited herein.

In addition, after the first single-object audio track is rendered, the user may upload a manner of setting a sound source position by the user in a rendering process to the database module corresponding to FIG. 8, so that another user renders another audio track in the setting manner. Certainly, the user may alternatively download a setting manner from the database module and modify the setting manner, so that the user performs spatial rendering on an audio track. In this manner, modification of a rendering rule and sharing between different users are added. In this way, repeated object identification and tracking for a same file can be avoided in a multi-modal mode, so that overheads on a terminal side are reduced. In addition, free production of the user in an interactive mode can be shared with another user, so that application interaction is further enhanced.

Figure 49:
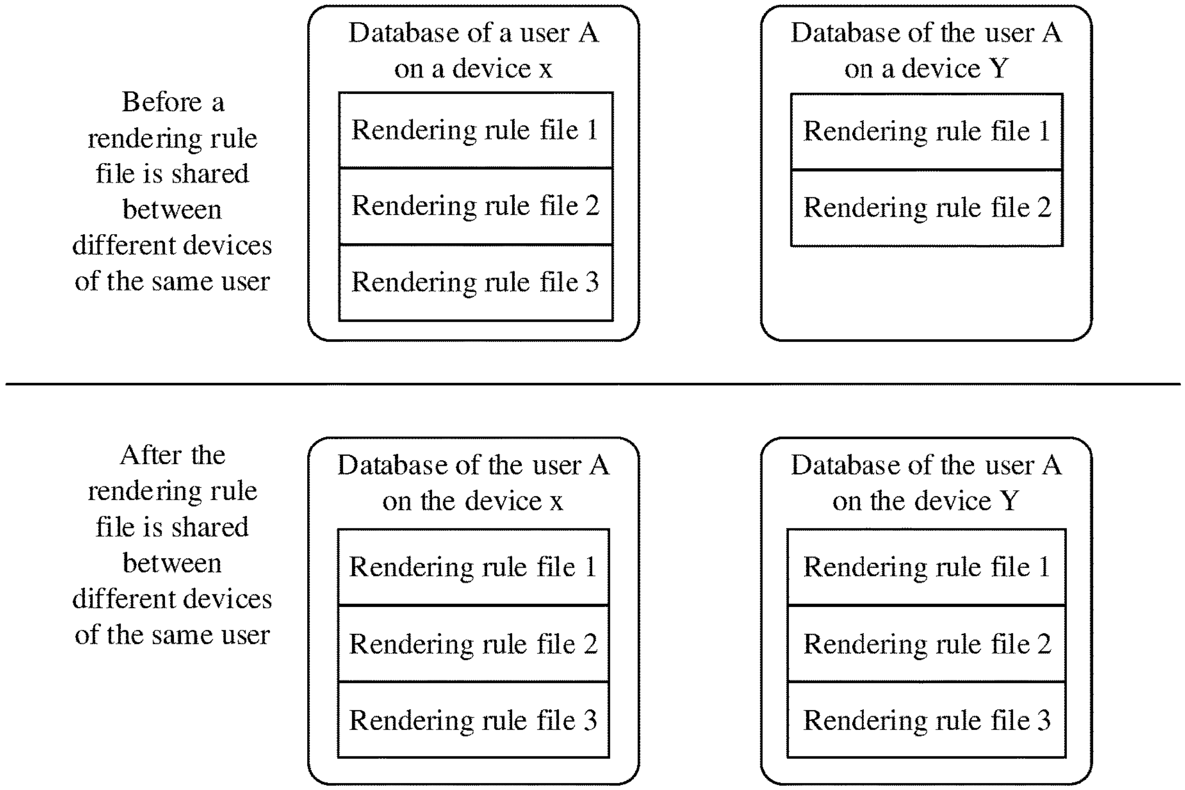
FIG. 49 and FIG. 50 are several schematic diagrams of sharing a rendering rule between users according to this application.
Figure 50:
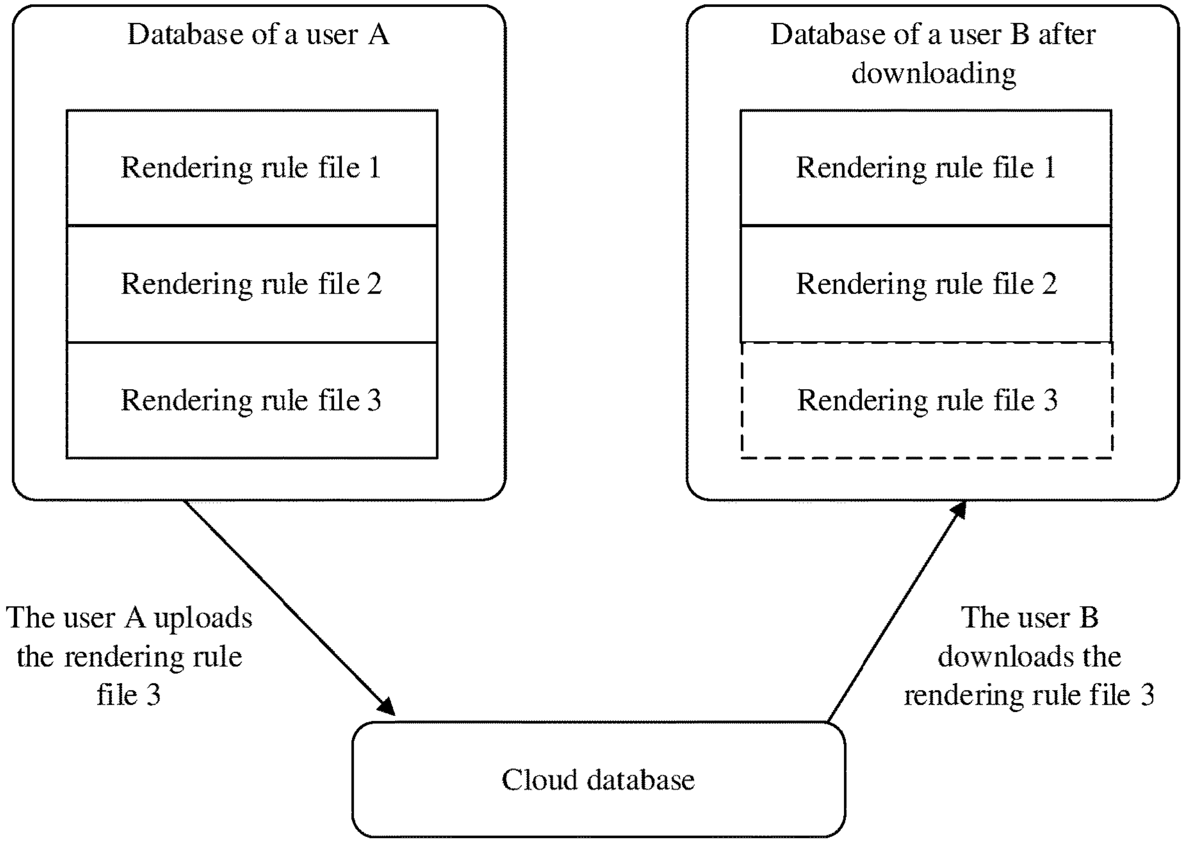

For example, as shown in FIG. 49, the user may choose to synchronize a rendering rule file stored in a local database to another device of the user. As shown in FIG. 50, the user may choose to upload the rendering rule file stored in the local database to a cloud for sharing with another user, and the another user may choose to download the corresponding rendering rule file from a cloud database to a terminal side.

A metadata file stored in the database is mainly used to render, in an automatic mode, a sound object separated by a system or an object specified by the user, or render, in a hybrid mode, a sound object that is specified by a user and that needs to be automatically rendered according to a stored rendering rule. The metadata file stored in the database may be pre-specified in the system, as shown in Table 1.

TABLE 1

| Sequence number | Metadata file | File generation scenario | Corresponding effect |
|---|---|---|---|
| 1 | Fixing at left front | Pre-specified in the system | Render a selected sound object to a position of left front 45 degrees, where a distance between the position and a listener is 2 meters |
| 2 | Gradually moving to right front | Pre-specified in the system | Render a selected sound object to a position of left front 45 degrees, where a distance between the position and a listener changes from 20 meters to 0.5 meter |
| 3 | Audio file A1 | Stored by the user in the interactive mode | Render a sound object X in the audio file A1 based on an interaction track stored in a user interaction mode operation |
| 4 | Audio file A2 | Stored by the user in the interactive mode | Render a lead singer in the audio file A2 based on an interaction track stored in a user interaction mode operation |
| 5 | Free spiraling ascent state | Stored by the user in the interactive mode | Render a sound object selected in an input file or a default sound object based on an interaction track stored in a user interaction mode operation, where a motion track is free spiraling ascent |
| 6 | Suddenly left and suddenly right state | Stored by the user in the interactive mode | Render a sound object selected in an input file or a default sound object based on an interaction track stored in a user interaction mode operation, where a motion track is suddenly left and suddenly right |

TABLE 1-continued

| Sequence number | Metadata file | File generation scenario | Corresponding effect |
|---|---|---|---|
| 7 | Film and television file B1 | Stored by the user in the multi-modal mode | Render a sound object in the film and television file B1 based on a motion track that is of the sound object and that is stored in a multi-modal mode operation |

The sequence numbers 1 and 2 in Table 1 may alternatively be generated during production by the user when the user uses the interactive mode of the present disclosure, for example, the sequence numbers 3 to 6 in Table 1; or may be stored after the system automatically identifies a motion track of a specified sound object in a video picture in the multi-modal mode, for example, the sequence number 7 in Table 1. The metadata file may be strongly related to audio content or multi-modal file content in the multimedia file. For example, in Table 1, the sequence number 3 represents a metadata file corresponding to the audio file A1, and the sequence number 4 represents a metadata file corresponding to the audio file A2. Alternatively, the metadata file may be decoupled from the multimedia file. The user performs an interactive operation on the object X in the audio file A in the interactive mode, and stores a motion track of the object X as a corresponding metadata file (for example, the sequence number 5 in Table 1 represents the free spiraling ascent state). When automatic rendering is used next time, the user may select, from the database module, the metadata file corresponding to the free spiraling ascent state, to render an object Y in an audio file B.

In a possible implementation, the rendering method provided in embodiments of this application includes step 1001 to step 1005. In another possible implementation, the rendering method provided in embodiments of this application includes step 1002 to step 1005. In another possible implementation, the rendering method provided in embodiments of this application includes step 1001 to step 1004. In another possible implementation, the rendering method provided in embodiments of this application includes step 1002 to step 1004. In addition, in embodiments of this application, a time sequence relationship between the steps shown in FIG. 10 is not limited. For example, step 1001 in the foregoing method may alternatively be performed after step 1002, to be specific, the playing device is calibrated after the audio track is obtained.

In embodiments of this application, the user may control a sound image and volume of a specific sound object in audio and a quantity of specific sound objects in the audio by using a mobile phone sensor. According to a method in which the sound image and the volume of the specific sound object and the quantity of specific sound objects are controlled through dragging in a mobile phone interface, spatial rendering is performed on a specific sound object in music according to an automatic rule to improve a spatial sense, a sound source position is automatically rendered through multi-modal identification, and a single sound object is rendered, sound effect experience that is completely different from a conventional music/film interaction mode is provided. This provides a new interaction mode for music appreciation. Automatic 3D re-production improves a spatial sense of dual-channel music, and improves a music listening level. In addition, separation is introduced in the designed interaction method, to enhance an audio editing capability of the user. The interaction method may be applied to sound object production of music or film and television works, to simply edit motion information of a specific sound object. Moreover, controllability and playability of the user for music are increased, so that the user experiences the fun of producing audio by the user and a capability of controlling the specific sound object.

In addition to the foregoing training method and rendering method, this application further provides two specific application scenarios to which the foregoing rendering method is applied. The two specific application scenarios are separately described in the following.

A first application scenario is a "sound hunter" game scenario.

This scenario may also be understood as that a user points to a sound source position, and whether the sound source position to which the user points is consistent with an actual sound source position is determined, to score an operation of the user, so as to improve entertainment experience of the user.

Figure 51:
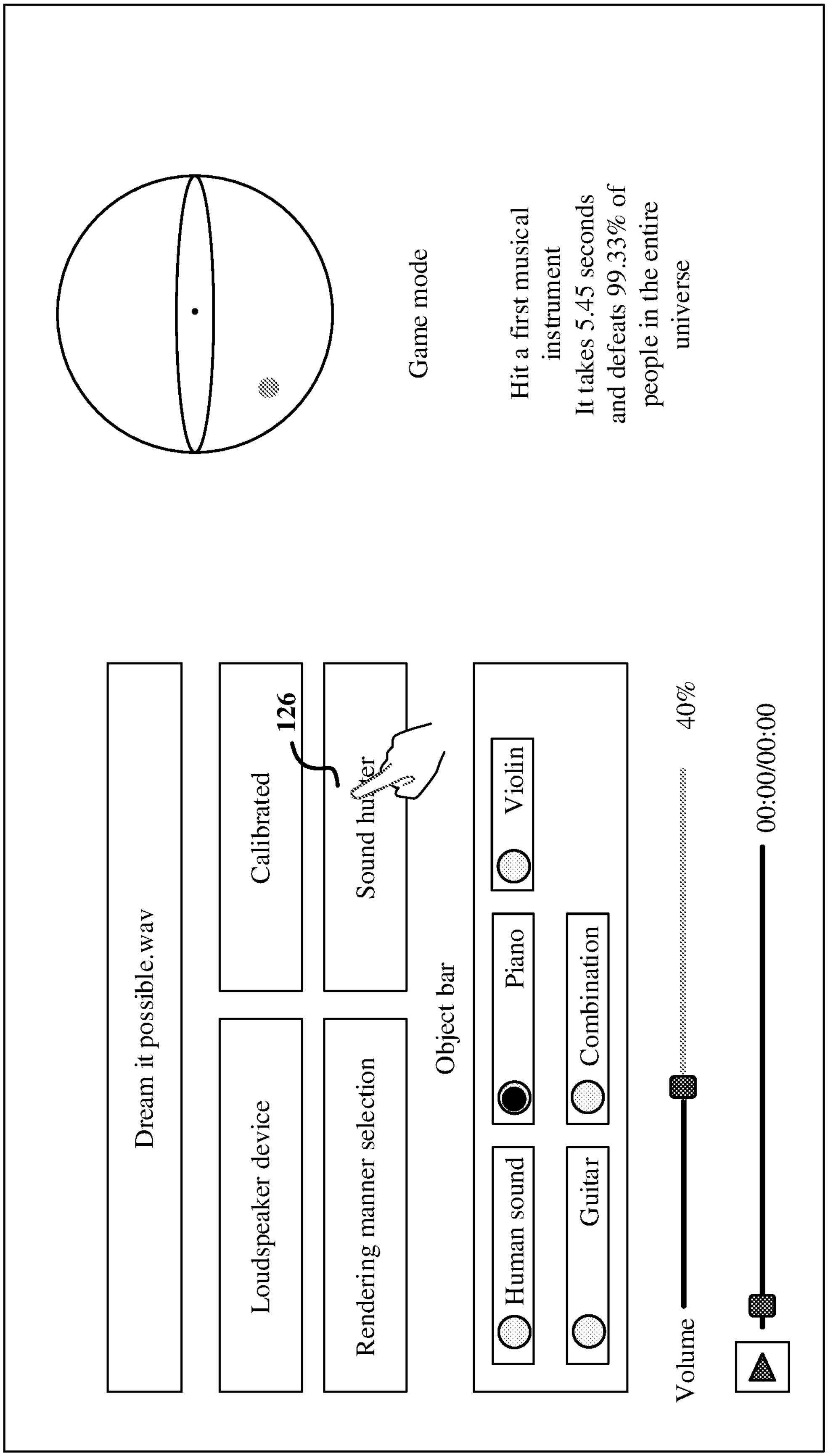
FIG. 51 to FIG. 53 are several other schematic diagrams of display interfaces of a rendering device according to this application.
Figure 52:
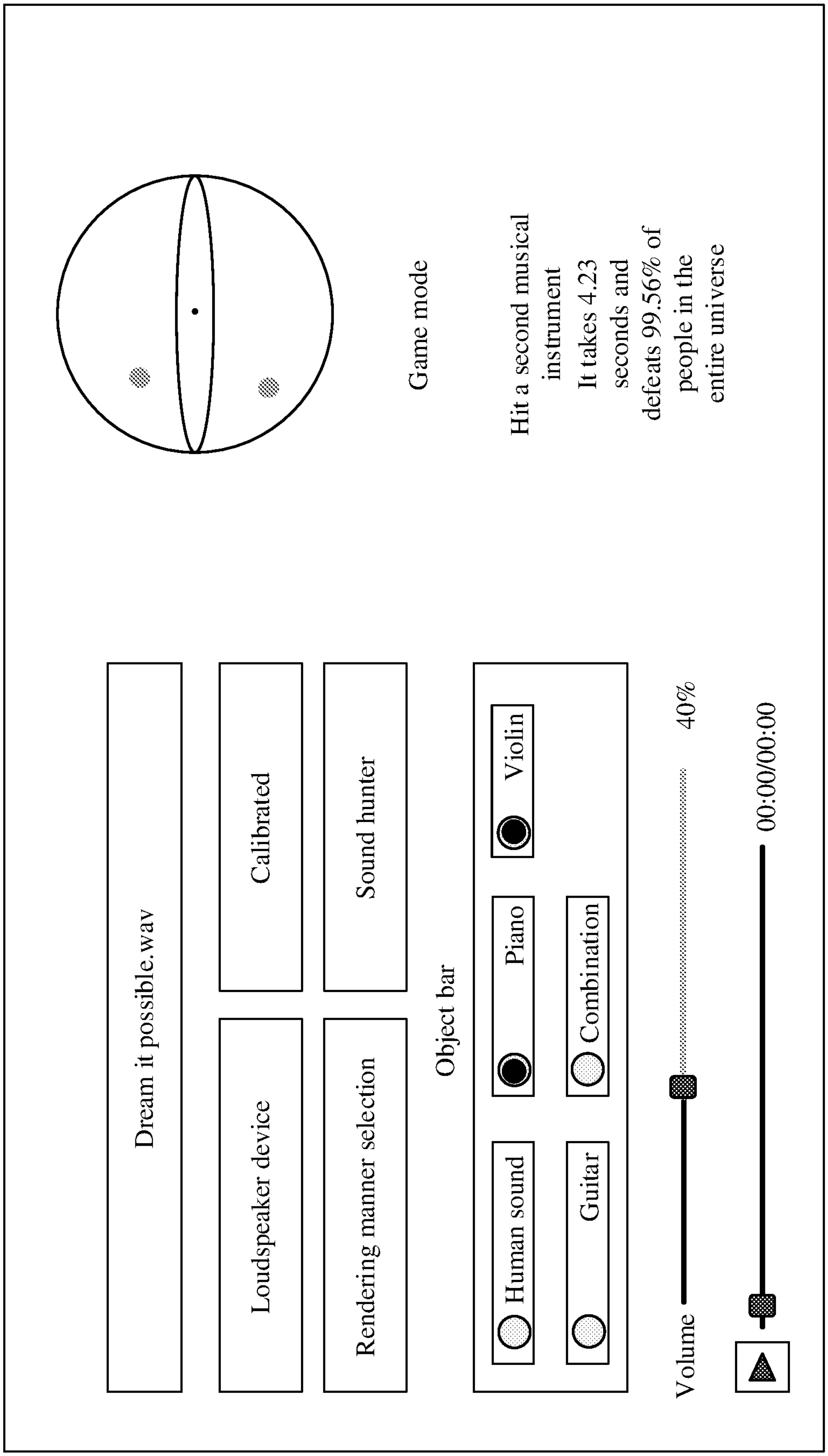
Figure 53:
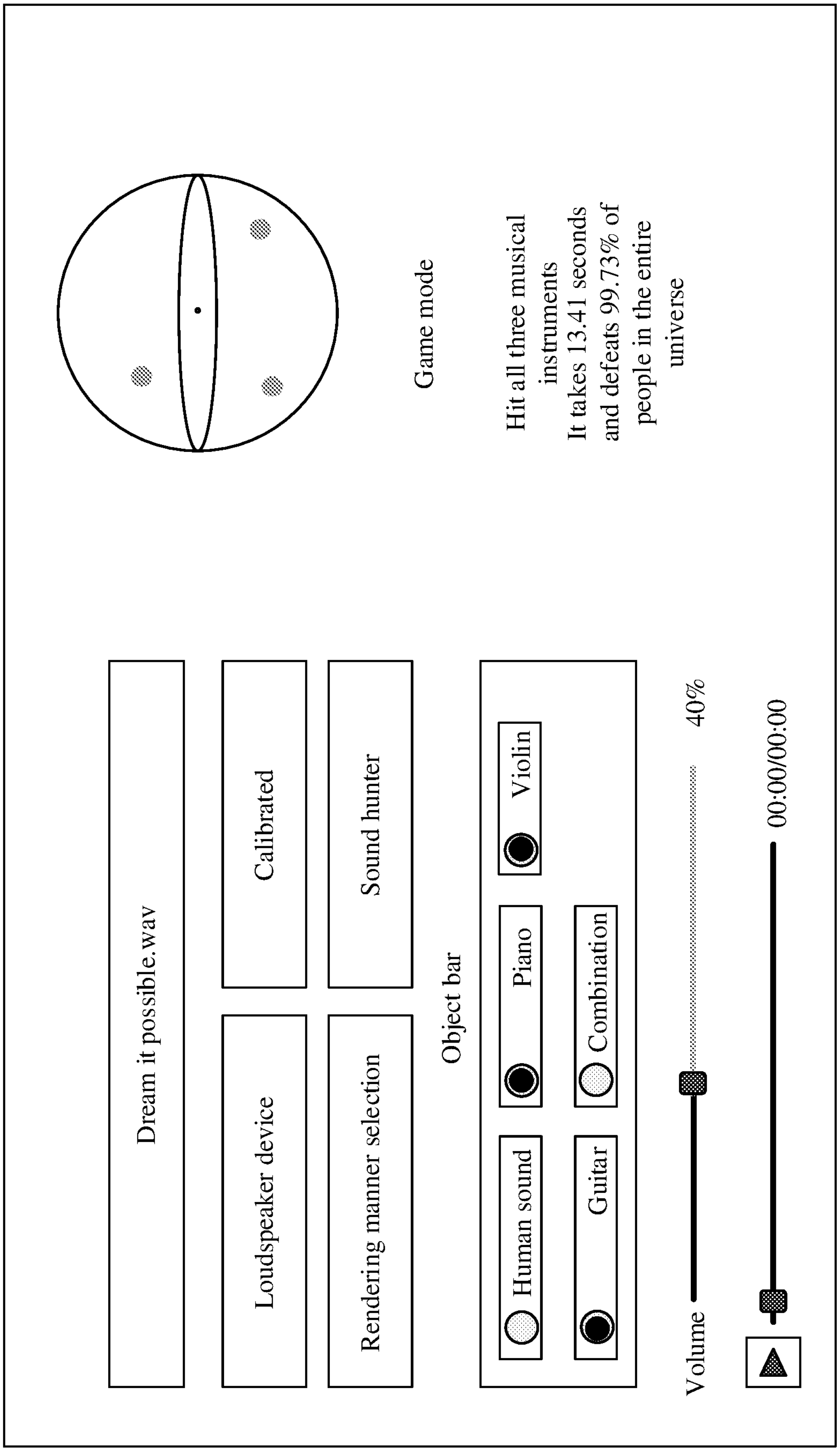
Figure 54:
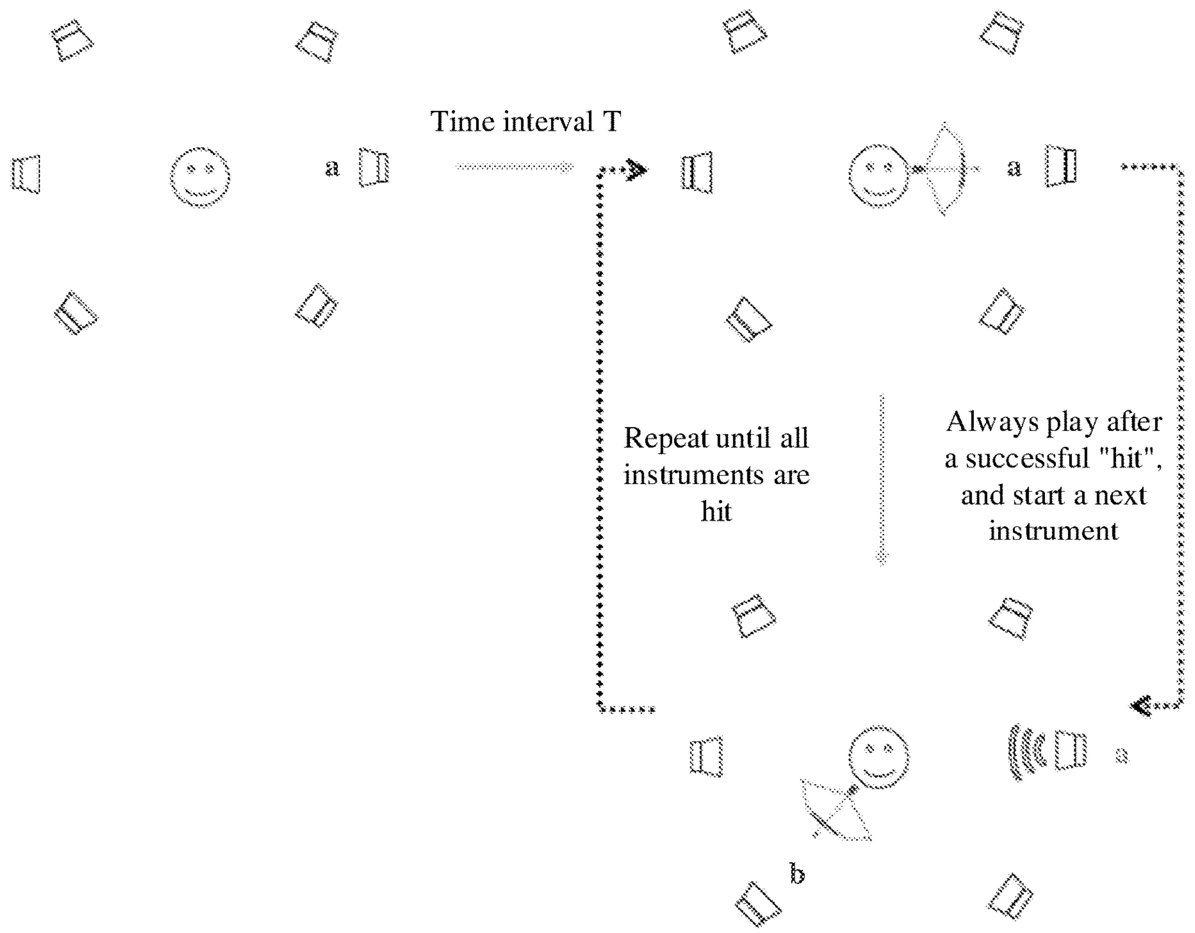
FIG. 54 is a schematic diagram of user interaction in a scenario of a sound hunter game according to this application.

For example, the foregoing example is still used. After the user determines a multimedia file and renders a single-object audio track, as shown in FIG. 51, the user may tap a "sound hunter icon" 126 to enter a sound hunter game scenario, a rendering device may display an interface shown in FIG. 51, the user may tap a playing button at the bottom of the interface to determine to start the game, and a playing device plays at least one single-object audio track in a specific sequence and at any position. When the playing device plays a single-object audio track of a piano, the user determines a sound source position based on an auditory sense, and holds a mobile phone to point to the sound source position determined by the user. If the position pointed to by the mobile phone of the user is consistent with an actual sound source position of the single-object audio track of the piano (or an error is within a specific range), the rendering device may display a prompt "hit a first musical instrument, and it takes 5.45 seconds and defeats 99.33% of people in the entire universe" on the right side of the interface shown in FIG. 51. In addition, after the user points to a correct position of a sound object, the corresponding sound object in an object bar may change from red to green. Certainly, if the user points to an incorrect position of the sound source position within a specific time period, a failure may be displayed. After a preset time period (for example, a time interval T in FIG. 54) expires after a first single-object audio track is played, a next single-object audio track is played to continue the game, as shown in FIG. 52 and FIG. 53. In addition, after the user points to an incorrect position of a sound object, the corresponding sound object in the object bar may remain red. The rest may be deduced by analogy (as shown in FIG. 54). After the user presses a pause button at the bottom of the interface or the single-object audio track is played, it is determined that the game ends. Further, after the game ends, if the user points to a correct position for several times, the rendering device may display an interface shown in FIG. 53.

In this scenario, the user interacts with a playing system in real time to render an orientation of object audio in the playing system in real time. The game is designed to enable the user to obtain ultimate "sound localization" experience. It may be applied to home entertainment, AR, and VR games, and the like. In comparison with the conventional technology in which a technology of "sound localization" is only for an entire song, this application provides a game that is performed after a human sound and an instrument sound are separated from a song.

A second application scenario is a multi-person interaction scenario.

This scenario may be understood as that a plurality of users each control a sound source position of a specific sound object, so that the plurality of users each render an audio track, to increase entertainment and communication between the plurality of users. For example, the interaction scenario may be specifically a scenario in which a plurality of persons create a band online, an anchor controls a symphony online, or the like.

Figure 55:
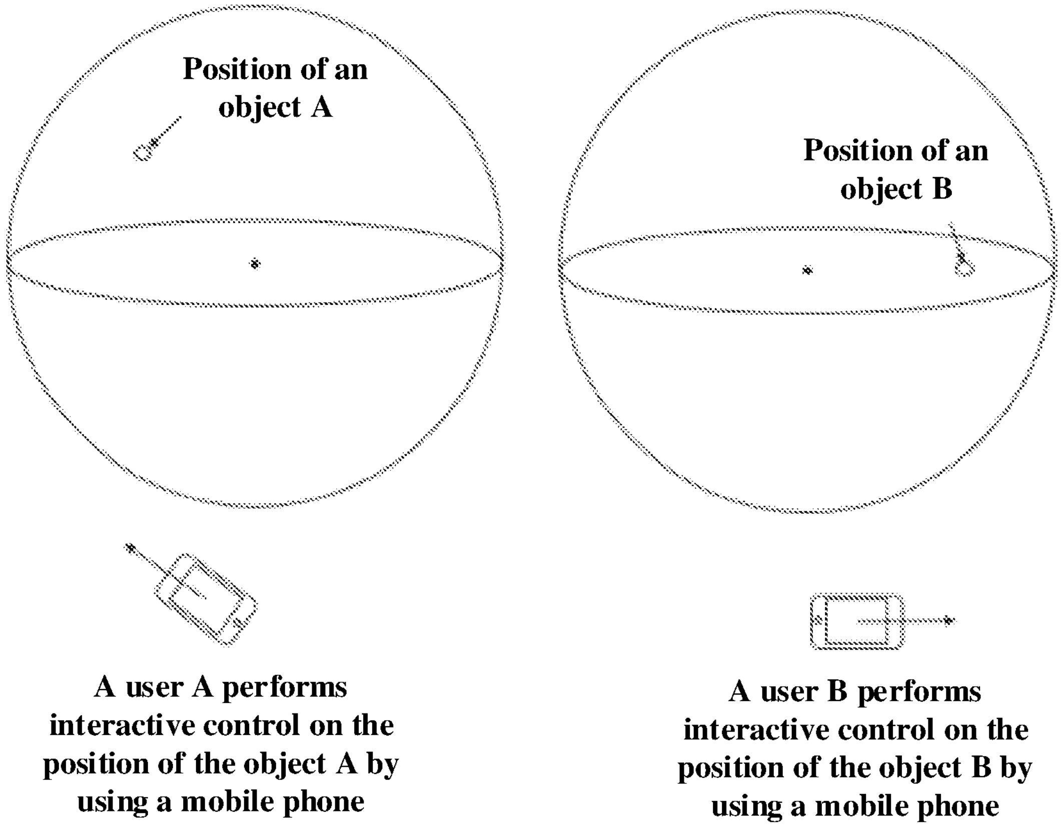
FIG. 55 to FIG. 57 are several schematic diagrams of user interaction in a multi-person interaction scenario according to this application.
Figure 56:
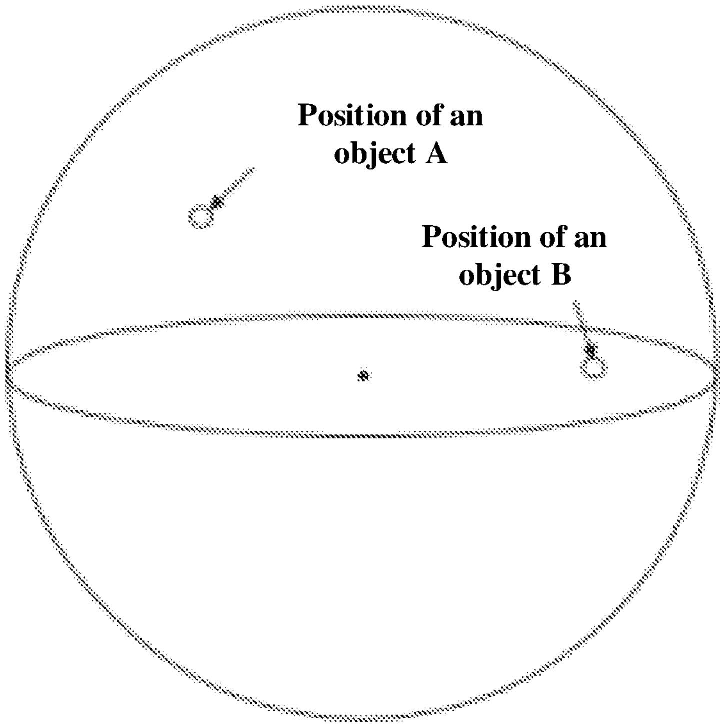

For example, a multimedia file is music played by using a plurality of musical instruments. A user A may select a multi-person interaction mode, and invite a user B to jointly complete production. Each user may select a different musical instrument as an interactive sound object for control. After rendering is performed based on a rendering track provided by a user corresponding to a sound object, remixing is completed, and then an audio file obtained through remixing is sent to each participating user. Interaction modes selected by different users may be different. This is not specifically limited herein. For example, as shown in FIG. 55, the user A selects an interactive mode of performing interactive control on a position of an object A by changing an orientation of a mobile phone used by the user A, and a user B selects an interactive mode of performing interactive control on a position of an object B by changing an orientation of a mobile phone used by the user B. As shown in FIG. 56, a system (a rendering device or a cloud server) may send the audio file obtained through remixing to each user participating in a multi-person interaction application, where the position of the object A and the position of the object B in the audio file respectively correspond to control of the user A and control of the user B.

An example of the foregoing specific interaction process between the user A and the user B is as follows: The user A selects an input multimedia file; and the system identifies object information in the input file, and feeds back the object information to the user A through a UI interface. The user A selects a mode. If the user A selects the multi-person interaction mode, the user A sends a multi-person interaction request to the system, and sends information about a specified invitee to the system. In response to the request, the system sends an interactive request to the user B selected by the user A. If accepting the request, the user B sends an accept instruction to the system, to join a multi-person interaction application created by the user A. The user A and the user B each select a sound object to be operated, control the selected sound object in the foregoing rendering mode, and send a corresponding rendering rule file to each other. The system separates a single-object audio track by using a separation network, renders the separated single-object audio track based on a rendering track provided by a user corresponding to a sound object, remixes rendered single-object audio tracks to obtain a target audio track, and then sends the target audio track to each participating user.

Figure 57:
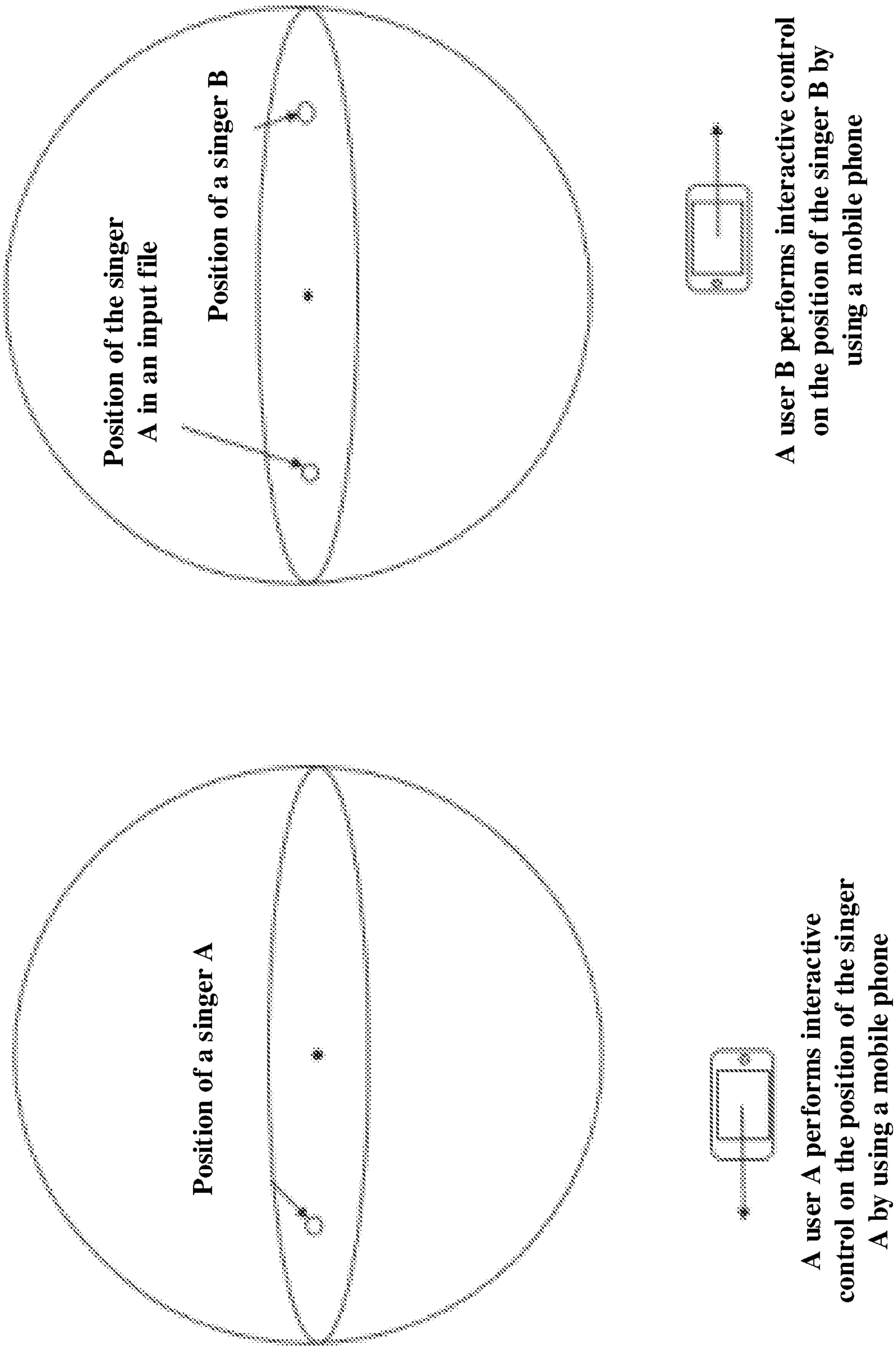

In addition, the multi-person interaction mode may be real-time online multi-person interaction described in the foregoing example, or may be offline multi-person interaction. For example, the multimedia file selected by the user A is duet music, including a singer A and a singer B. As shown in FIG. 57, the user A may select an interaction mode to control rendering effect of the singer A, and share a target audio track obtained through re-rendering with the user B; and the user B may use the received target audio track shared by the user A as an input file, and control rendering effect of the singer B. Interaction modes selected by different users may be the same or different. This is not specifically limited herein.

It may be understood that the foregoing several application scenarios are merely examples. In actual application, there may be another application scenario. This is not specifically limited herein.

In this scenario, real-time and non-real-time interactive rendering control in which a plurality of persons participate is supported. A user may invite another user to jointly complete re-rendering and production of different sound objects of a multimedia file. This enhances interaction experience and application enjoyment. The foregoing manner is used to implement sound image control on different objects through multi-person collaboration, to implement rendering of a multimedia file by a plurality of persons.

Figure 58:
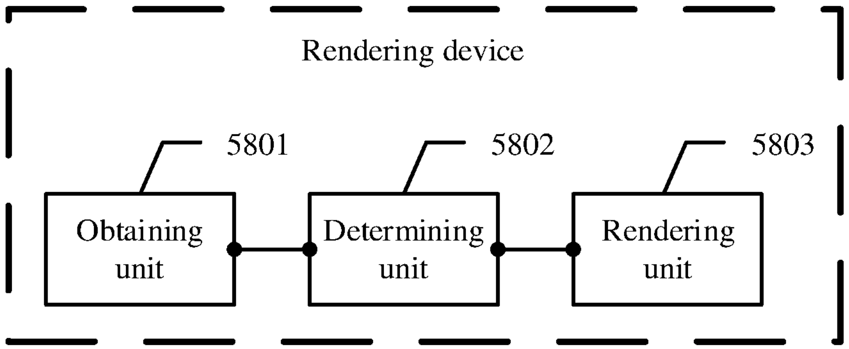
FIG. 58 to FIG. 61 are several schematic diagrams of structures of a rendering device according to this application.

The foregoing describes the rendering method in embodiments of this application. The following describes a rendering device in embodiments of this application. Refer to FIG. 58. An embodiment of the rendering device in embodiments of this application includes:

- an obtaining unit 5801, configured to obtain a first single-object audio track based on a multimedia file, where the first single-object audio track corresponds to a first sound object;
- a determining unit 5802, configured to determine a first sound source position of the first sound object based on reference information, where the reference information includes reference position information and/or media information of the multimedia file, and the reference position information indicates the first sound source position; and
- a rendering unit 5803, configured to perform spatial rendering on the first single-object audio track based on the first sound source position, to obtain a rendered first single-object audio track.

In this embodiment, operations performed by the units in the rendering device are similar to those described in the embodiments shown in FIG. 5 to FIG. 11. Details are not described herein again.

In this embodiment, the obtaining unit 5801 obtains the first single-object audio track based on the multimedia file, where the first single-object audio track corresponds to the first sound object; the determining unit 5802 determines the first sound source position of the first sound object based on the reference information; and the rendering unit 5803 performs spatial rendering on the first single-object audio track based on the first sound source position, to obtain the rendered first single-object audio track. A stereo spatial sense of the first single-object audio track corresponding to the first sound object in the multimedia file can be improved, so that immersive stereo sound effect is provided for a user.

Figure 59:
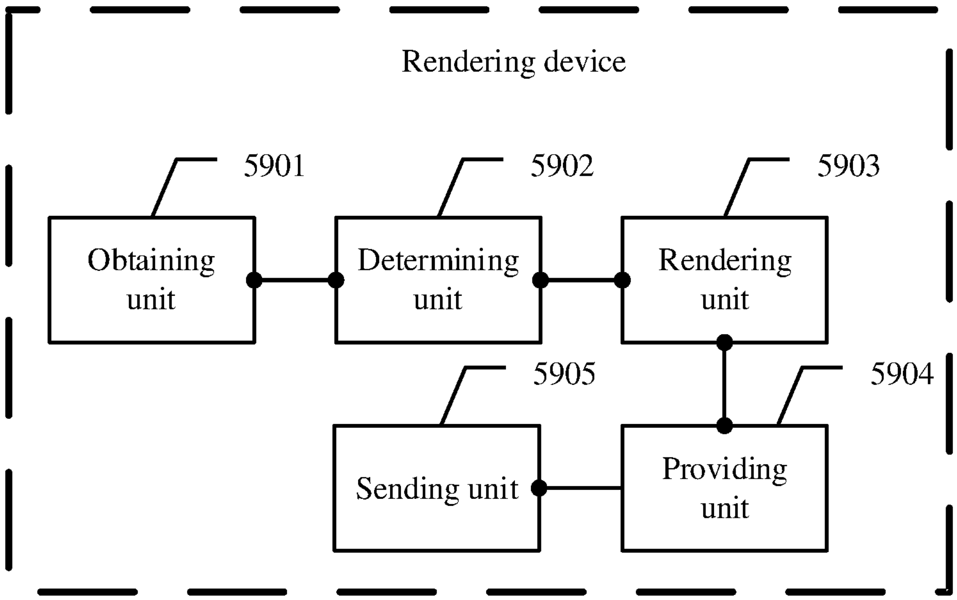

Refer to FIG. 59. Another embodiment of the rendering device in embodiments of this application includes:

- an obtaining unit 5901, configured to obtain a first single-object audio track based on a multimedia file, where the first single-object audio track corresponds to a first sound object;
- a determining unit 5902, configured to determine a first sound source position of the first sound object based on reference information, where the reference information includes reference position information and/or media information of the multimedia file, and the reference position information indicates the first sound source position; and a rendering unit 5903, configured to perform spatial rendering on the first single-object audio track based on the first sound source position, to obtain a rendered first single-object audio track.

The rendering device in this embodiment further includes:

a providing unit 5904, configured to provide a spherical view for a user to select, where a circle center of the spherical view is a position of the user, and a radius of the spherical view is a distance between the position of the user and a playing device; and a sending unit 5905 is configured to send a target audio track to the playing device, where the playing device is configured to play the target audio track.

In this embodiment, operations performed by the units in the rendering device are similar to those described in the embodiments shown in FIG. 5 to FIG. 11. Details are not described herein again.

In this embodiment, the obtaining unit 5901 obtains the first single-object audio track based on the multimedia file, where the first single-object audio track corresponds to the first sound object; the determining unit 5902 determines the first sound source position of the first sound object based on the reference information; and the rendering unit 5903 performs spatial rendering on the first single-object audio track based on the first sound source position, to obtain the rendered first single-object audio track. A stereo spatial sense of the first single-object audio track corresponding to the first sound object in the multimedia file can be improved, so that immersive stereo sound effect is provided for the user. In addition, sound effect experience that is completely different from a conventional music/film interaction mode is provided. This provides a new interaction mode for music appreciation. Automatic 3D re-production improves a spatial sense of dual-channel music, and improves a music listening level. In addition, separation is introduced in the designed interaction method, to enhance an audio editing capability of the user. The interaction method may be applied to sound object production of music or film and television works, to simply edit motion information of a specific sound object. Moreover, controllability and playability of the user for music are increased, so that the user experiences the fun of producing audio by the user and a capability of controlling the specific sound object.

Figure 60:
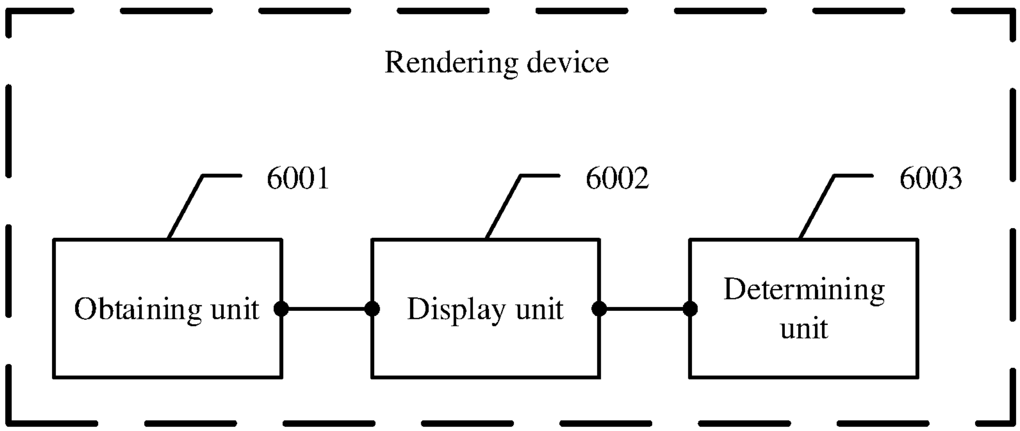

Refer to FIG. 60. An embodiment of the rendering device in embodiments of this application includes:

an obtaining unit 6001, configured to obtain a multimedia file, where the obtaining unit 6001 is further configured to obtain a first single-object audio track based on the multimedia file, where the first single-object audio track corresponds to a first sound object;

a display unit 6002, configured to display a user interface, where the user interface includes a rendering manner option; and a determining unit 6003, configured to determine an automatic rendering manner or an interactive rendering manner from the rendering manner option in response to a first operation of a user in the user interface, where the obtaining unit 6001 is further configured to: when the determining unit determines the automatic rendering manner, obtain a rendered first single-object audio track in a preset manner; or the obtaining unit 6001 is further configured to: when the determining unit determines the interactive rendering manner, obtain reference position information in response to a second operation of the user, determine a first sound source position of the first sound object based on the reference position information, and render the first single-object audio track based on the first sound source position, to obtain a rendered first single-object audio track.

In this embodiment, operations performed by the units in the rendering device are similar to those described in the embodiments shown in FIG. 5 to FIG. 11. Details are not described herein again.

In this embodiment, the determining unit 6003 determines the automatic rendering manner or the interactive rendering manner from the rendering manner option based on the first operation of the user. In one aspect, the obtaining unit 6001 may automatically obtain the rendered first single-object audio track based on the first operation of the user. In another aspect, spatial rendering of the audio track corresponding to the first sound object in the multimedia file may be implemented through interaction between the rendering device and the user, so that immersive stereo sound effect is provided for the user.

Figure 61:
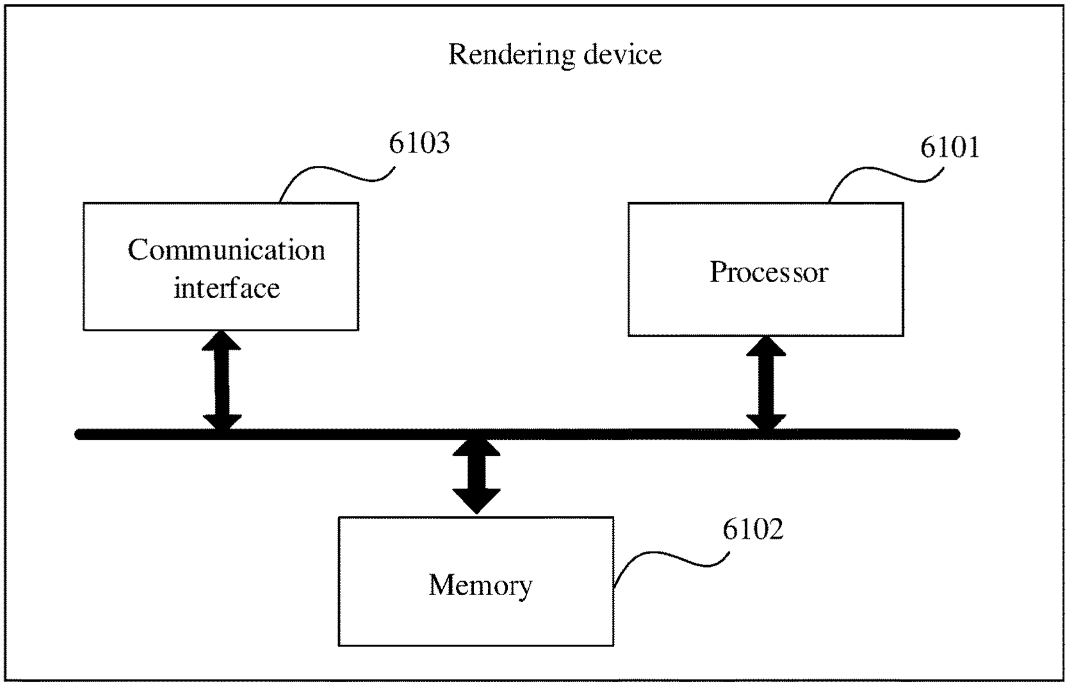

FIG. 61 is a schematic diagram of a structure of another rendering device according to this application. The rendering device may include a processor 6101, a memory 6102, and a communication interface 6103. The processor 6101, the memory 6102, and the communication interface 6103 are connected to each other through a line. The memory 6102 stores program instructions and data.

The memory 6102 stores program instructions and data that correspond to the steps performed by the rendering device in the corresponding implementations shown in FIG. 5 to FIG. 11.

The processor 6101 is configured to perform the steps performed by the rendering device in any one of the embodiments shown in FIG. 5 to FIG. 11.

The communication interface 6103 may be configured to receive and send data, and is configured to perform steps related to obtaining, sending, and receiving in any one of the embodiments shown in FIG. 5 to FIG. 11.

In an implementation, the rendering device may include more or fewer components than those shown in FIG. 61. This is merely an example for description, but is not limited in this application.

Figure 62:
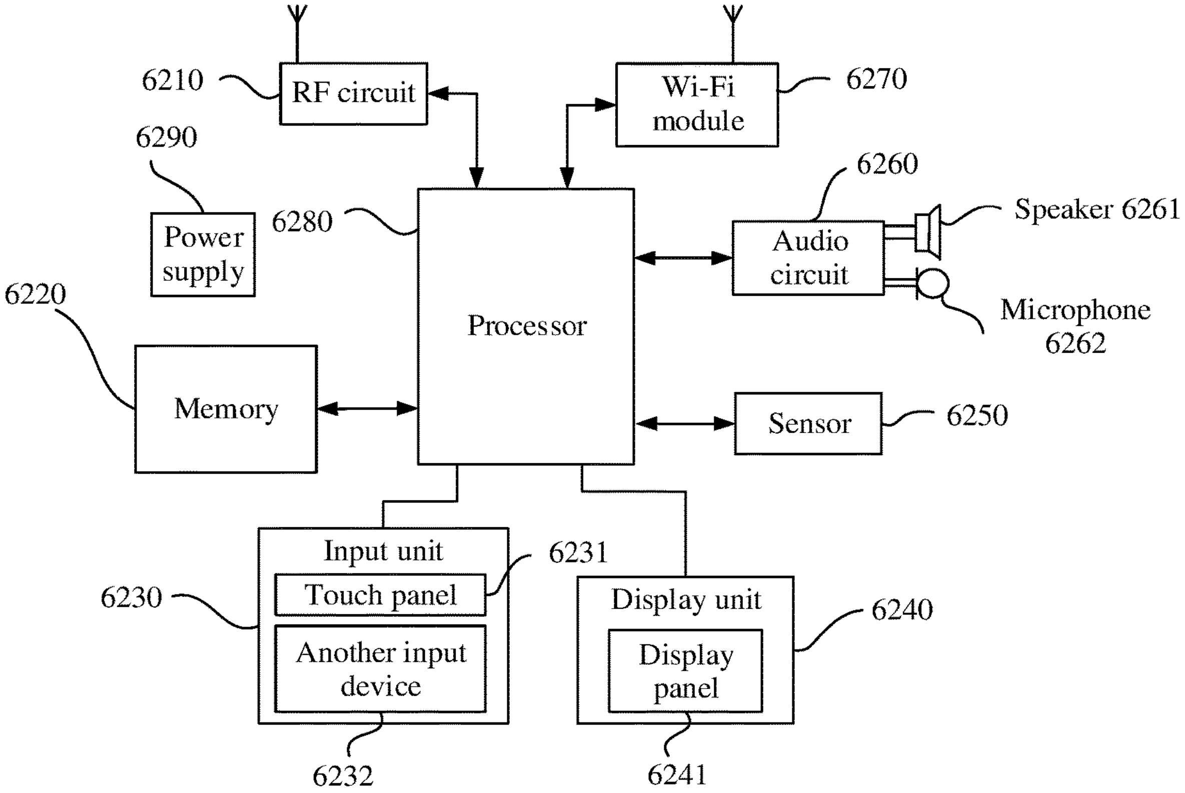
FIG. 62 is a schematic diagram of a structure of a sensor device according to this application.

As shown in FIG. 62, an embodiment of this application further provides a sensor device. For ease of description, only a part related to embodiments of this application is shown. For specific technical details that are not disclosed, refer to the method part in embodiments of this application. The sensor device may be any terminal device such as a mobile phone, a tablet computer, or the like. For example, the sensor is a mobile phone.

FIG. 62 is a block diagram of a partial structure of a sensor device (that is, a mobile phone) according to an embodiment of this application. Refer to FIG. 62. The mobile phone includes components such as a radio frequency (RF) circuit 6210, a memory 6220, an input unit 6230, a display unit 6240, a sensor 6250, an audio circuit 6260, a wireless fidelity (Wi-Fi) module 6270, a processor 6280, a power supply 6290, and the like. A person skilled in the art may understand that the structure of the mobile phone shown in FIG. 62 does not constitute a limitation on the mobile phone, and the mobile phone may include more or fewer components than those shown in the figure, or some components may be combined, or different component arrangements may be used.

The following describes the components of the mobile phone in detail with reference to FIG. 62.

The RF circuit 6210 may be configured to: receive and send signals in an information receiving/sending process or a call process; and in particular, after receiving downlink information of a base station, send the downlink information to the processor 6280 for processing, and send related uplink data to the base station. The RF circuit 6210 usually includes but is not limited to an antenna, at least one amplifier, a transceiver, a coupler, a low noise amplifier (LNA), a duplexer, and the like. In addition, the RF circuit 6210 may further communicate with a network and another device through wireless communication. Any communication standard or protocol may be used for the wireless communication, and includes but is not limited to a global system for mobile communications (GSM), a general packet radio service (GPRS), code division multiple access (CDMA), wideband code division multiple access (WCDMA), long term evolution (LTE), an email, a short messaging service (SMS), and the like.

The memory 6220 may be configured to store a software program and a module. The processor 6280 performs various functional applications on the mobile phone and data processing by running the software program and the module that are stored in the memory 6220. The memory 6220 may mainly include a program storage area and a data storage area. The program storage area may store an operating system, an application program required for at least one function (such as a sound playing function, an image playing function, or the like), and the like. The data storage area may store data (such as audio data, a phone book, or the like) created based on usage of the mobile phone, and the like. In addition, the memory 6220 may include a high-speed random access memory, and may further include a non-volatile memory such as at least one magnetic disk storage device, a flash memory, or another volatile solid-state storage device.

The input unit 6230 may be configured to receive input digital or character information, and generate button signal input related to a user setting and function control on the mobile phone. Specifically, the input unit 6230 may include a touch panel 6231 and another input device 6232. The touch panel 6231, also referred to as a touchscreen, may collect a touch operation performed by a user on or near the touch panel 6231 (for example, an operation performed by the user on the touch panel 6231 or near the touch panel 6231 by using any suitable object or accessory such as a finger or a stylus), and drive a corresponding connection apparatus based on a preset program. Optionally, the touch panel 6231 may include two parts: a touch detection apparatus and a touch controller. The touch detection apparatus detects a touch position of the user, detects a signal generated by a touch operation, and transmits the signal to the touch controller. The touch controller receives touch information from the touch detection apparatus, converts the touch information into touch point coordinates, and sends the touch point coordinates to the processor 6280; and can receive and execute a command sent by the processor 6280. In addition, the touch panel 6231 may be implemented by using a plurality of types, such as a resistive type, a capacitive type, an infrared ray type, a surface acoustic wave type, and the like. In addition to the touch panel 6231, the input unit 6230 may further include the another input device 6232. Specifically, the another input device 6232 may include but is not limited to one or more of a physical keyboard, a function button (such as a volume control button, an on/off button, or the like), a trackball, a mouse, a joystick, and the like.

The display unit 6240 may be configured to display information input by the user or information provided to the user, and various menus on the mobile phone. The display unit 6240 may include a display panel 6241. Optionally, the display panel 6241 may be configured in a form of a liquid crystal display (LCD), an organic light-emitting diode (OLED), or the like. Further, the touch panel 6231 may cover the display panel 6241. After detecting a touch operation on or near the touch panel 6231, the touch panel 6231 transfers the touch operation to the processor 6280, to determine a type of a touch event. Then, the processor 6280 provides a corresponding visual output on the display panel 6241 based on the type of the touch event. In FIG. 62, the touch panel 6231 and the display panel 6241 serve as two independent components to implement input and input functions of the mobile phone. However, in some embodiments, the touch panel 6231 and the display panel 6241 may be integrated to implement the input and output functions of the mobile phone.

The mobile phone may further include at least one sensor 6250, for example, an optical sensor, a motion sensor, and another sensor. Specifically, the optical sensor includes an ambient light sensor and a proximity sensor. The ambient light sensor may adjust luminance of the display panel 6241 based on brightness of ambient light, and the proximity sensor may turn off the display panel 6241 and/or backlight when the mobile phone moves close to an ear. As a type of motion sensor, an accelerometer sensor may detect values of acceleration in all directions (usually on three axes), may detect a value and a direction of gravity when the mobile phone is still, and may be used in an application for identifying a mobile phone posture (such as switching between a landscape mode and a portrait mode, a related game, or magnetometer posture calibration), a function related to vibration identification (such as a pedometer or a knock), or the like. Another sensor such as a gyroscope, a barometer, a hygrometer, a thermometer, an infrared sensor, an IMU sensor, a SLAM sensor, or the like may be further configured in the mobile phone. Details are not described herein.

The audio circuit 6260, a speaker 6261, and a microphone 6262 may provide an audio interface between the user and the mobile phone. The audio circuit 6260 may convert received audio data into an electrical signal and transmit the electrical signal to the speaker 6261, and the speaker 6261 converts the electrical signal into a sound signal for outputting. In addition, the microphone 6262 converts a collected sound signal into an electrical signal. The audio circuit 6260 receives the electrical signal, converts the electrical signal into audio data, and then outputs the audio data to the processor 6280 for processing, to send, through the RF circuit 6210, the audio data to, for example, another mobile phone, or outputs the audio data to the memory 6220 for further processing.

Wi-Fi is a short-distance wireless transmission technology. The mobile phone can help, by using the Wi-Fi module 6270, the user to receive and send emails, browse web pages, visit streaming media, and the like, to provide wireless broadband internet access for the user. Although FIG. 62 shows the Wi-Fi module 6270, it may be understood that the Wi-Fi module 6270 is not a mandatory component of the mobile phone.

The processor 6280 is a control center of the mobile phone that is connected to various parts of the entire mobile phone through various interfaces and lines, and performs various functions of the mobile phone and data processing by running or executing the software program and/or the module stored in the memory 6220 and invoking data stored in the memory 6220, to perform overall monitoring over the mobile phone. Optionally, the processor 6280 may include one or more processing units. Preferably, an application processor and a modem processor may be integrated into the processor 6280. The application processor mainly processes an operating system, a user interface, an application program, and the like. The modem processor mainly processes wireless communication. It may be understood that the modem processor may alternatively not be integrated into the processor 6280.

The mobile phone further includes the power supply 6290 (for example, a battery) that supplies power to the components. Preferably, the power supply may be logically connected to the processor 6280 by using a power management system, to implement functions such as charging management, discharging management, power consumption management, and the like by using the power management system.

Although not shown in the figure, the mobile phone may further include a camera, a Bluetooth module, and the like. Details are not described herein.

In this embodiment of this application, the processor 6280 included in the mobile phone may perform functions in the embodiments shown in FIG. 5 to FIG. 11. Details are not described herein again.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the foregoing described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or a part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods in embodiments of this application. The foregoing storage medium includes any medium that can store program code, such as a USB flash drive, a removable hard disk, a read-only memory (ROM), a random access memory (RAM), a magnetic disk, an optical disc, or the like.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have", and any other variants mean to cover the non-exclusive inclusion, so that a process, method, system, product, or device that includes a series of units is not necessarily limited to those units, but may include other units not expressly listed or inherent to such a process, method, system, product, or device.

What is claimed is:

1. A rendering method implemented by a rendering device, comprising:

obtaining a first single-object audio track based on a multimedia file, wherein the first single-object audio track corresponds to a first sound object;

obtaining reference information, wherein the reference information comprises reference position information that includes first position information, wherein the first position information includes a posture angle of a sensor and a distance between the sensor and a playing device, and wherein the distance is determined based on a ratio of energy of a test signal received by the sensor to energy of the test signal played by the playing device;

determining a first sound source position of the first sound object based on the reference information; and performing spatial rendering on the first single-object audio track based on the first sound source position, to obtain a rendered first single-object audio track.

2. The method according to claim 1, wherein the reference information comprises media information of the multimedia file, and wherein the media information comprises at least one of: text that needs to be displayed in the multimedia file, an image that needs to be displayed in the multimedia file, a music feature of music that needs to be played in the multimedia file, or a sound source type corresponding to the first sound object.

3. The method according to claim 1, wherein the reference position information comprises second position information that is selected by a user.

4. The method according to claim 1, further comprising:

determining a type of the playing device, wherein the playing device is configured to play a target audio track, and the target audio track is obtained based on the rendered first single-object audio track, and wherein the performing the spatial rendering on the first single-object audio track based on the first sound source position comprises:

performing the spatial rendering on the first single-object audio track based on the first sound source position and the type of the playing device.

5. The method according to claim 2, wherein when the media information comprises the image and the image comprises the first sound object, the determining the first sound source position of the first sound object based on the reference information comprises:

determining third position information of the first sound object in the image, wherein the third position information comprises two-dimensional coordinates and a depth of the first sound object in the image; and obtaining the first sound source position based on the third position information.

6. The method according to claim 2, wherein when the media information comprises the music feature of the music that needs to be played in the multimedia file, the determining the first sound source position of the first sound object based on the reference information comprises:

determining the first sound source position based on an association relationship and the music feature, wherein the association relationship indicates an association between the music feature and the first sound source position.

7. The method according to claim 1, wherein the determining the first sound source position of the first sound object based on the reference information comprises:

converting the first position information into the first sound source position.

8. The method according to claim 3, wherein when the reference position information comprises the second position information, before the determining the first sound source position of the first sound object based on the reference information, the method further comprises:

providing a spherical view for the user to select, wherein a circle center of the spherical view is a position of the user, and a radius of the spherical view is a distance between the position of the user and the playing device; and obtaining the second position information selected by the user in the spherical view, and wherein the determining a first sound source position of the first sound object based on the reference information comprises:

converting the second position information into the first sound source position.

9. The method according to claim 4, wherein the performing spatial rendering on the first single-object audio track based on the first sound source position and the type of the playing device comprises:

when the playing device is a headset, obtaining the rendered first single-object audio track according to the following formula:

$$\sum_s \int_{-\infty}^{t} a_s(t) h_{i,s}(t) o_s(\tau - t) d\tau, \text{ wherein}$$

$$\sum_s \int_{-\infty}^{t} a_s(t) h_{i,s}(t) o_s(\tau - t) d\tau$$

represents the rendered first single-object audio track, S represents at least one sound object of the multimedia file and the at least one sound object comprises the first sound object, i represents a left channel or a right channel, $a_s(t)$ represents an adjustment coefficient of the first sound object at a moment t, $h_{i,s}(t)$ represents a head-related transfer function HRTF filter coefficient that is of the left channel or the right channel corresponding to the first sound object and that is at the moment t, the HRTF filter coefficient is related to the first sound source position, $o_s(t)$ represents the first single-object audio track at the moment t, and $\tau$ represents an integration item.

10. The method according to claim 4, wherein the performing spatial rendering on the first single-object audio track based on the first sound source position and the type of the playing device comprises:

when the playing device is N loudspeaker devices, obtaining the rendered first single-object audio track according to the following formula:

$$\sum_s a_s(t) g_s(t) o_s(t), \text{ wherein}$$

$$g_s(t) = [r\cos\lambda\sin\Phi \;\; r\sin\lambda\sin\Phi \;\; r\cos\Phi]$$

$$\begin{bmatrix} r_1\cos\lambda_1\sin\Phi_1 & r_1\sin\lambda_1\sin\Phi_1 & r_1\cos\Phi_1 \\ \cdots & \cdots & \cdots \\ r_N\cos\lambda_N\sin\Phi_N & r_1\sin\lambda_N\sin\Phi_N & r_N\cos\Phi_N \end{bmatrix}^{-1}, \text{ wherein}$$

$$r = \sqrt{\frac{\sum_{i=1}^{N} r_i^2}{N}}, \text{ wherein}$$

$$\sum_s a_s(t) g_s(t) o_s(t)$$

represents the rendered first single-object audio track, i represents an $i^{th}$ channel in a plurality of channels, S represents at least one sound object of the multimedia file and the at least one sound object comprises the first sound object, $a_s(t)$ represents an adjustment coefficient of the first sound object at a moment t, $g_s(t)$ represents a translation coefficient of the first sound object at the moment t, $o_s(t)$ represents the first single-object audio track at the moment t, $\lambda_i$ represents an azimuth obtained when a calibrator calibrates an $i^{th}$ loudspeaker device, $\Phi_i$ represents an oblique angle obtained when the calibrator calibrates the $i^{th}$ loudspeaker device, $r_i$ represents a distance between the $i^{th}$ loudspeaker device and the calibrator, N is a positive integer, i is a positive integer, $i \le N$, and the first sound source position is in a tetrahedron formed by the N loudspeaker devices.

11. The method according to claim 4, further comprising:

obtaining the target audio track based on the rendered first single-object audio track, an original audio track in the multimedia file, and the type of the playing device; and sending the target audio track to the playing device, wherein the playing device is configured to play the target audio track.

12. The method according to claim 11, wherein the obtaining the target audio track based on the rendered first single-object audio track, an original audio track in the multimedia file, and the type of the playing device comprises:

when the playing device is a headset, obtaining the target audio track according to the following formula:

$$X_i^{3D}(t) = X_i(t) - \sum_{s \in S_1} o_s(t) + \sum_{s \in S_1 + S_2} \int_{-\infty}^{t} a_s(t) h_{i,s}(t) o_s(\tau - t) d\tau,$$

wherein i represents a left channel or a right channel, $X_i^{3D}(t)$ represents the target audio track at a moment t, $X_i(t)$ represents the original audio track at the moment t, $$\sum_{s \in S_1} o_s(t)$$

represents the first single-object audio track that is not rendered at the moment t, $$\sum_s \int_{-\infty}^{t} a_s(t) h_{i,s}(t) o_s(\tau - t) d\tau$$

represents the rendered first single-object audio track, $a_s(t)$ represents an adjustment coefficient of the first sound object at the moment t, $h_{i,s}(t)$ represents a head-related transfer function HRTF filter coefficient that is of the left channel or the right channel corresponding to the first sound object and that is at the moment t, the HRTF filter coefficient is related to the first sound source position, $o_s(t)$ represents the first single-object audio track at the moment t, τ represents an integration item, and $S_1$ represents a sound object that needs to be replaced in the original audio track; if the first sound object replaces the sound object in the original audio track, $S_1$ represents a null set; $S_2$ represents a sound object added in the target audio track compared with the original audio track, and if the first sound object is a duplicate of the sound object in the original audio track, $S_2$ represents a null set; and $S_1$ and/or $S_2$ represent/represents at least one sound object of the multimedia file and the at least one sound object comprises the first sound object.

13. The method according to claim 11, wherein the obtaining the target audio track based on the rendered first single-object audio track, an original audio track in the multimedia file, and the type of the playing device comprises:

when the playing device is N loudspeaker devices, obtaining the target audio track according to the following formula:

$$X_i^{3D(t)} = X_i(t) - \sum_{s \in S_1} o_s(t) + \sum_{s \in S_1 + S_2} a_s(t) g_{i,s}(t) o_s(t), \text{ wherein}$$

$$g_s(t) = [r\cos\lambda\sin\Phi \;\; r\sin\lambda\sin\Phi \;\; r\cos\Phi]$$

$$\begin{bmatrix} r_1\cos\lambda_1\sin\Phi_1 & r_1\sin\lambda_1\sin\Phi_1 & r_1\cos\Phi_1 \\ \cdots & \cdots & \cdots \\ r_N\cos\lambda_N\sin\Phi_N & r_1\sin\lambda_N\sin\Phi_N & r_N\cos\Phi_N \end{bmatrix}^{-1}, \text{ wherein}$$

$$r = \sqrt{\frac{\sum_{i=1}^{N} r_i^2}{N}},$$

wherein i represents an $i^{th}$ channel in a plurality of channels, $$X_i^{3D}(t)$$

represents the target audio track at a moment t, $X_i(t)$ represents the original audio track at the moment t, $$\sum_{s \in S_1} o_s(t)$$

represents the first single-object audio track that is not rendered at the moment t, $$\sum_s a_s(t) g_{i,s}(t) o_S(t)$$

represents the rendered first single-object audio track, $a_s(t)$ represents an adjustment coefficient of the first sound object at the moment t, $g_s(t)$ represents a translation coefficient of the first sound object at the moment t, $g_{i,s}(t)$ represents an $i^{th}$ row in $g_s(t)$, $o_s(t)$ represents the first single-object audio track at the moment t, and $S_1$ represents a sound object that needs to be replaced in the original audio track; if the first sound object replaces the sound object in the original audio track, $S_1$ represents a null set; $S_2$ represents a sound object added in the target audio track compared with the original audio track, and if the first sound object is a duplicate of the sound object in the original audio track, $S_2$ represents a S null set; and $S_1$ and/or $S_2$ represent/represents at least one sound object of the multimedia file and the at least one sound object comprises the first sound object, $\lambda_i$ represents an azimuth obtained when a calibrator calibrates an $i^{th}$ loudspeaker device, $\Phi_i$ represents an oblique angle obtained when the calibrator calibrates the $i^{th}$ loudspeaker device, $r_i$ represents a distance between the $i^{th}$ loudspeaker device and the calibrator, N is a positive integer, i is a positive integer, i≤N, and the first sound source position is in a tetrahedron formed by the N loudspeaker devices.

14. A rendering device, comprising:

one or more processors;

a memory coupled to the one or more processors, wherein the memory is configured to store programming instructions, and when the programming instructions are executed by the one or more processors to enable the rendering device to:

obtain a first single-object audio track based on a multimedia file, wherein the first single-object audio track corresponds to a first sound object;

obtain reference information, wherein the reference information comprises reference position information that includes first position information, wherein the first position information includes a posture angle of a sensor and a distance between the sensor and a playing device, and wherein the distance is determined based on a ratio of energy of a test signal received by the sensor to energy of the test signal played by the playing device;

determine a first sound source position of the first sound object based on the reference information; and perform spatial rendering on the first single-object audio track based on the first sound source position, to obtain a rendered first single-object audio track.

15. The rendering device according to claim 14, wherein the reference information comprises media information of the multimedia file, and wherein the media information comprises at least one of: text that needs to be displayed in the multimedia file, an image that needs to be displayed in the multimedia file, a music feature of music that needs to be played in the multimedia file, or a sound source type corresponding to the first sound object.

16. The rendering device according to claim 14, wherein the reference position information comprises second position information that is selected by a user.

17. The rendering device according to claim 15, wherein when the media information comprises the image and the image comprises the first sound object, the determining the first sound source position of the first sound object based on the reference information comprises:

determining third position information of the first sound object in the image, wherein the third position information comprises two-dimensional coordinates and a depth of the first sound object in the image; and obtaining the first sound source position based on the third position information.

18. The rendering device according to claim 14, wherein the programming instructions are further executed by the one or more processors to enable the rendering device to:

determine a type of the playing device, wherein the playing device is configured to play a target audio track, and the target audio track is obtained based on the rendered first single-object audio track, and wherein the performing spatial rendering on the first single-object audio track based on the first sound source position comprises:

performing spatial rendering on the first single-object audio track based on the first sound source position and the type of the playing device.

19. The rendering device according to claim 18, wherein the performing spatial rendering on the first single-object audio track based on the first sound source position and the type of the playing device comprises:

when the playing device is a headset, obtaining the rendered first single-object audio track according to the following formula:

$$\sum_s \int_{-\infty}^{t} a_s(t)h_{i,s}(t)o_s(\tau - t)d\tau, \text{ wherein}$$

-continued $$\sum_s \int_{-\infty}^{t} a_s(t)h_{i,s}(t)o_s(\tau - t)d\tau$$

represents the rendered first single-object audio track, S represents at least one sound object of the multimedia file and the at least one sound object comprises the first sound object, i represents a left channel or a right channel, $a_s(t)$ represents an adjustment coefficient of the first sound object at a moment t, $h_{i,s}(t)$ represents a head-related transfer function HRTF filter coefficient that is of the left channel or the right channel corresponding to the first sound object and that is at the moment t, the HRTF filter coefficient is related to the first sound source position, $o_s(t)$ represents the first single-object audio track at the moment t, and $\tau$ represents an integration item.

20. A non-transitory computer-readable storage medium storing computer instructions, that when executed by one or more processors, cause the one or more processors to:

obtaining a first single-object audio track based on a multimedia file, wherein the first single-object audio track corresponds to a first sound object;

obtaining reference information, wherein the reference information comprises reference position information that includes first position information, wherein the first position information includes a posture angle of a sensor and a distance between the sensor and a playing device, and wherein the distance is determined based on a ratio of energy of a test signal received by the sensor to energy of the test signal played by the playing device;

determining a first sound source position of the first sound object based on the reference information; and performing spatial rendering on the first single-object audio track based on the first sound source position, to obtain a rendered first single-object audio track.

* * * * *